(12) United States Patent
Tsukuba

(10) Patent No.: US 11,354,824 B2
(45) Date of Patent: Jun. 7, 2022

(54) IMAGE PROCESSING APPARATUS AND METHOD

(71) Applicant: SONY CORPORATION, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 118 days.

(21) Appl. No.: 16/482,127

(22) PCT Filed: Mar. 9, 2018

(86) PCT No.: PCT/JP2018/009155
§ 371 (c)(1),
(2) Date: Jul. 30, 2019

(87) PCT Pub. No.: WO2018/173798
PCT Pub. Date: Sep. 27, 2018

(65) Prior Publication Data
US 2020/0020134 A1 Jan. 16, 2020

(30) Foreign Application Priority Data
Mar. 23, 2017 (JP) .............................. JP2017-058002

(51) Int. Cl.
*H04N 19/00* (2014.01)
*G06T 9/00* (2006.01)
(Continued)

(52) U.S. Cl.
CPC ........... *G06T 9/004* (2013.01); *H04N 19/117* (2014.11); *H04N 19/159* (2014.11); *H04N 19/182* (2014.11); *H04N 19/61* (2014.11)

(58) Field of Classification Search
CPC .. H04N 19/117; H04N 19/122; H04N 19/124; H04N 19/126; H04N 19/13;
(Continued)

(56) References Cited

U.S. PATENT DOCUMENTS 10,091,529 B2 * 10/2018 Lee ...................... H04N 19/184
10,694,202 B2 * 6/2020 Zhang .................... H04N 19/86
(Continued)

FOREIGN PATENT DOCUMENTS

EP 2866443 A1 * 4/2015 .......... H04N 19/134
EP 2866443 A1 4/2015
(Continued)

OTHER PUBLICATIONS

E. Alshina, G. Sullivan, J.-R. Ohm, Microsoft Corp. "JVET-E1001: Algorithm Description of Joint Exploration Test Model 5 (JEM 5)", Affiliation: Joint Video Exploration Team (JVET) of ITU-T SG 16 WP 3 and ISO/IEC JTC 1/SC 29/WG 11 5th Meeting: Geneva, CH, Jan. 12-20, 2017, p. 13 (Year: 2017).*

(Continued)

*Primary Examiner* — Li Liu
(74) *Attorney, Agent, or Firm* — Paratus Law Group, PLLC

(57) ABSTRACT

The present disclosure relates to image processing apparatus and method that can suppress a reduction of subjective image quality. A process related to hiding of predetermined data with respect to data regarding an image is executed, and hiding is skipped in a case where data in a spatial domain of the image is to be encoded. The data regarding the image for which the hiding is performed or the data regarding the image for which the hiding is skipped is encoded. The present disclosure can be applied to, for example, an image processing apparatus, an image encoding apparatus, an image decoding apparatus, and the like.

21 Claims, 59 Drawing Sheets

(51) Int. Cl.
*H04N 19/159* (2014.01)
*H04N 19/182* (2014.01)
*H04N 19/117* (2014.01)
*H04N 19/61* (2014.01)

(58) Field of Classification Search
CPC .. H04N 19/136; H04N 19/157; H04N 19/159; H04N 19/176; H04N 19/186; H04N 19/30; H04N 19/44; H04N 19/46; H04N 19/463; H04N 19/593; H04N 19/61; H04N 19/70; H04N 19/82; H04N 19/86; H04N 19/91; H04N 19/182; H04N 19/467; H04N 19/48; G06T 9/004
See application file for complete search history.

(56) References Cited

U.S. PATENT DOCUMENTS

| | | | | |
|---|---|---|---|---|
| 2013/0343448 | A1* | 12/2013 | He | H04N 19/122 375/240.03 |
| 2014/0286413 | A1* | 9/2014 | Joshi | H04N 19/593 375/240.12 |
| 2014/0362925 | A1* | 12/2014 | Nguyen | H03M 7/4018 375/240.18 |
| 2017/0048528 | A1* | 2/2017 | Filippov | H04N 19/159 |
| 2017/0374369 | A1* | 12/2017 | Chuang | H04N 19/70 |
| 2019/0037227 | A1* | 1/2019 | Holland | H04N 19/53 |
| 2019/0166370 | A1* | 5/2019 | Xiu | H04N 19/147 |

FOREIGN PATENT DOCUMENTS

| | | |
|---|---|---|
| WO | WO-2013190990 A1 | 12/2013 |
| WO | WO 2015/152757 A1 | 10/2015 |

OTHER PUBLICATIONS

Choi, et al. IEIE Transactions on Smart Processing and Computing, vol. 5, No. 5, Oct. 2016, http://dx.doi.org/10.5573/IEIESPC.2016.5.5.323, (Year: 2016).*

Chen et al., Algorithm Description of Joint Exploration Test Model 4, Joint Video Exploration Team (JVET) of ITU-T SG 16 WP 3 and ISO/IEC JTC 1/SC 29/WG 11, Oct. 15-21, 2016, pp. 1-36, 4th Meeting: Chengdu, CN.

Filippov, et al., Adaptive reference sample smoothing simplification, Joint Video Exploration Team (JVET) of ITU-T SG 16 WP 3 and ISO/IEC JTC 1/SC 29/WG 11, Feb. 20-26, 2016, pp. 1-5, 2nd Meeting: San Diego, USA.

Feb. 20, 2020, European Search Report issued for related EP Application No. 18772489.3.

* cited by examiner

FIG. 2

| case | transquant_bypass_flag (CU) | ts_flag (TB) | Residual DPCM (TB) Inter RDPCM mode | Residual DPCM (TB) Intra RDPCM mode | ARSS Data Hiding | ARSS Flag | PROBLEM |
|---|---|---|---|---|---|---|---|
| 1 | 0 | 1 | 0 | 0 | enable | Hidden | REDUCTION OF SUBJECTIVE IMAGE QUALITY |
| 2 | 0 | 1 | 1 | 0 | enable | Hidden | REDUCTION OF SUBJECTIVE IMAGE QUALITY + REDUCTION IN PREDICTION EFFICIENCY OF RDPCM |
| 3 | 0 | 1 | 0 | 1 | enable | Hidden | DEGRADATION OF SUBJECTIVE IMAGE QUALITY + REDUCTION IN PREDICTION EFFICIENCY OF RDPCM |
| 4 | 1 | 0 | 0 | 0 | enable | Hidden | LOSSLESS CODING NOT AVAILABLE |
| 5 | 1 | 0 | 1 | 0 | enable | Hidden | LOSSLESS CODING NOT AVAILABLE + REDUCTION IN PREDICTION EFFICIENCY OF RDPCM |
| 6 | 1 | 0 | 0 | 1 | enable | Hidden | LOSSLESS CODING NOT AVAILABLE + REDUCTION IN PREDICTION EFFICIENCY OF RDPCM |

FIG. 3 intra_rdpcm_enabled_flag equal to 1 specifies that the residual modification process for blocks using a transform bypass may be used for intra blocks in the CVS. intra_rdpcm_enabled_flag equal to 0 specifies that the residual modification process is not used for intra blocks in the CVS. When not present, the value of intra_rdpcm_enabled_flag is inferred to be equal to 0 inter_rdpcm_enabled_flag equal to 1 specifies that the residual modification process for blocks using a transform bypass may be used for inter blocks in the CVS. inter_rdpcm_enabled_flag equal to 0 specifies that the residual modification process is not used for inter blocks in the CVS. When not present, the value of inter_rdpcm_enabled_flag is inferred to be equal to 0 inter_rdpcm_flag [x0][y0][cIdx] specifies whether the residual modification process for blocks using a transform bypass is applied to the associated transform block or not. The array indices x0,y0 specify the location(x0, y0) of the top-left luma sample of the considered transform block relative to the top-left luma sample of the picture. The array index cIdx specifies an indicator for the colour component:it is equal to 0 for luma, equal to 1 for Cb, and equal to 2 for Cr. inter_rdpcm_flag[x0][y0][cIdx]equal to 1 specifies that the residual modification process is applied to the current transform block. inter_rdpcm_flag [x0][y0][cIdx] equal to 0 specifies that no residual modification process is applied to the current transform block. When inter_rdpcm_flag [x0][y0][cIdx] is not present, it is inferred to be equal to 0.

inter_rdpcm_dir_flag [x0][y0][cIdx] specifies the direction to be used by the residual modification process for the associated transform block. The array indices x0, y0 specify the location(x0, y0) of the top-left luma sample of the considered transform block relative to the top-left luma sample of the picture. The array index cIdx specifies an indicator for the colour component:it is equal to 0 for luma, equal to 1 for Cb, and equal to 2 for Cr.

FIG. 9

- Block and unit names in JEM
  - CTB: Coding tree block(luma or chroma)—there are three CTBs per CTU in P/B slice, and one CTB per luma CTU and two CTBs per chroma CTU in I slice.
  - CTU: Coding tree unit(synonymous with LCU, containing both luma and chroma in P/B slice, containing only luma or chroma in I slice), with a size of 16x16, 32x32, 64x64, or 128x128 for the luma component.
  - CB: Coding block, a luma or chroma block in a CU.
  - CU: Coding unit(containing both luma and chroma in P/B slice, containing only luma or chroma in I slice), a leaf node of a QTBT. It's the level at which the prediction process and residual transform are performed in JEM. A CU can be square or rectangle shape.
  - PB: Prediction block, a luma or chroma block of a PU.
  - PU: Prediction unit, has the same size to a CU.
  - TB: Transform block, a luma or chroma block of a TU.
  - TU: Transform unit, has the same size to a CU.

FIG. 21

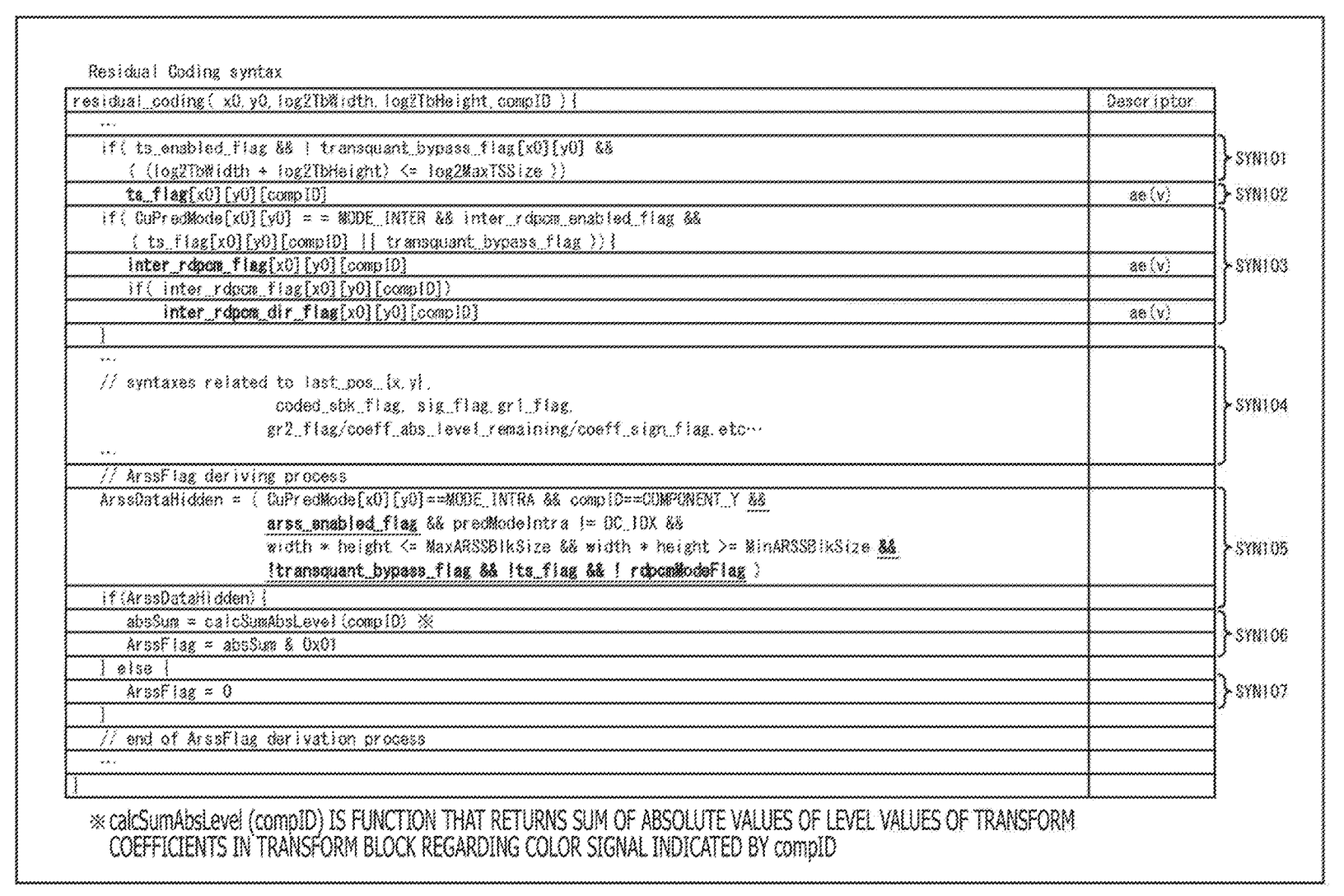

```
Residual Coding syntax
residual_coding( x0, y0, log2TbWidth, log2TbHeight, compID ) {                     Descriptor
    if( ts_enabled_flag && !transquant_bypass_flag[x0][y0] &&
        ( (log2TbWidth + log2TbHeight) <= log2MaxTSSize ) )
        ts_flag[x0][y0][compID]                                                    ae(v)
    if( CuPredMode[x0][y0] == MODE_INTER && inter_rdpcm_enabled_flag &&
        ( ts_flag[x0][y0][compID] || transquant_bypass_flag ) ) {
        inter_rdpcm_flag[x0][y0][compID]                                           ae(v)
        if( inter_rdpcm_flag[x0][y0][compID] )
            inter_rdpcm_dir_flag[x0][y0][compID]                                   ae(v)
    }
    ...
    // syntaxes related to last_pos_{x, y},
    //                        coded_sbk_flag, sig_flag, gr1_flag,
    //                        gr2_flag/coeff_abs_level_remaining/coeff_sign_flag, etc...
    ...
    // ArssFlag deriving process
    ArssDataHidden = ( CuPredMode[x0][y0]==MODE_INTRA && compID==COMPONENT_Y &&
                       arss_enabled_flag && predModeIntra != DC_IDX &&
                       width * height <= MaxARSSBlkSize && width * height >= MinARSSBlkSize &&
                       !transquant_bypass_flag && !ts_flag && !rdpcmModeFlag )
    if( ArssDataHidden ) {
        absSum = calcSumAbsLevel (compID) ※
        ArssFlag = absSum & 0x01
    } else {
        ArssFlag = 0
    }
    // end of ArssFlag derivation process
    ...
}
```

※ calcSumAbsLevel (compID) IS FUNCTION THAT RETURNS SUM OF ABSOLUTE VALUES OF LEVEL VALUES OF TRANSFORM COEFFICIENTS IN TRANSFORM BLOCK REGARDING COLOR SIGNAL INDICATED BY compID

SYN101, SYN102, SYN103, SYN104, SYN105, SYN106, SYN107

F I G. 22

| case | transquant_bypass_flag (CU) | ts_flag (TB) | Residual DPCM(TB) | | ARSS Data Hiding | ARSS Flag | EFFECT |
|---|---|---|---|---|---|---|---|
| | | | Inter RDPCM mode | Intra RDPCM mode | | | |
| 1 | 0 | 1 | 0 | 0 | disable | Inferred as 0 | IMPROVEMENT OF SUBJECTIVE IMAGE QUALITY |
| 2 | 0 | 1 | 1 | 0 | disable | Inferred as 0 | IMPROVEMENT OF SUBJECTIVE IMAGE QUALITY + IMPROVEMENT IN PREDICTION EFFICIENCY OF RDPCM |
| 3 | 0 | 1 | 0 | 1 | disable | Inferred as 0 | IMPROVEMENT OF SUBJECTIVE IMAGE QUALITY + IMPROVEMENT IN PREDICTION EFFICIENCY OF RDPCM |
| 4 | 1 | 0 | 0 | 0 | disable | Inferred as 0 | LOSSLESS CODING AVAILABLE |
| 5 | 1 | 0 | 1 | 0 | disable | Inferred as 0 | LOSSLESS CODING AVAILABLE + IMPROVEMENT IN PREDICTION EFFICIENCY OF RDCPM |
| 6 | 1 | 0 | 0 | 1 | disable | Inferred as 0 | LOSSLESS CODING AVAILABLE + IMPROVEMENT IN PREDICTION EFFICIENCY OF RDCPM |

FIG. 33

Residual Coding syntax

| residual_coding( x0, y0, log2TbWidth, log2TbHeight, compID ) { | Descriptor |
|---|---|
| ... | |
| if( ts_enabled_flag && ! transquant_bypass_flag[x0][y0] && | |
| ( (log2TbWidth + log2TbHeight) <= log2MaxTSSize ) ) | |
|   ts_flag[x0][y0][compID] | ae(v) |
| if( CuPredMode[x0][y0] == MODE_INTER && inter_rdpcm_enabled_flag && | |
| ( ts_flag[x0][y0][compID] || transquant_bypass_flag) ) { | |
|   inter_rdpcm_flag[x0][y0][compID] | ae(v) |
|   if( inter_rdpcm_flag[x0][y0][compID] ) | |
|     inter_rdpcm_dir_flag[x0][y0][compID] | ae(v) |
| } | |
| ... | |
| // syntaxes related to last_pos_(x, y), | |
|   coded_sbk_flag, sig_flag, gr1_flag, | |
|   gr2_flag/coeff_abs_level_remaining/coeff_sign_flag, etc... | |
| ... | |
| if( !ArssFlagHidden ) { //IN CASE ARSS Data Hiding IS NOT PERFORMED | |
|   explicit_arss_flag[x0][y0][compID] | ae(v) |
| } | |
| // syntaxes related to adaptive primary transform | |
| numSig = countNonZeroCoeffs(compID) | |
| if( compID == COMPONENT_Y && apt_flag[x0][y0] && | |
| !transquant_bypass_flag[x0][y0] && !ts_flag[x0][y0][compID] && | |
| log2TbWidth <= log2MaxPTSize && log2TbHeight <= log2MaxPTSize && | |
| ( (CuPredMode[x0][y0]==MODE_INTRA && numSig >= ptNumSigTH) || | |
| CuPredMode[x0][y0]==MODE_INTER) ) | |
|   pt_idx[x0][y0][compID] | ae(v) |
| } | |
| ... | |
| } | |

FIG. 34

- explicit_arss_flag [x0][y0][compID] specifies whether the adaptive reference sample smoothing is applied to the reference samples to be used for intra prediction of the current block or not.
The array indices x0, y0 specify the location (x0, y0) of the top-left luma sample of the current block relative to the top-left luma sample of the picture.
The array index compID specifies an indicator for the colour component: it is equal to 0 for luma, equal to 1 for Cb, and equal to 2 for Cr.

explicit_arss_flag [x0][y0][compID] equal to 1 specifies that the adaptive reference samples smoothing process is applied to the reference pixels to be used for intra prediction of the current block.
explicit_arss_flag [x0][y0][compID] equal to 0 specifies that no adaptive reference sample smoothing process is applied to the reference samples to be used for intra prediction for the current block.
When explicit_arss_flag [x0][y0][compID] is not present, it is inferred to be equal to 0.

FIG. 35

| case | transquant_bypass_flag (CU) | ts_flag (TB) | Residual DPCM (TB) | | ARSS Data Hiding | ARSS Flag (explicit_arss_flag) | EFFECT |
|---|---|---|---|---|---|---|---|
| | | | Inter RDPCM mode | Intra RDPCM mode | | | |
| 1 | 0 | 1 | 0 | 0 | disable | signal | IMPROVEMENT OF SUBJECTIVE IMAGE QUALITY + IMPROVEMENT IN ENCODING EFFICIENCY THROUGH CONTROL OF ARSS |
| 2 | 0 | 1 | 1 | 0 | disable | signal | IMPROVEMENT OF SUBJECTIVE IMAGE QUALITY + IMPROVEMENT IN PREDICTION EFFICIENCY OF RDPCM + IMPROVEMENT IN ENCODING EFFICIENCY THROUGH CONTROL OF ARSS |
| 3 | 0 | 1 | 0 | 1 | disable | signal | IMPROVEMENT OF SUBJECTIVE IMAGE QUALITY + IMPROVEMENT IN PREDICTION EFFICIENCY OF RDPCM + IMPROVEMENT IN ENCODING EFFICIENCY THROUGH CONTROL OF ARSS |
| 4 | 1 | 0 | 0 | 0 | disable | signal | LOSSLESS CODING AVAILABLE + IMPROVEMENT IN ENCODING EFFICIENCY THROUGH CONTROL OF ARSS |
| 5 | 1 | 0 | 1 | 0 | disable | signal | LOSSLESS CODING AVAILABLE + IMPROVEMENT IN PREDICTION EFFICIENCY OF RDPCM + IMPROVEMENT IN ENCODING EFFICIENCY THROUGH CONTROL OF ARSS |
| 6 | 1 | 0 | 0 | 1 | disable | signal | LOSSLESS CODING AVAILABLE + IMPROVEMENT IN PREDICTION EFFICIENCY OF RDPCM + IMPROVEMENT IN ENCODING EFFICIENCY THROUGH CONTROL OF ARSS |

F I G . 3 6
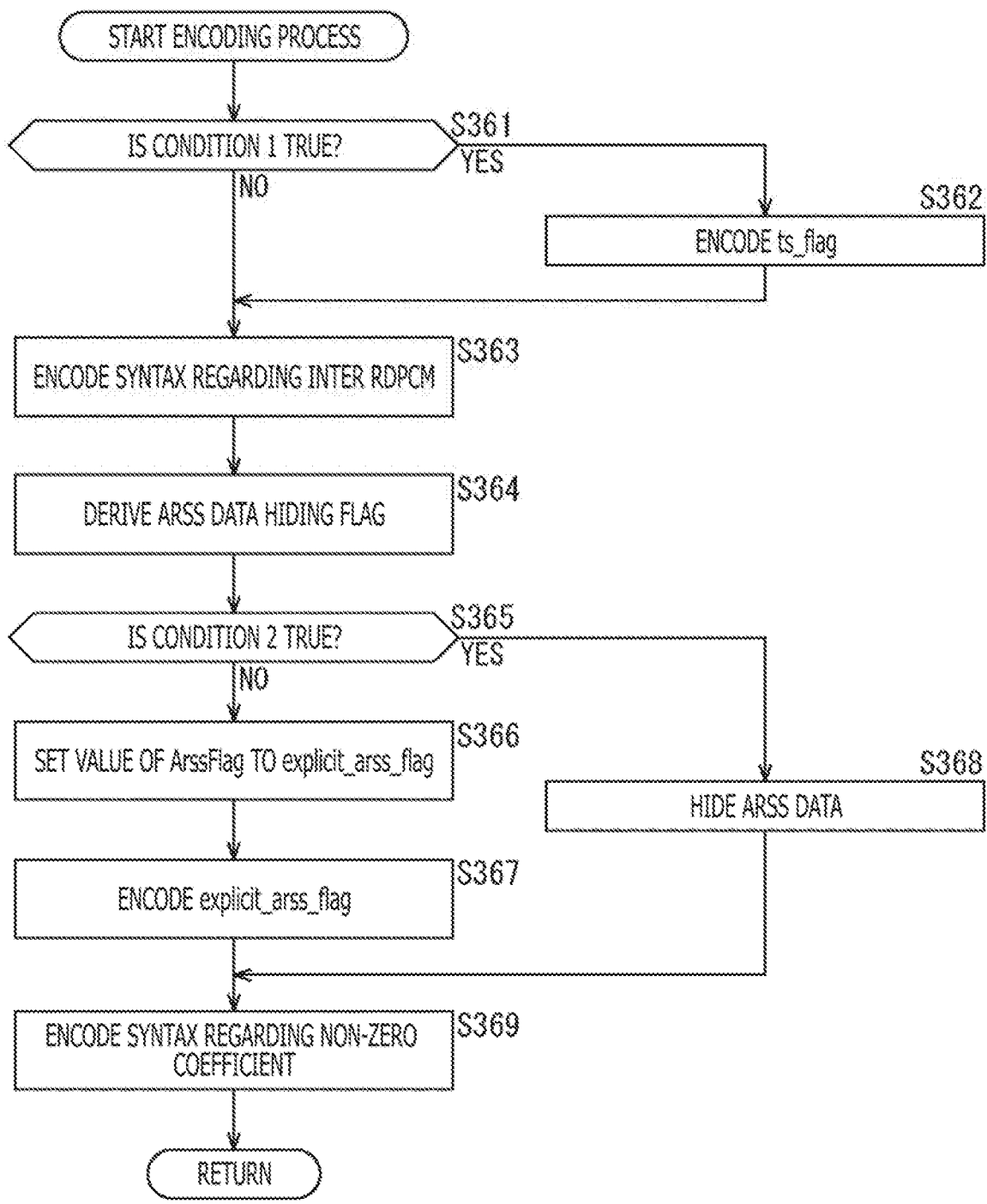

FIG. 39

```
Condition2: (Target Data Hiding)
TargetDataHidden == 1 ?

<DERIVATION OF TargetDataHidden>
TargetDataHidden=
(CuPredMode[x0][y0]==MODE_INTRA && compID==COMPONENT_Y &&
target_data_enabled_flag &&
predModeIntra != DC_IDX &&
width * height <= MaxTargetBlkSize && width * height >= MinTargetBlkSize
&& !transquant_bypass_flag && !ts_flag
&& !rdpcmModeFlag)

, where MaxTargetBlkSize=1024,MinTargetBlkSize=64
rdpcmModeFlag = (interRdpcmMode || intraRdpcmMode).

interRdpcmMode= inter_rdpcm_flag.

intraRdpcmMode=
(CuPredMode==MODE_INTRA
&& intra_rdpcm_enabled_flag==1
&& ts_flag == 1
&& (predIntraMode==HOR_IDX || predModeIntra==VER_IDX) )
```

FIG. 40

| case | transquant_bypass_flag (CU) | ts_flag (TB) | Residual DPCM (TB) | | Data Hiding | Target Data | EFFECT |
|---|---|---|---|---|---|---|---|
| | | | Inter RDPCM mode | Intra RDPCM mode | | | |
| 1 | 0 | 1 | 0 | 0 | disable | Inferred as default value | IMPROVEMENT OF SUBJECTIVE IMAGE QUALITY |
| 2 | 0 | 1 | 1 | 0 | disable | Inferred as default value | IMPROVEMENT OF SUBJECTIVE IMAGE QUALITY + IMPROVEMENT IN PREDICTION EFFICIENCY OF RDPCM |
| 3 | 0 | 1 | 0 | 1 | disable | Inferred as default value | IMPROVEMENT OF SUBJECTIVE IMAGE QUALITY + IMPROVEMENT IN PREDICTION EFFICIENCY OF RDPCM |
| 4 | 1 | 0 | 0 | 0 | disable | Inferred as default value | LOSSLESS CODING AVAILABLE |
| 5 | 1 | 0 | 1 | 0 | disable | Inferred as default value | LOSSLESS CODING AVAILABLE + IMPROVEMENT IN PREDICTION EFFICIENCY OF RDPCM |
| 6 | 1 | 0 | 0 | 1 | disable | Inferred as default value | LOSSLESS CODING AVAILABLE + IMPROVEMENT IN PREDICTION EFFICIENCY OF RDPCM |

FIG. 44

| case | transquant_bypass_flag (CU) | ts_flag (TB) | Residual DPCM (TB) Inter RDPCM mode | Residual DPCM (TB) Intra RDPCM mode | Data Hiding | Target Data | EFFECT |
|---|---|---|---|---|---|---|---|
| 1 | 0 | 1 | 0 | 0 | disable | signal | IMPROVEMENT OF SUBJECTIVE IMAGE QUALITY + IMPROVEMENT IN ENCODING EFFICIENCY THROUGH CONTROL OF ENCODING MODE BASED ON Target Data |
| 2 | 0 | 1 | 1 | 0 | disable | signal | IMPROVEMENT OF SUBJECTIVE IMAGE QUALITY + IMPROVEMENT IN PREDICTION EFFICIENCY OF RDPCM + IMPROVEMENT IN ENCODING EFFICIENCY THROUGH CONTROL OF ENCODING MODE BASED ON Target Data |
| 3 | 0 | 1 | 0 | 1 | disable | signal | IMPROVEMENT OF SUBJECTIVE IMAGE QUALITY + IMPROVEMENT IN PREDICTION EFFICIENCY OF RDPCM + IMPROVEMENT IN ENCODING EFFICIENCY THROUGH CONTROL OF ENCODING MODE BASED ON Target Data |
| 4 | 1 | 0 | 0 | 0 | disable | signal | LOSSLESS CODING AVAILABLE + IMPROVEMENT IN ENCODING EFFICIENCY THROUGH CONTROL OF ENCODING MODE BASED ON Target Data |
| 5 | 1 | 0 | 1 | 0 | disable | signal | LOSSLESS CODING AVAILABLE + IMPROVEMENT IN PREDICTION EFFICIENCY OF RDPCM + IMPROVEMENT IN ENCODING EFFICIENCY THROUGH CONTROL OF ENCODING MODE BASED ON Target Data |
| 6 | 1 | 0 | 0 | 1 | disable | signal | LOSSLESS CODING AVAILABLE + IMPROVEMENT IN PREDICTION EFFICIENCY OF RDPCM + IMPROVEMENT IN ENCODING EFFICIENCY THROUGH CONTROL OF ENCODING MODE BASED ON Target Data |

FIG. 46

```
Residual Coding syntax
residual_coding( x0, y0, log2TbWidth, log2TbHeight, compID ) {                           Descriptor
  ...
  if( ts_enabled_flag && ! transquant_bypass_flag[x0][y0] &&
      ( (log2TbWidth + log2TbHeight) <= log2MaxTSSize ))
    ts_flag[x0][y0][compID]                                                              ae(v)
  ...
  // syntaxes related to last_pos_(x,y),
         coded_sbk_flag, sig_flag, gr1_flag,
         gr2_flag/coeff_abs_level_remaining/coeff_sign_flag, etc...
  ...
  // apt_flag derivation process
  AptFlagHidden = ( CuPredMode[x0][y0]==MODE_INTRA && compID==COMPONENT_Y &&
                    apt_enabled_flag && predModeIntra != DC_IDX &&
                    width <= MaxPTSize && height <= MaxPTSize &&
                    !transquant_bypass_flag && ts_flag && rdpcmModeFlag )
  if(AptFlagHidden) {
    absSum = calcSumAbsLevel(compID)
    numSig = countNonZeroCoeffs(compID)
    apt_flag[x0][y0] = absSum & 0x01
  }
  else {
    apt_flag[x0][y0] = 0
  }
  // syntaxes related to adaptive primary transform
  if( compID == COMPONENT_Y && apt_flag[x0][y0] &&
      !transquant_bypass_flag[x0][y0] && !ts_flag[x0][y0][compID] &&
      log2TbWidth <= log2MaxPTSize && log2TbHeight <= log2MaxPTSize &&
      ((CuPredMode[x0][y0]==MODE_INTRA && numSig >= prNumSigTH) ||
       CuPredMode[x0][y0]==MODE_INTER) {
    pt_idx[x0][y0][compID]                                                               ae(v)
  }
  ...
}
```

FIG. 47

```
Residual Coding syntax
residual_coding( x0, y0, log2TbWidth, log2TbHeight, compID ) {                                    Descriptor
  ...
  if( ts_enabled_flag && ( transquant_bypass_flag[x0][y0] &&
      ( (log2TbWidth + log2TbHeight) <= log2MaxTSSize ) )
    ts_flag[x0][y0][compID]                                                                         ae(v)
  ...
  // syntaxes related to last_pos_{x,y},
  //   coded_sbk_flag, sig_flag, gr1_flag,
  //   gr2_flag/coeff_abs_level_remaining/coeff_sign_flag, etc...

// apt_flag derivation process
  AptFlagHidden = ( CuPredMode[x0][y0]==MODE_INTRA && compID==COMPONENT_Y &&
                    apt_enabled_flag && predModeIntra != DC_IDX &&
                    width (<= MaxPTSize && height (<= MaxPTSize &&
                    !transquant_bypass_flag && ts_flag && !rdpcmModeFlag )

if(!AptFlagHidden) {
    absSum = calcSumAbsLevel(compID)
    apt_flag[x0][y0] = absSum & 0x01
  }
  else {
    apt_flag[x0][y0]                                                                                ae(v)
  }

// syntaxes related to adaptive primary transform
  numsig = countNonZeroCoeffs(compID)
  if( compID == COMPONENT_Y && apt_flag[x0][y0] &&
      !transquant_bypass_flag[x0][y0] && !ts_flag[x0][y0][compID] &&
      log2TbWidth (<= log2MaxPTSize && log2TbHeight (<= log2MaxPTSize &&
      ((CuPredMode[x0][y0]==MODE_INTRA && numsig >= ptNumSigTH) ||
       CuPredMode[x0][y0]==MODE_INTER) )
  {
    pt_idx[x0][y0][compID]                                                                          ae(v)
  }
  ...
}
```

```
Residual Coding syntax
residual_coding( x0, y0, log2TbWidth, log2TbHeight, cIdx ) {                                           Descriptor
  if( ts_enabled_flag && ! transquant_bypass_flag[x0][y0] &&
      ( (log2TbWidth + log2TbHeight) <= log2MaxTSSize ))
    ts_flag[x0][y0][cIdx]                                                                              ae(v)
  ...
  // syntaxes related to last_pos_{x, y},
        coded_sbk_flag, sig_flag, gr1_flag,
        gr2_flag, coeff_abs_level_remaining, coeff_sign_flag, etc...
  ...
  // st_idx derivation process
  StIdxHidden = ( CuPredMode[x0][y0]==MODE_INTRA && cIdx==COMPONENT_Y &&
                  st_enabled_flag && predModeIntra != DC_IDX &&
                  width <= MaxPTSize && height <= MaxPTSize &&
                  !transquant_bypass_flag && !ts_flag && !rdpcmModeFlag )
  if(StIdxHidden) {
    absSum = calcSumAbsLevel(cIdx)
    OneBitOfStIdx = absSum & 0x01
  } else {
    OneBitOfStIdx = 0
  }
  // syntaxes related to adaptive primary transform
  numSig = numNonZeroCoeffs(cIdx)
  if( st_enabled_flag &&
      !transquant_bypass_flag[x0][y0] && !ts_flag[x0][y0][cIdx]
      && numSig>=stNumSigTH)
    st_idx[x0][y0][cIdx]                                                                               ae(v)
  ...
  // StIdx recover process
  StIdx[x0][y0][cIdx] = (st_idx[x0][y0][cIdx]<<1) + OneBitOfStIdx
  ...
}
```

FIG. 50

Prediction unit syntaxes

| | Descriptor |
|---|---|
| prediction_unit( x0, y0, nPbW, nPbH ) { | |
|   if( CuPredMode[x0][y0] == MODE_INTRA ) | |
|     if( isLuma ) { | |
|       prev_intra_luma_pred_flag[x0][y0] | ae(v) |
|       if( prev_intra_luma_pred_flag[x0][y0] ) | |
|         mpm_idx[x0][y0] | ae(v) |
|       else | |
|         rem_intra_luma_pred_mode[x0][y0] | ae(v) |
|     } | |
|     if( ChromaArrayType != CHROMA_400 && | |
|        ( !isLuma \|\| sliceType != I )) | |
|       intra_chroma_pred_mode[x0][y0] | ae(v) |
|   } | |
|   else { | |
|     if( cu_skip_flag[x0][y0] ) { | |
|     ···SYNTAX GROUP REGARDING INTER PREDICTION IN skip mode | |
|     } else { /* MODE_INTER */ | |
|       bNonZeroMvd = false | |
|     merge_flag[x0][y0] | ae(v) |
|     if( merge_flag[x0][y0] ) { | |
|       if( fruc_merge_mode_enabled_flag ) | |
|         fruc_merge_flag[x0][y0] | ae(v) |
|       if( fruc_merge_flag[x0][y0]) { | |
|         if (sliceType==B_SLICE) | |
|           fruc_mode_flag[x0][y0] | ae(v) |
|       } | |
|     } | |
|     if( !fruc_merge_flag[x0][y0]) { | |
|       if( isAffineMrgFlagCoded ) | |
|         affine_flag[x0][y0] | ae(v) |
|       if( MaxNumMergeCand > 1 && !affine_flag[x0][y0]) | |
|         merge_idx[x0][y0] | ae(v) |
|     } // end of if( !fruc_merge_flag[x0][y0]) | |
|   } else { // !merge_flag[x0][y0] | |

FIG. 51

Prediction unit syntaxes

| | |
|---|---|
| if( slice_type == B ) | |
|     inter_pred_idc[x0][y0] | ae(v) |
| if(nPbW > 8 && PartMode == 2Nx2N) | |
|     affine_flag[x0][y0] | ae(v) |
| if( inter_pred_idc[x0][y0] != PRED_L1 ){ | |
|   if( num_ref_idx_l0_active_minus1 > 0 ) | |
|     ref_idx_l0[x0][y0] | ae(v) |
|   mvd_coding( x0, y0, 0 ) | |
|     mvp_l0_flag[x0][y0] | ae(v) |
|   bNonZeroMvd |= ( mvL0X !=0 || mvL0Y !=0 ) | |
| } | |
| if( inter_pred_idc[x0][y0] != PRED_L0 ){ | |
|   if( num_ref_idx_l1_active_minus1 > 0 ) | |
|     ref_idx_l1[x0][y0] | ae(v) |
|   if( mvd_l1_zero_flag && | |
|     inter_pred_idc[x0][y0] == PRED_BI ){ | |
|     MvdL1[x0][y0][0] = 0 | |
|     MvdL1[x0][y0][1] = 0 | |
|   } else { | |
|     mvd_coding( x0, y0, 1 ) | |
|   } | |
|     mvp_l1_flag[x0][y0] | ae(v) |
|   bNonZeroMvd |= ( mvL1X !=0 || mvL1Y !=0 ) | |
| } | |
| } | |
| if( bNonZeroMvd && imv_enabled_flag ) | |
|   imv_flag[x0][y0] | ae(v) |
| } // end of if( merge_flag[x0][y0] ) | |
| if( ombc_enabled_flag && isOMBCFlagCoded ) | |
|   ombc_flag[x0][y0] | ae(v) |
| if( ic_enabled_flag ) | |
|   ic_flag[x0][y0] | ae(v) |
| } | |
| } | |

FIG. 52

```
Residual Coding syntax
residual_coding( x0, y0, log2TbWidth, log2TbHeight, compID ) {                                           Descriptor
...
if( ts_enabled_flag && ! transquant_bypass_flag[x0][y0] &&
    ( (log2TbWidth + log2TbHeight) <= log2MaxTSSize ) )
    ts_flag[x0][y0][compID]                                                                              ae(v)
...
// syntaxes related to last_pos_{x,y},
                            coded_sbk_flag, sig_flag, gr1_flag,
                            gr2_flag/coeff_abs_level_remaining/coeff_sign_flag, etc…
...
// TargetData derivation process
TargetDataHidden = ( CuPredMode[x0][y0]==MODE_INTRA && compID==COMPONENT_Y &&
                     target_data_enabled_flag && predModeIntra != DC_IDX &&
                     width (<= MaxTargetDataBlkSize && height (<= MaxTargetDataBlkSize &&
                     !transquant_bypass_flag && !ts_flag && | rdpcmModeFlag )
if (TargetDataHidden) {
    absSum = calcSumAbsLevel (compID)
    OneBitOfTargetData = absSum & 0x01
else {
    OneBitOfTargetData = 0
}
...
// TargetData recover process
TargetData[x0][y0] = (target_data[x0][y0][compID]<<1) + OneBitOfTargetData
...
}
```

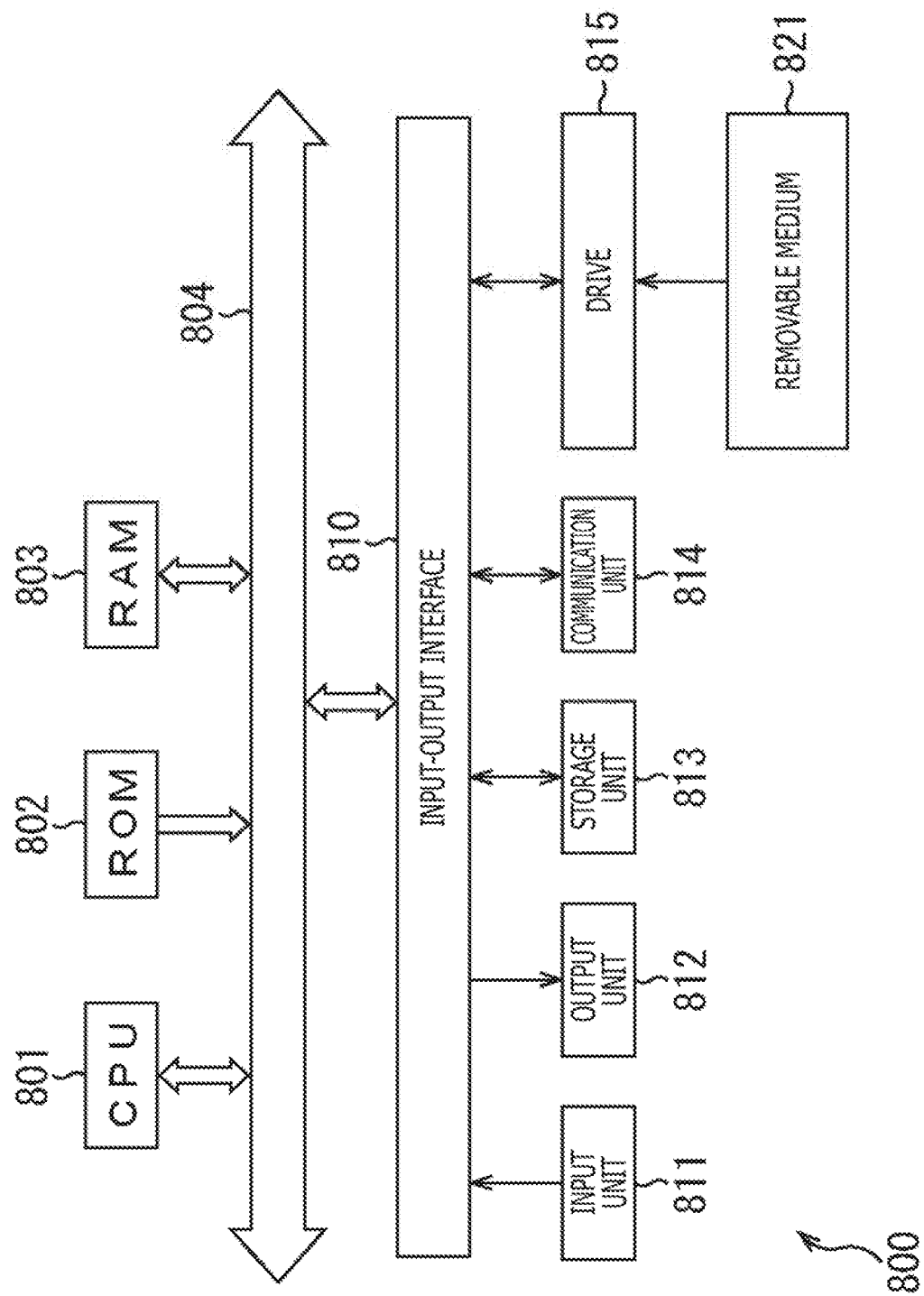

IMAGE PROCESSING APPARATUS AND METHOD

CROSS REFERENCE TO PRIOR APPLICATION

This application is a National Stage Patent Application of PCT International Patent Application No. PCT/JP2018/009155 (filed on Mar. 9, 2018) under 35 U.S.C. § 371, which claims priority to Japanese Patent Application No. 2017-058002 (filed on Mar. 23, 2017), which are all hereby incorporated by reference in their entirety.

TECHNICAL FIELD

The present disclosure relates to image processing apparatus and method, and particularly, to image processing apparatus and method that can suppress a reduction of subjective image quality.

BACKGROUND ART

In the past, there is a technique called an adaptive reference sample smoothing process (such as ARSS (Adaptive Reference Sample Smoothing) and ARSF (Adaptive Reference Sample Filtering) for improving prediction accuracy of intra prediction (for example, see NPL 1). A control flag ArssFlag indicating whether the ARSS can be applied is hidden (concealed) in data regarding a transform coefficient in a transform block and encoded (decoded).

CITATION LIST

Non Patent Literature

[NPL 1]
Jianle Chen, Elena Alshina, Gary J. Sullivan, Jens-Rainer, Jill Boyce, "Algorithm Description of Joint Exploration Test Model 4," JVET-D1001_v3, Joint Video Exploration Team (JVET) of ITU-T SG 16 WP 3 and ISO/IEC JTC 1/SC 29/WG 11 4th Meeting: Chengdu, C N, 15-21 Oct. 2016

SUMMARY

Technical Problem

However, the hiding requires correction of the transform coefficient. Therefore, reversible coding is not guaranteed when the hiding is applied. Lossless coding cannot be performed even in a case where application of the lossless coding is appropriate, and the subjective image quality of the decoded image may be lost. In addition, when the hiding is applied in a case where a transformation process is skipped (omitted), data in a spatial domain is corrected. Therefore, the subjective image quality of a decoded image may be reduced. Furthermore, when the hiding is applied, the prediction efficiency of RDPCM (Residual Differential Code Modulation) for reducing the code amount of the data in the spatial domain is reduced, and the encoding efficiency is reduced. As a result, the subjective image quality of the decoded image may be reduced.

The present disclosure has been made in view of the circumstances, and the present disclosure can suppress a reduction of subjective image quality.

Solution to Problem

An aspect of the present technique provides an image processing apparatus including: a hiding unit that executes a process related to hiding of predetermined data with respect to data regarding an image and that skips the hiding in a case where data in a spatial domain of the image is to be encoded; and an encoding unit that encodes the data regarding the image for which the hiding is performed by the hiding unit or the data regarding the image for which the hiding is skipped by the hiding unit.

The hiding unit can skip the hiding in a case where a transformation process and quantization with respect to the data regarding the image are to be skipped.

The hiding unit can skip the hiding in a case where a transformation process with respect to the data regarding the image is to be skipped.

The hiding unit can skip the hiding in a case where RDPCM (Residual Differential Code Modulation) is to be applied.

The encoding unit can encode the predetermined data in a case where the hiding unit skips the hiding.

A processing section that executes a predetermined process controlled by the predetermined data can be further included, in which the processing section is configured to execute the predetermined process according to the predetermined data in an initial state in a case where the hiding unit skips the hiding.

The predetermined data can include information regarding control of an adaptive reference sample smoothing process.

The predetermined data can include information regarding a transformation process or quantization with respect to the data regarding the image.

The predetermined data can include information regarding prediction of the image.

The aspect of the present technique provides an image processing method including: executing a process related to hiding of predetermined data with respect to data regarding an image and skipping the hiding in a case where data in a spatial domain of the image is to be encoded; and encoding the data regarding the image for which the hiding is performed or the data regarding the image for which the hiding is skipped.

Another aspect of the present technique provides an image processing apparatus including a decoding unit that decodes encoded data in which data regarding an image is encoded, executes a process related to decoding of predetermined data hidden in the data regarding the image, and skips the decoding of the predetermined data hidden in the data regarding the image in a case where the encoded data is data obtained by encoding data in a spatial domain of the image.

The decoding unit can skip the decoding of the predetermined data hidden in the data regarding the image in a case where a transformation process and quantization with respect to the data regarding the image are skipped in the encoded data.

The decoding unit can skip the decoding of the predetermined data hidden in the data regarding the image in a case where a transformation process with respect to the data regarding the image is skipped in the encoded data.

The decoding unit can skip the decoding of the predetermined data hidden in the data regarding the image in a case where RDPCM (Residual Differential Code Modulation) is applied in the encoded data.

The decoding unit can decode the predetermined data that is included in the encoded data and that is not hidden in the data regarding the image in a case where the decoding unit skips the decoding of the predetermined data hidden in the data regarding the image.

The decoding unit can set the predetermined data to an initial value in a case where the decoding unit skips the decoding of the predetermined data hidden in the data regarding the image.

The predetermined data can include information regarding control of an adaptive reference sample smoothing process.

The predetermined data can include information related to a transformation process or quantization with respect to the data regarding the image.

The predetermined data can include information regarding prediction of the image.

The other aspect of the present technique provides an image processing method including decoding encoded data in which data regarding an image is encoded, executing a process regarding decoding of predetermined data hidden in the data regarding the image, and skipping the decoding of the predetermined data hidden in the data regarding the image in a case where the encoded data is data obtained by encoding data in a spatial domain of the image.

In the image processing apparatus and method according to the aspect of the present technique, the process related to hiding of predetermined data with respect to data regarding an image is executed, and the hiding is skipped in a case where data in a spatial domain of the image is to be encoded. The data regarding the image for which the hiding is performed or the data regarding the image for which the hiding is skipped is encoded.

In the image processing apparatus and method according to the other aspect of the present technique, the encoded data in which data regarding an image is encoded is decoded, and the process regarding decoding of predetermined data hidden in the data regarding the image is executed. The decoding of the predetermined data hidden in the data regarding the image is skipped in a case where the encoded data is data obtained by encoding data in a spatial domain of the image.

Advantageous Effects of Invention

According to the present disclosure, an image can be processed. Particularly, a reduction of subjective image quality can be suppressed.

BRIEF DESCRIPTION OF DRAWINGS

FIG. 2 is a diagram illustrating an example of influence caused by application of the ARSS data hiding.

FIG. 3 is a diagram illustrating an example of semantics of RDPCM.

FIG. 9 is a diagram illustrating an example of semantics regarding blocks.

FIG. 21 is a diagram describing an example of syntax of residual_coding.

FIG. 22 is a diagram illustrating an example of setting regarding the ARSS data hiding.

FIG. 33 is a diagram describing an example of the syntax of the residual_coding.

FIG. 34 is a diagram illustrating an example of semantics.

FIG. 35 is a diagram illustrating an example of the setting regarding the ARSS data hiding.

FIG. 36 is a flow chart describing an example of a flow of as encoding process.

FIG. 39 is a diagram describing an example of syntax of a condition 2.

FIG. 40 is a diagram illustrating an example of setting regarding hiding of target data.

FIG. 44 is a diagram illustrating an example of the setting regarding the hiding of the target data.

FIG. 46 is a diagram describing an example of the syntax of the residual_coding.

FIG. 47 is a diagram describing an example of the syntax of the residual_coding.

FIG. 48 is a diagram describing an example of the syntax of the residual_coding.

FIG. 49 is a diagram describing an example of the syntax of the residual_coding.

FIG. 50 is a diagram describing an example of the syntax of Prediction Unit.

FIG. 51 is a diagram describing an example of the syntax of the Prediction Unit.

FIG. 52 is a diagram describing an example of the syntax of the residual_coding.

FIG. 53 is a block diagram illustrating a main configuration example of a computer.

DESCRIPTION OF EMBODIMENTS

Hereinafter, modes for carrying out the present disclosure (hereinafter, referred to as embodiments) will be described. Note that the embodiments will be described in the following order.
1. Data Hiding
2. First Embodiment (Image Decoding Apparatus, ARSS, Hiding Disabled, Process Disabled)
3. Second Embodiment (Image Encoding Apparatus, ARSS, Hiding Disabled, Process Disabled)
4. Third Embodiment (Image Decoding Apparatus, ARSS, Hiding Disabled, Flag Signal)
5. Fourth Embodiment (Image Encoding Apparatus, ARSS, Hiding Disabled, Flag Signal)
6. Fifth Embodiment (Image Decoding Apparatus, target_data, Hiding Disabled, Process Disabled)
7. Sixth Embodiment (Image Encoding Apparatus, target_data, Hiding Disabled, Process Disabled)
8. Seventh Embodiment (Image Decoding Apparatus, target_data, Hiding Disabled, Flag Signal)
9. Eighth Embodiment (Image Encoding Apparatus, target_data, Hiding Disabled, Flag Signal)
10. Ninth Embodiment (Example of target_data, Transform Information)
11. Tenth Embodiment (Example of target_data, Prediction Mode Information)
12. Etc.

1. Data Hiding

<ARSS>

NPL 1 provides a technique called an adaptive reference sample smoothing process (ARSS (Adaptive Reference Sample Smoothing), ARSF (Adaptive Reference Sample Filtering) or the like) for improving the prediction accuracy of intra prediction. In addition, a control flag ArssFlag indicating whether the ARSS can be applied is hidden (concealed) in data regarding a transform coefficient in a transform block and encoded (decoded) as in sign data hiding (SDH) in the HEVC (High Efficiency Video Coding). This will also be referred to as ARSS data hiding or ARSS flag hiding.

Figure 1:
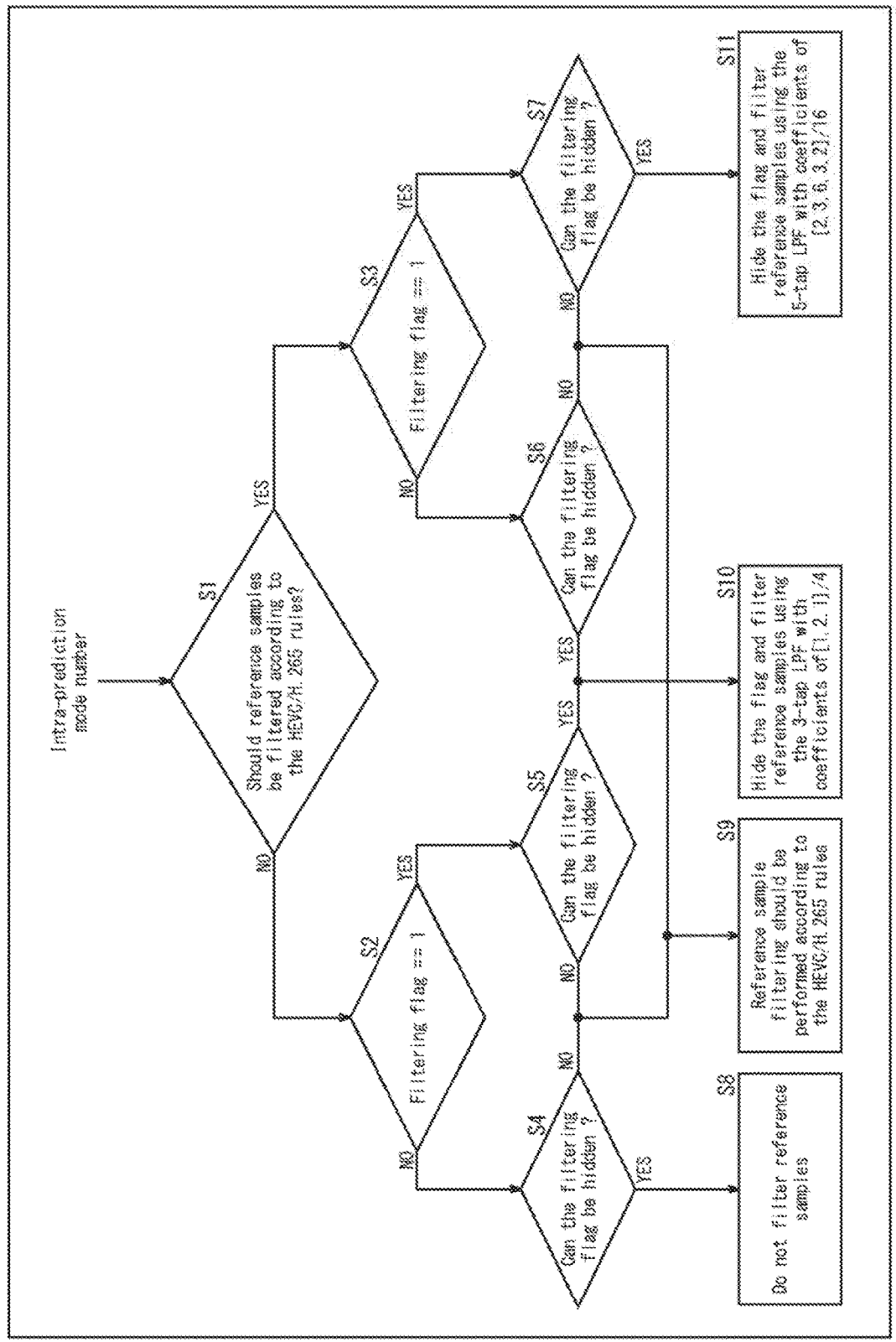
FIG. 1 is a diagram illustrating an example of a situation of replacement in ARSS data hiding.

For example, identification information (identification number) for identifying an intra prediction mode is appropriately hidden as in S8 to S11 according to determination of steps S1 to S7 in FIG. 1.

However, the ARSS data hiding requires correction of the transform coefficient, and reversible coding is not guaranteed in a case of performing lossless coding (transquant_bypass_flag==1). That is, the lossless coding cannot be performed even in a case where the lossless coding is appropriate, and the subjective image quality of the decoded image may be reduced.

Furthermore, in the hiding in the frequency domain, a coefficient of a high frequency component is modified, and the degradation of the subjective image quality is unnoticeable when the signal is returned to the spatial domain. However, in a case of performing transform skip (ts_flag==1), the residual signal in the spatial domain needs to be corrected, and the subjective image quality may be reduced.

Furthermore, in the case of performing the transform skip (ts_flag==1) or in the case of performing the transform quantization bypass (transquant_bypass_flag==1), there is a technique called residual DPCM (also referred to as RDPCM (Residual Differential Code Modulation)) for reducing the code amount of the residual signal in the spatial domain. FIG. 3 illustrates an example of the semantics of parameters regarding the RDPCM.

However, when the residual signal of the spatial domain is corrected by the ARSS data hiding in using the RDPCM, the prediction efficiency of the RDPCM may be reduced. The reduction of the prediction efficiency reduces the encoding efficiency, and as a result, the subjective image quality of the decoded image may be reduced. Furthermore, in the case of applying the transform quantization bypass and the RDPCM, the lossless coding cannot be performed even when the lossless coding is appropriate, and the subjective image quality of the decoded image may be reduced.

More specifically, the table of FIG. 2 illustrates this. For example, in Case #1 in the second row from above (in a case where the transform quantization bypass is not applied, the transform skip is applied, and the (Inter/Intra) RDPCM is not applied), the subjective image quality of the decoded image may be reduced.

Furthermore, for example, in Case #2 in the third row from above (in a case where the transform quantization bypass is not applied, the transform skip is applied, and the Inter RDPCM is applied), the subjective image quality of the decoded image may be reduced, or the prediction efficiency of the RDPCM may be reduced.

Furthermore, for example, in Case #3 of the fourth row from above (in a case where the transform quantization bypass is not applied, the transform skip is applied, and the Intra RDPCM is applied), the subjective image quality of the decoded image may be reduced, and the prediction efficiency of the RDPCM may be reduced.

Furthermore, for example, in Case #4 of the fifth row from above (in a case where the transform quantization bypass is applied, the transform skip is not applied, and the (Inter/Intra) RDPCM is not applied), the lossless coding cannot be performed even when the lossless coding is appropriate, and the subjective image quality of the decoded image may be reduced.

Furthermore, for example, in Case #5 of the sixth row from above (in a case where the transform quantization bypass is applied, the transform skip is not applied, and the inter RDPCM is applied), the lossless coding cannot be performed even when the lossless coding is appropriate. Therefore, the subjective image quality of the decoded image may be reduced, and the prediction efficiency of the RDPCM may be reduced.

Furthermore, for example, in Case #6 of the seventh row from above (in a case where the transform quantization bypass is applied, the transform skip is not applied, and the intra RDPCM is applied), the lossless coding cannot be performed even when the lossless coding is appropriate. Therefore, the subjective image quality of the decoded image may be reduced, and the prediction efficiency of the RDPCM may be reduced.

<Control of Data Hiding According to Transformation Process>

Therefore, a process related to hiding of predetermined data with respect to the data regarding an image is executed, and is a case of encoding the data in the spatial domain of the image, the hiding is skipped. The data regarding the image for which the hiding is performed or the data regarding the image for which the hiding is skipped is encoded. In this way, the reduction in the subjective image quality of the decoded image can be suppressed.

<Block Partitioning>

Meanwhile, an encoding process is executed based on a processing unit called a macroblock in a past image encoding system, such as MPEG2 (Moving Picture Experts Group 2 (ISO/IEC 13818-2)) and MPEG-4 Part10 (Advanced Video Coding, hereinafter referred to as AVC). The macroblock is a block in a uniform size of 16×16 pixels. In contrast, the encoding process is executed based on a processing unit (encoding unit) called a CU (Coding Unit) in HEVC (High Efficiency Video Coding). The CU is a block in a variable size formed by recursively partitioning an LCU (Largest Coding Unit) that is a largest encoding unit. The largest selectable size of the CU is 64×64 pixels. The smallest selectable size of the CU is 8×8 pixels. The CU in the smallest size is called an SCU (Smallest Coding Unit). Note that the largest size of the CU is not limited to 64×64 pixels, and the block size may be larger, such as 128×128 pixels and 256×256 pixels.

In this way, as a result of adopting the CU in a variable size, the image quality and the encoding efficiency can be adaptively adjusted in the HEVC according to the content of the image. A prediction process for prediction encoding is executed based on a processing unit (prediction unit) called a PU (Prediction Unit). The PU is formed by using one of some partitioning patterns to partition the CU. In addition, the PU includes processing units (prediction blocks) called PBs (Prediction Blocks) for each luma (Y) and color difference (Cb, Cr). Furthermore, an orthogonal transformation process is executed based on a processing unit (transform unit) called a TU (Transform Unit). The TU is formed by partitioning the CU or the PU up to a certain depth. In addition, the TU includes processing units (transform blocks) called TBs (Transform Blocks) for each luma (Y) and color difference (Cb, Cr).

<Recursive Partitioning of Blocks>

Figure 4:
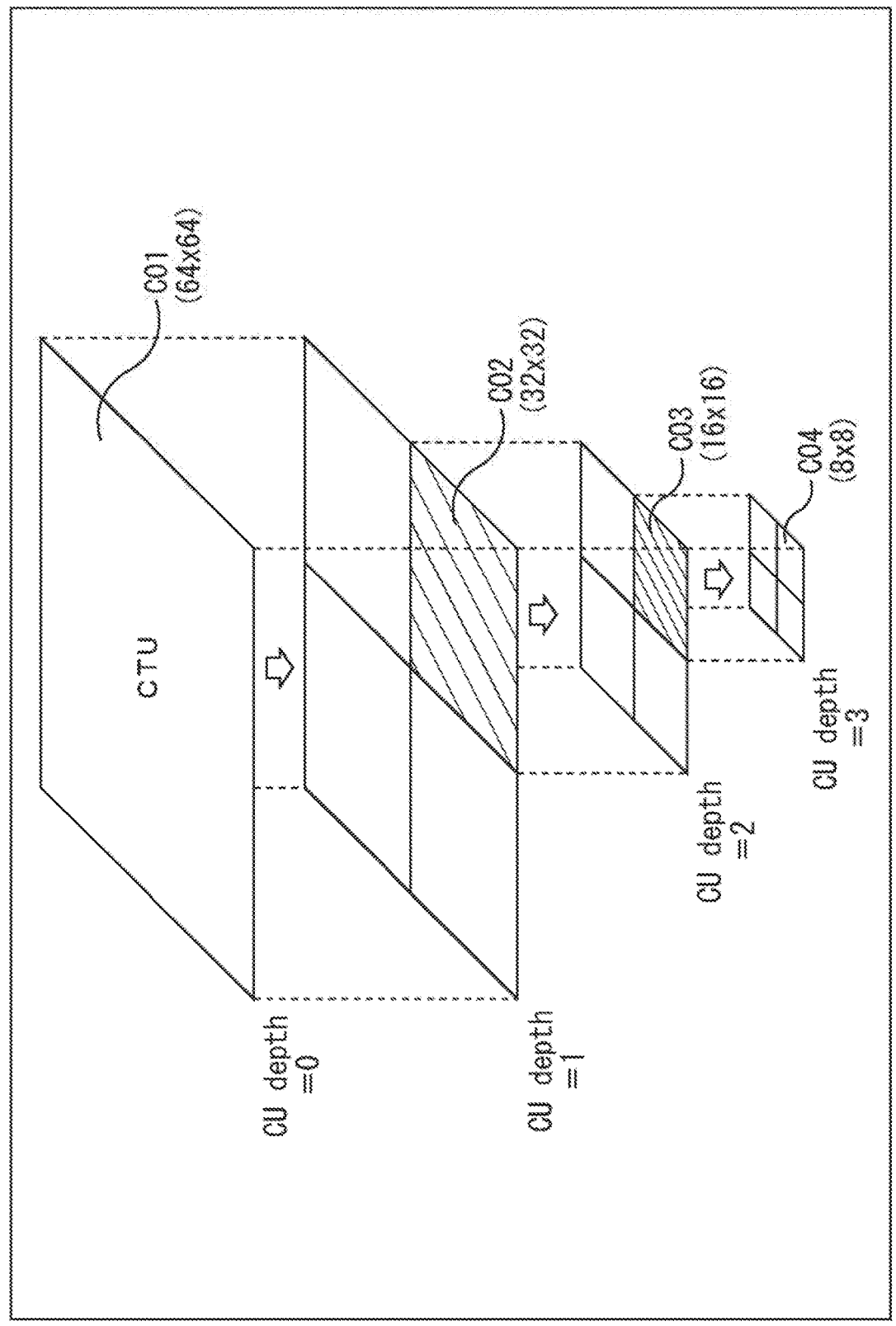
FIG. 4 is an explanatory diagram for describing an overview of recursive block partitioning regarding CU.

FIG. 4 is an explanatory diagram for describing an overview of recursive block partitioning regarding the CU in the HEVC. The block partitioning of the CU is performed by recursively repeating the partitioning of one block into four (=2×2) sub-blocks, and as a result, a tree structure in a quad-tree shape is formed. One quad-tree as a whole is called a CTB (Coding Tree Block), and a logical unit corresponding to the CTB is called a CTU (Coding Tree Unit).

In the upper part of FIG. 4, an example of C01 as a CU in a size of 64×64 pixels is illustrated. The depth of partitioning of C01 is equal to zero. This indicates that C01 is a root of the CTU and is equivalent to the LCU. The LCU size can be designated by a parameter encoded in an SPS (Sequence Parameter Set) or a PPS (Picture Parameter Set). C02 as a CU is one of the four CUs partitioned from C01 and has a size of 32×32 pixels. The depth of partitioning of C02 is equal to 1. C03 as a CU is one of the four CUs partitioned from C02 and has a size of 16×16 pixels. The depth of partitioning of C03 is equal to 2. C04 as a CU is one of the four CUs partitioned from C03 and has a size of 8×8 pixels. The depth of partitioning of C04 is equal to 3. In this way, the CU can be formed by recursively partitioning the image to be encoded. The depth of partitioning is variable. For example, a CU in a larger size (that is, smaller depth) can be set for a flat image region such as a blue sky. In contrast, a CU in a smaller size (that is, larger depth) can be set for a sharp image region including a large number of edges. In addition, each of the set CUs serves as a processing unit of the encoding process.

<Setting of PU for CU>

Figure 5:
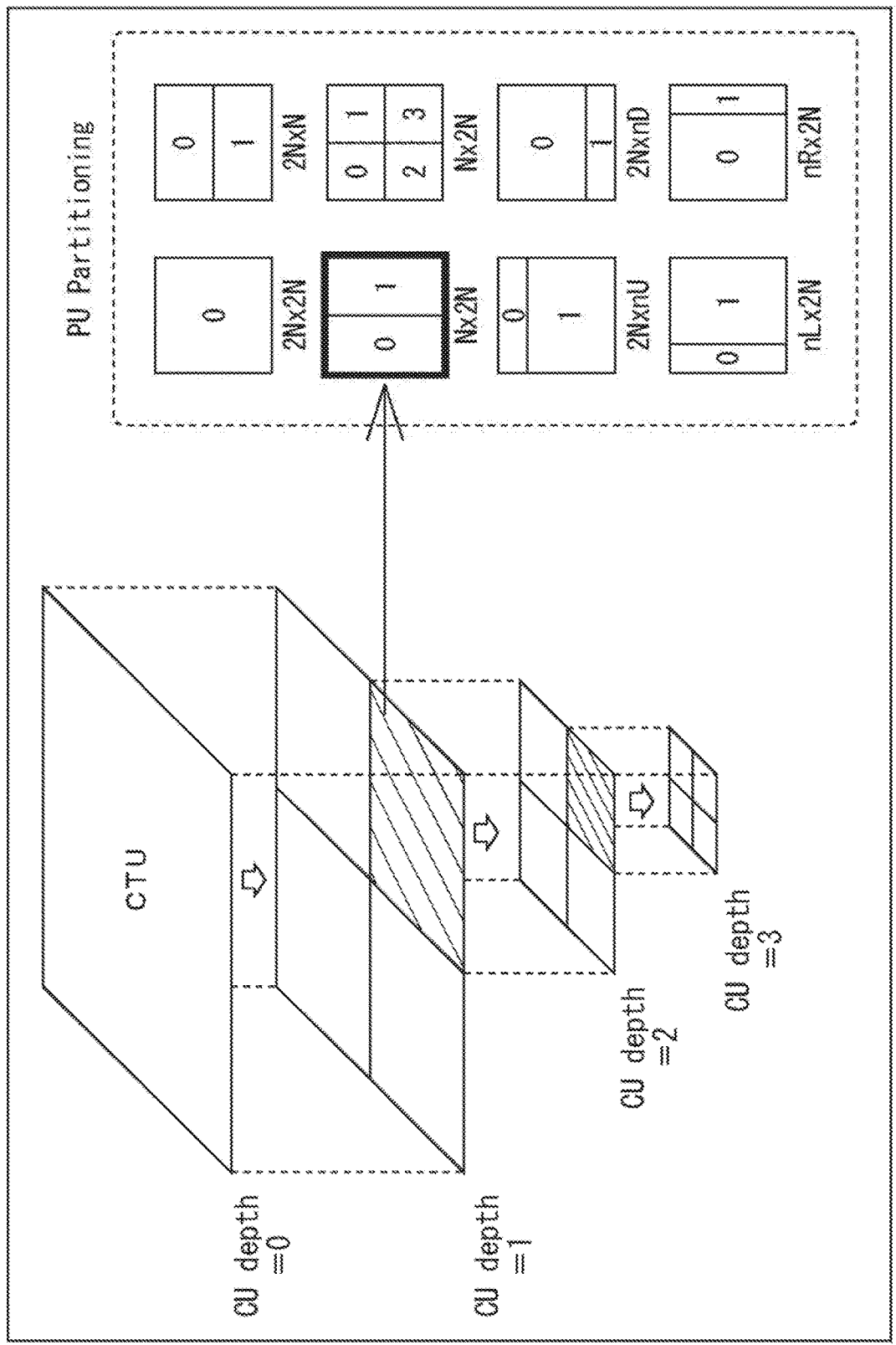
FIG. 5 is an explanatory diagram for describing setting of PU for the CU illustrated in FIG. 4.

The PU is a processing unit of the prediction process including intra prediction and inter prediction. The PU is formed by using one of some partitioning patterns to partition the CU. FIG. 5 is an explanatory diagram for describing the setting of the PU for the CU illustrated in FIG. 4. Eight types of partitioning patterns are illustrated on the right of FIG. 5 including 2N×2N, 2N×N, N×2N, N×N, 2N×nU, 2N×nD, nL×2N, and nR×2N. Two types of partitioning patterns, that is, 2N×2N and N×N, can be selected in the intra prediction (N×N can be selected only for SCU). In contrast, all of the eight types of partitioning patterns can be selected in the inter prediction in a case where asymmetric motion partitioning is enabled.

<Setting of TU for CU>

Figure 6:
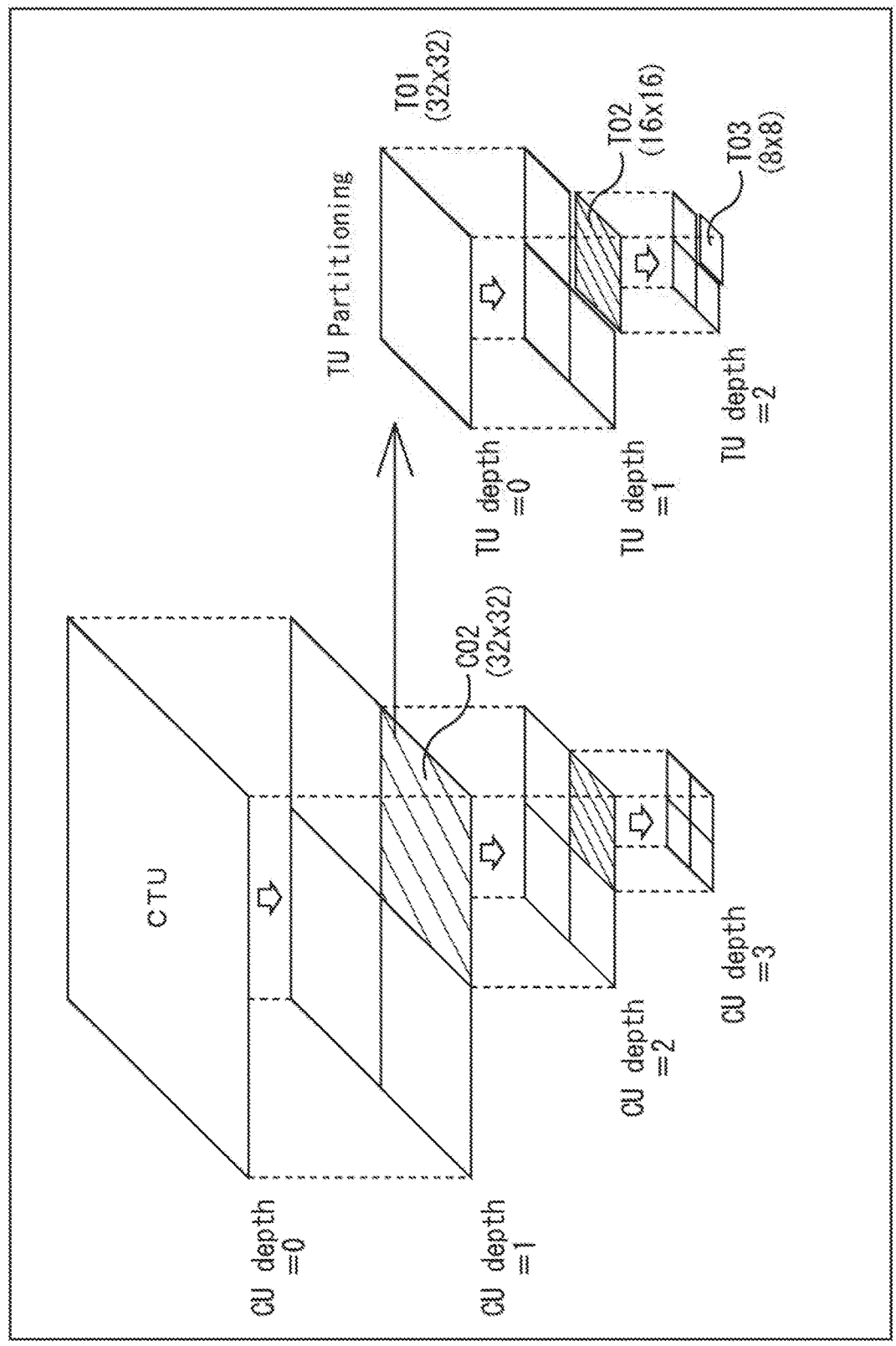
FIG. 6 is an explanatory diagram for describing setting of TU for the CU illustrated in FIG. 4.

The TU is a processing unit of the orthogonal transformation process. The TU is formed by partitioning the CU (for intra CU, each PU in the CU) up to a certain depth. FIG. 6 is an explanatory diagram for describing the setting of the TU for the CU illustrated in FIG. 5. One or more TUs that can be set for C02 are illustrated on the right of FIG. 6. For example, T01 as a TU has a size of 32×32 pixels, and the depth of the TU partitioning is equal to zero. T02 as a TU has a size of 16×16 pixels, and the depth of the TU partitioning is equal to 1. T03 as a TU has a size of 8×8 pixels, and the depth of the TU partitioning is equal to 2.

What kind of block partitioning is to be performed to set the blocks, such as the CU, the PU, and the TU described above, in the image is typically decided based on comparison of the costs that affect the encoding efficiency. For example, an encoder compares the costs between one CU with 2M×2M pixels and four CUs with M×M pixels, and if the encoding efficiency in setting four CUs with M×M pixels is higher, the encoder decides to partition the CU with 2M×2M pixels into four CUs with M×M pixels.

<Scan Order of CU and PU>

Figure 7:
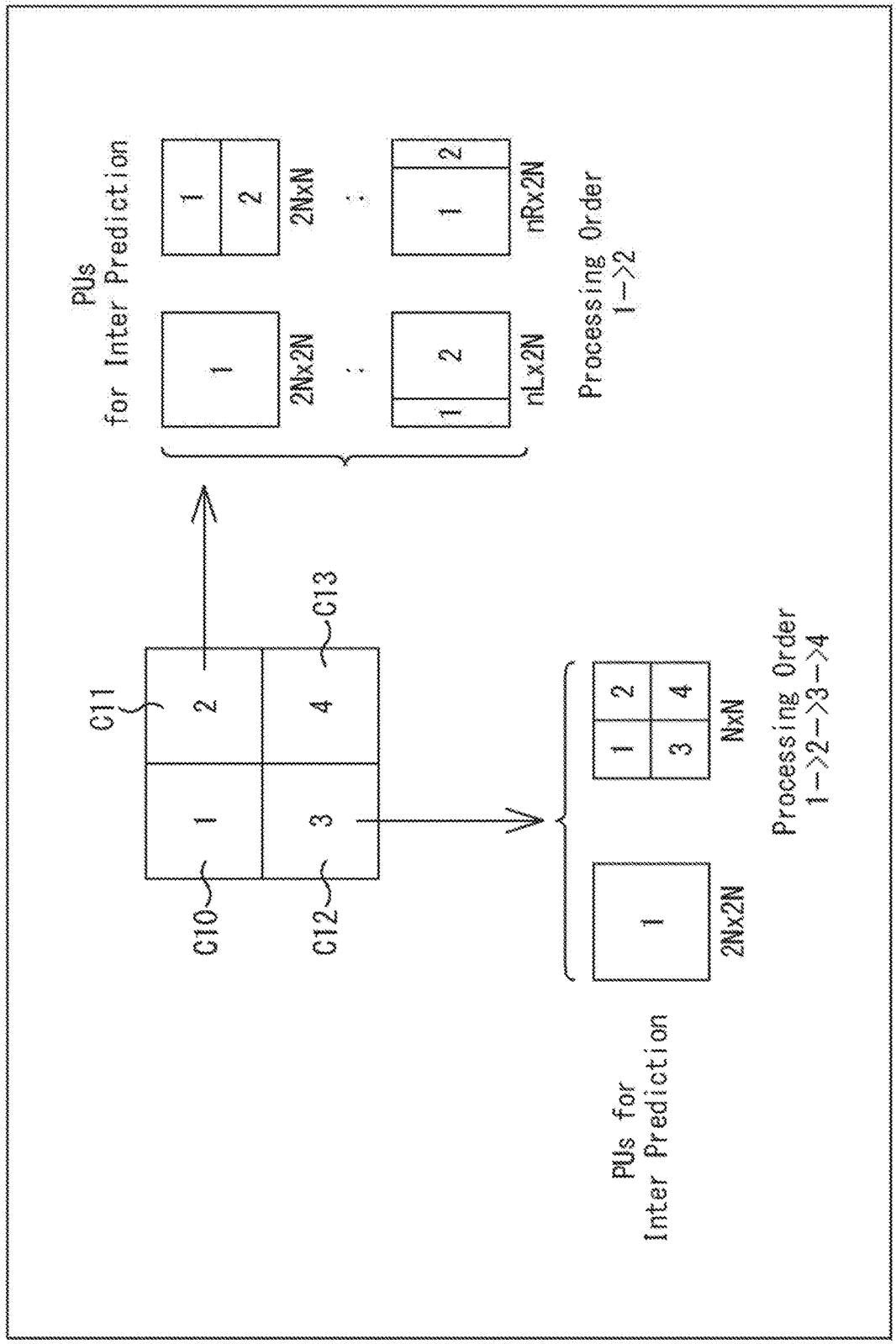
FIG. 7 is an explanatory diagram for describing a scan order of the CU/PU.

In encoding of an image, the CTBs (or LCUs) set in a grid pattern in the image (or slice or tile) are scanned in a raster scan order. In one CTB, the CUs are scanned from left to right and from top to bottom in the quad-tree. In processing of a current block, information of upper and left adjacent blocks is used as input information. FIG. 7 is an explanatory diagram for describing scanning orders of CUs and PUs. C10, C11, C12, and C13 as four CUs that can be included in one CTB are illustrated on the upper left of FIG. 7. The number in the frame of each CU expresses the processing order. The encoding process is executed in the order of C10 as a CU on the upper left, C11 as a CU on the upper right, C12 as a CU on the lower left, and C13 as a CU on the lower right. One or more PUs for inter prediction that can be set for C11 as a CU are illustrated on the right of FIG. 7. One or more PUs for intra prediction that can be set for C12 as a CU are illustrated at the bottom of FIG. 7. As indicated by the numbers in the frames of the PUs, the PUs are also scanned from left to right and from top to bottom.

In the following description, a "block" will be used as a partial region or a processing unit of an image (picture) in some cases (not a block of processing section). The "block" in this case indicates an arbitrary partial region in the picture, and the size, the shape, the characteristics, and the like are not limited. That is, the "block" in this case includes, for example, an arbitrary partial region (processing unit), such as TB, TU, PB, PU, SCU, CU, LCU (CTB), sub-block, macroblock, tile, and slice.

<Shapes of CU, PU, and TU>

Note that the block structure of the encoding and the decoding of the image data is arbitrary, and the block structure is not limited to the example described above. For example, the following QTBT (Quad tree plus binary tree) structure may be applied.

Figure 8:
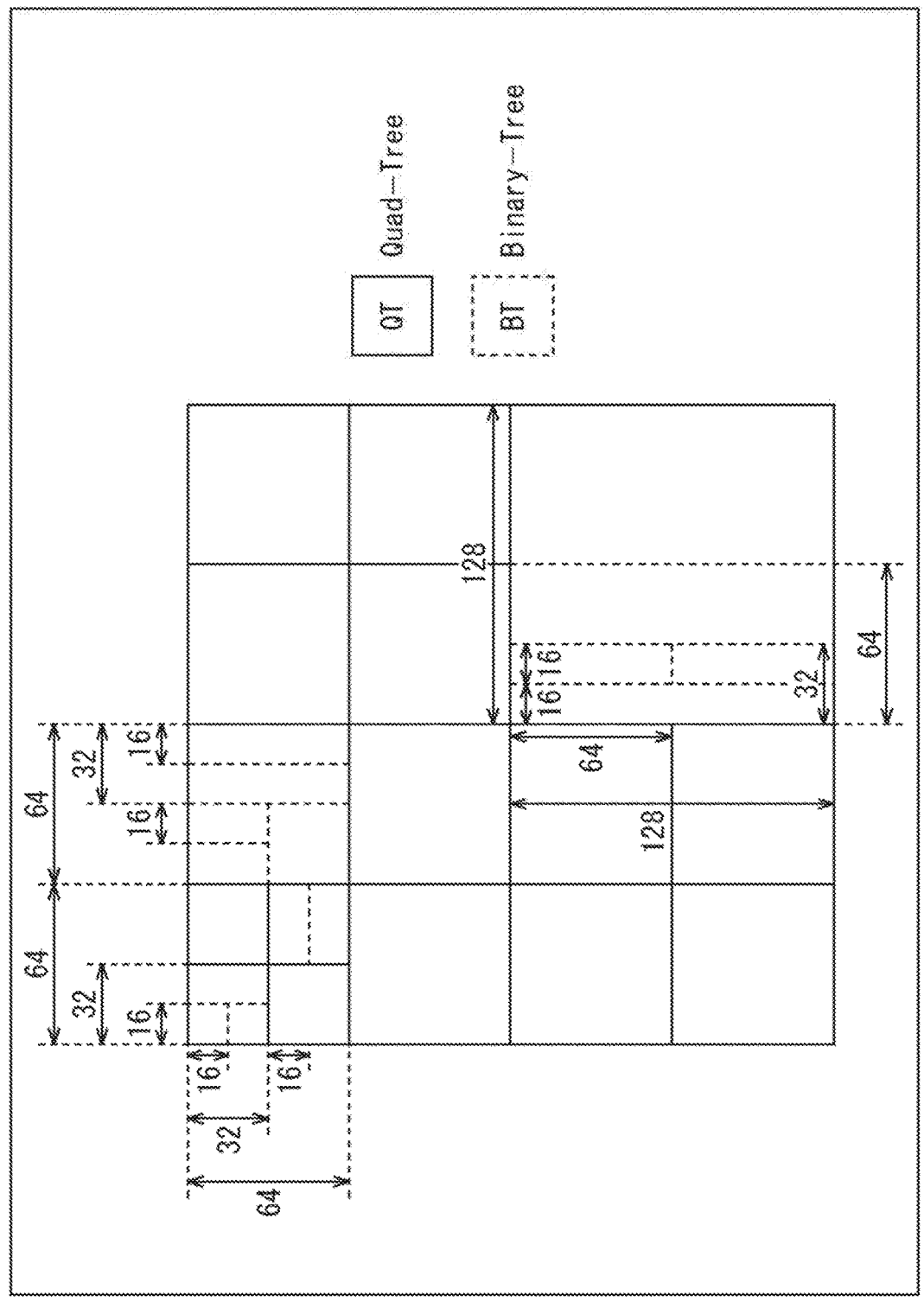
FIG. 8 is a diagram describing shapes of the CU, the PU, and the TU.

For example, the CU, the PU, and the TU (Transform Unit) illustrated in FIG. 8 are the CU, the PU, and the TU of the QTBT described in JVET-C0024, "EE2.1: Quadtree plus binary tree structure integration with JEM tools." Specifically, in the block partitioning of CU, one block can be partitioned into not only four (=2×2) sub-blocks, but also two (=1×2, 2×1) sub-blocks. That is, the block partitioning of CU is performed by recursively repeating the partitioning of one block into four or two sub-blocks, and as a result, a tree structure is formed in a quad-tree shape or in a binary-tree shape in the horizontal or vertical direction.

As a result, the shape of the CU can be not only a square, but also a rectangle. For example, in a case where the LCU (Largest Coding Unit) size is 128×128, the size of the CU (size w in the horizontal direction×size h in the vertical direction) can be not only a square size, such as 128×128, 64×64, 32×32, 16×16, 8×8, and 4×4, but also a rectangle size, such as 128×64, 128×32, 128×16, 128×8, 128×4, 64×128, 32×128, 16×128, 8×128, 4×128, 64×32, 64×16, 64×8, 64×4, 32×64, 16×64, 8×64, 4×64, 32×16, 32×8, 32×4, 16×32, 8×32, 4×32, 16×8, 16×4, 8×16, 4×16, 8×4, and 4×8 as illustrated in FIG. 8. Note that the PU and the TU are the same as the CU.

Furthermore, the TU includes a transform block of luma (Y) and a transform block of chroma (Cb/Cr). In a case where the color format is 4:2:0 (for example, YUV420), the ratio of the picture size of chroma to the picture size of luma is ½ both vertically and horizontally. Therefore, when the transform block size of luma is 8×4, the corresponding transform block size of chroma is 4×2. Furthermore, in a case where the color format is 4:2:2 (for example, YUV422), the ratio of the picture size of chroma to the picture size of luma is ½ vertically and 1 horizontally. Therefore, when the transform block size of luma is 8×4, the corresponding transform block size of chroma is 8×2. Furthermore, in a case where the color format is 4:4:4 (for example, YUV444), the ratio of the picture size of chroma to the picture size of luma is 1 vertically and 1 horizontally. Therefore, when the transform block size of lama is 8×4, the corresponding transform block size of chroma is 8×4.

Note that as for the I slice, the CU of the luma (Y) and the CU of the chroma (Cb/Cr) may be different in the encoding. In this case, the luma and the chroma can have different partitioning structures of CU, and there is an advantageous effect that the encoding efficiency of the I slice is improved. In the description below, although the same CU includes the information of the luma and the chroma for the convenience, the CU is not limited to this.

FIG. 9 illustrates an example of semantics of information regarding the blocks in the JEM. The present technique can also be applied to the image encoding and the image decoding of the QTBT structure in this way.

2. First Embodiment

<Image Decoding Apparatus>

Figure 10:
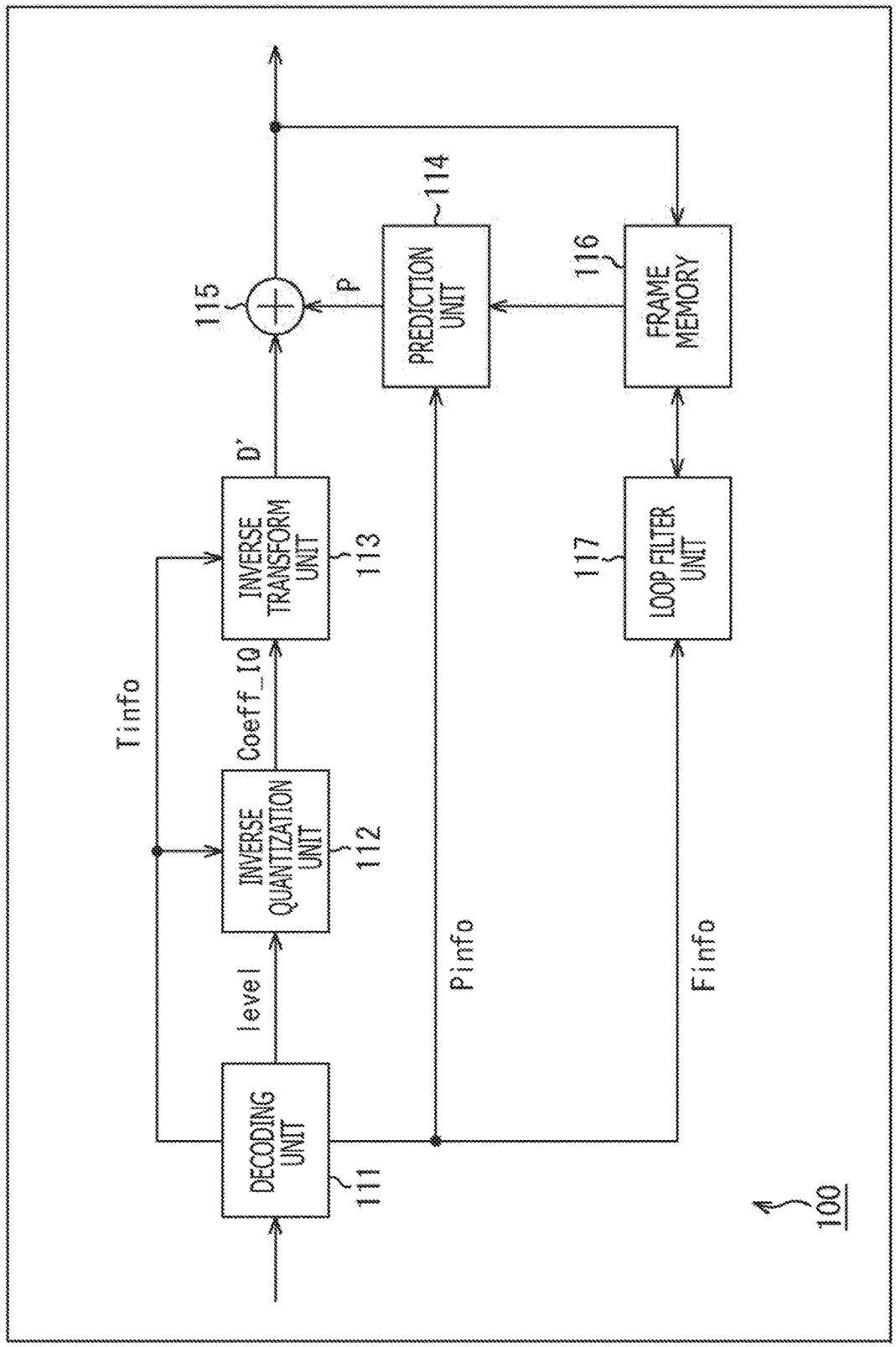
FIG. 10 is a block diagram illustrating a main configuration example of an image decoding apparatus.

FIG. 10 is a block diagram illustrating an example of a configuration of an image decoding apparatus that is an aspect of an image processing apparatus according to the present technique. An image decoding apparatus 100 illustrated in FIG. 10 is an apparatus that decodes encoded data in which a predicted residual between an image and a predicted image of the image is encoded as in the AVC and the HEVC. For example, the image decoding apparatus 100 is provided with a technique proposed in the HEVC and a technique proposed in the JVET (Joint Video Exploration Team).

In FIG. 10, the image decoding apparatus 100 includes a decoding unit 111, an inverse quantization unit 112, an inverse transform unit 113, a prediction unit 114, a computation unit 115, a frame memory 116, and a loop filter unit 117. The image decoding apparatus 100 is an apparatus that decodes input encoded data #1 (bitstream) to generate a moving image #2.

<Decoding Unit>

The decoding unit 111 executes a process regarding decoding of an image. For example, the decoding unit 111 is configured to receive the encoded data #1 and perform variable-length decoding of a syntax value of each syntax element from a bit string of the encoded data #1 according to the definition of a syntax table.

The parameters derived from the syntax element and the syntax value of the syntax element include information, such as header information Hinfo, prediction mode information Pinfo, transform information Tinfo, residual information Rinfo, and filter information Finfo. The information will be described below.

The header information Hinfo includes, for example, header information, such as VPS (Video Parameter Set)/SPS (Sequence Parameter Set)/PPS (Picture Parameter Set)/SH (Slice Header). The header information Hinfo includes, for example, information defining image size (width PicWidth, height PicHeight), bit depth (luma bitDepthY, chrome bitDepthC), maximum value MaxCUSize/minimum value MinCUSize of CU size, maximum depth MaxQTDepth/ minimum depth MinQTDepth of quad-tree division (also referred to as Quad-tree partitioning), maximum depth MaxBTDepth/minimum depth MinBTDepth of binary-tree division (Binary-tree partitioning), maximum value MaxTS- Size of transform skip block (also referred to as maximum transform skip block size), on/off flag of each encoding tool (also referred to as enabled flag), and the like.

Examples of the on/off flag of the encoding tool included in the header information Hinfo include the following on/off flags related to a transformation and quantization process. Note that the on/off flag of the encoding tool can also be interpreted as a flag indicating whether the syntax related to the encoding tool exists in the encoded data. Furthermore, in a case where the value of the on/off flag is 1 (true), the encoding tool usable. In a case where the value of the on/off flag is 0 (false), the encoding tool is unusable. Note that the interpretation of the flag value may be the other way around.

Adaptive primary transform enabled flag (apt_enabled_flag): a flag indicating whether an encoding tool (also referred to as adaptive primary transform) that can select an adaptive primary transform is usable as a transformation process and an opposite process of the transformation process (usable in a case of 1 (true), unusable is a case of 0 (false)). The flag will also be referred to as adaptive_primary_transform_enabled_flag, adaptive_pt_enabled_flag, or amt_enabled_flag.

Secondary transform enabled flag (st_enabled_flag): a flag indicating whether an encoding tool that performs secondary transform/inverse secondary transform is usable as a transformation process and an opposite process of the transformation process (usable in a case of 1 (true), unusable in a case of 0 (false)).

Transform quantization bypass enabled flag (transquant_bypass_enabled_flag): a flag indicating whether an encoding tool that skips the transform, the quantization/inverse quantization, and the inverse transform is usable as a transformation process, quantization, and an opposite process of the transformation process or the quantization (usable in a case of 1 (true), unusable in a case of 0 (false)).

Transform skip flag enabled flag (ts_enabled_flag): a flag indicating whether the following encoding tool is usable as a transformation process and an opposite process of the transformation process (usable in a case of 1 (true), unusable in a case of 0 (false)). Note that the transform skip denotes skipping the orthogonal transform including the primary transform and the secondary transform and the opposite process of the orthogonal transform (inverse orthogonal transform).

Intra RDPCM enabled flag (intra_rdpcm_enabled_flag): a flag indicating whether a residual correction process based on the RDPCM is usable in the intra CU (usable in a case of 1 (true), unusable in a case of 0 (false)). The flag will also be referred to as implicit_rdpcm_enabled_flag.

Inter RDPCM enabled flag (inter_rdpcm_enabled_flag): a flag indicating whether a residual correction process based on the RDPCM is usable in the inter CU (usable in a case of 1 (true), unusable in a case of 0 (false)). The flag will also be referred to as explicit_rdpcm_enabled_flag.

ARSS enabled flag (arss_enabled_flag): a flag indicating whether an adaptive reference sample filtering process (ARSS) is usable (usable in a case of 1 (true), unusable in a case of 0 (false)).

The prediction mode Pinfo information includes, for example, the following information.

Size information PBSize (prediction block size) of a processing target PB (prediction block).

Intra prediction mode information IPinfo (for example, prev_intra_luma_pred_flag, mpm_idx, and rem_intra_pred_mode in JCTVC-W1005, 7.3.8.5 Coding Unit syntax as well as luma intra prediction mode IntraPredModeY and chroma intra prediction mode IntraPredModeC derived from the syntax).

Motion prediction information MVinfo (for example, see JCTVC-W1005, 7.3.8.6 Prediction Unit Syntax, merge_idx, merge_flag, inter_pred_idc, ref_idx_LX, mvp_lX_flag, X={0,1}, mvd).

The transform information Tinfo includes, for example, the following information.

Width size TBWidth and height TBHeight of transform block to be processed (or may be logarithms log 2TBWidth and log 2TBHeight of TBWidth and TBHeight with 2 as a base).

Transform quantization bypass flag (transquant_bypass_flag): a flag indicating whether to skip the process of transform (inverse transform) and quantization (inverse quantization) (cu_transquant_bypass_flag in JCTVC-W1005, 7.3.8.5 Coding unit syntax).

Transform skip flag (ts_flag): a flag indicating whether to skip the primary transform (inverse primary transform) and the secondary transform (inverse secondary transform).

Adaptive primary transform flag (apt_flag): a flag indicating whether to apply the adaptive primary transform in the target block (see JVET-D1001, 2.4.1 Adaptive multiple Core transform).

Primary transform identifier (pt_idx): an identifier indicating which primary transform (inverse primary transform) is to be applied for the primary transform (inverse primary transform) in the vertical direction and the horizontal direction (see JVET-D1001, 2.4.1 Adaptive multiple Core transform).

Secondary transform identifier (st_idx): an identifier indicating which secondary transform (inverse secondary transform) is to be applied (see JVET-D1001, 2.4.2 Secondary Transforms, also called mdnsst_idx, nsst_idx, and rot_idx).

Scan identifier (scanIdx)

Quantization parameter (qp)

Quantization matrix (scaling_matrix (for example, JCTVC-W1005, 7.3.4 Scaling list data syntax))

Inter RDPCM flag (inter_rdpcm_flag): a flag indicating whether to apply a residual correction process based on the RDPCM in the inter CU (applied in a case of 1 (true), not applied in a case of 0 (false)).

Inter RDPCM direction flag (inter_rdpcm_dir_flag): indicating the scan direction to be used in the residual correction process based on the RDPCM in the inter CU. For example, the flag indicates the horizontal scan in a case of 0 and indicates the vertical scan in a case of 1.

The residual information Rinfo (for example, see 7.3.8.11 Residual Coding syntax of JCTVC-W1005) includes, for example, the following syntax.

Such as cbf (coded_block_flag): residual data presence/absence flag, last_sig_coeff_x_pos: last non-zero coefficient X coordinate, last_sig_coeff_y_pos: last non-zero coefficient Y coordinate, coded_sub_block_flag: sub-block non-zero coefficient presence/absence flag, sig_coeff_flag: non-zero coefficient presence/absence flag, gr1_flag: flag indicating whether the level of the non-zero coefficient is greater than 1 (also referred to as GR1 flag), gr2_flag: flag indicating whether the level of the non-zero coefficient is greater than 2 (also referred to as GR2 flag), sign_flag: code indicating whether the non-zero coefficient is positive or negative (also referred to as sign code), and coeff_abs_level_remaining: remaining level of the non-zero coefficient (also referred to as non-zero coefficient remaining level).

Note that hereinafter, the syntax regarding the non-zero coefficient (or also referred to as non-zero coefficient syntax) includes a syntax group regarding values of the non-zero coefficient, such as the sig_coeff_flag, the gr1_flag, the gr2_flag, the sign_flag, and the coeff_abs_level_remaining.

Filter information Finfo. The filter information Finfo includes, for example, the following control information regarding each filtering process, such as a picture subjected to each filter, information designating a region in a picture, filter On/Off control information in CUs, and filter On/Off control information regarding a boundary of a slice or a tile.

Control information regarding deblocking filter (DBF)

Control information regarding sample adaptive offset (SAO)

Control information regarding adaptive loop filter (ALF)

Control information regarding other linear and nonlinear filters

The decoding unit 111 refers to the residual information Rinfo to derive a quantization transform coefficient level "level" of each coefficient position in each transform block. In addition, the decoding unit 111 supplies, to each block, the header information Hinfo, the prediction mode information Pinfo, the quantization transform coefficient level "level," the transform information Tinfo, and the filter information Finfo obtained by decoding. Specifically, the information is supplied as follows.

The header information Hinfo is supplied to the inverse transform unit 113, the inverse quantization unit 112, the prediction unit 114, and the loop filter unit 117.

The prediction mode information Pinfo is supplied to the prediction unit 24.

The quantization transform coefficient level "level" is supplied to the inverse quantization unit 22.

The transform information Tinfo is supplied to the inverse transform unit 20 and the inverse quantization unit 22.

The filter information Tinfo is supplied to the loop filter unit 25.

The decoding unit 111 is further configured to refer to the header information Hinfo, the transform information Tinfo, and the quantization transform coefficient level "level" to decode the on/off flag ArssFlag of the adaptive reference pixel filter.

<Inverse Quantization Unit>

The inverse quantization unit 112 executes a process regarding inverse quantization. For example, the inverse quantization unit 112 is configured to receive the transform information Tinfo and the quantization transform coefficient level "level" supplied from the decoding unit 111, scale (perform inverse quantization of) the value of the quantization transform coefficient level "level" based on the transform information Tinfo, and output a transform coefficient Coeff_IQ after the inverse quantization to the inverse transform unit 113.

<Inverse Transform Unit>

The inverse transform unit 113 executes a process regarding an inverse transform. For example, the inverse transform unit 113 is configured to receive the transform coefficient Coeff_IQ and the transform information Tinfo, apply the inverse transform to the transform coefficient Coeff_IQ based on the transform information Tinfo to derive a predicted residual D', and output the predicted residual D' to the computation unit 115.

<Computation Unit>

The computation unit 115 executes a process related to addition of information regarding an image. For example, the computation unit 115 is configured to receive the predicted residual D' supplied from the inverse transform unit 113 and a predicted image P supplied from the prediction unit 114, add the predicted residual D' and the predicted image P (predicted signal) corresponding to the predicted residual D' as indicated in the following Equation (1) to derive a local decoded image $R_{local}$, and output the local decoded image $R_{local}$.

$$R_{local}=D'+P \quad (1)$$

<Prediction Unit>

The prediction unit 114 executes a process regarding generation of a predicted image. For example, the prediction unit 114 is configured to receive the predicted mode information Pinfo, use the prediction method designated in the prediction mode information Pinfo, use a decoded image R' after filtering, which is designated in the prediction mode information PInfo and stored in the frame memory 116, (or a decoded image R before filtering) as a reference image to generate a predicted image P, and output the predicted image P to the computation unit 115.

<Loop Filter Unit>

The loop filter unit 117 executes a process regarding a loop filtering process. For example, the loop filter unit 117 reads the decoded image R from the frame memory 116 and generates the decoded image R' after filtering based on the loop filtering process designated in the filter information Finfo. In addition, the loop filter unit 117 supplies the decoded image R' after filtering to the frame memory 116. Note that the loop filtering process executed by the loop filter unit 117 includes, a deblocking filter (DBF (DeBlocking Filter)), a sample adaptive offset (SAO (Sample Adaptive Offset)), an adaptive loop filter (ALF (Adaptive Loop Filter)), and other linear and nonlinear filters (such as a Wiener filter and a bilateral filter).

<Frame Memory>

The frame memory 116 executes a process related to storage of data regarding an image. For example, the frame memory 116 receives the local decoded image $R_{local}$ supplied from the computation unit 115, reconstructs the picture-based decoded image R, and stores the decoded image R in the buffer of the frame memory 116. The frame memory 116 reads the decoded image R from the buffer and supplies the decoded image R to the loop filter unit 117.

The frame memory 116 stores the decoded image R' after the loop filtering process supplied from the loop filter unit 117 in the buffer of the frame memory 116. The frame memory 116 sets the decoded image R or the decoded image R' after filtering designated on the prediction mode information Pinfo of the prediction unit 114, reads the reference image from the buffer, and supplies the reference image to the prediction unit 114. In addition, the frame memory 116 may also store, in the buffer of the frame memory, the header information Hinfo, the prediction mode information Pinfo, the transform information Tinfo, the filter information Finfo, and the like regarding the generation of the decoded image. The frame memory 116 is configured to execute various processes in this way.

<Details of Prediction Unit>

Figure 11:
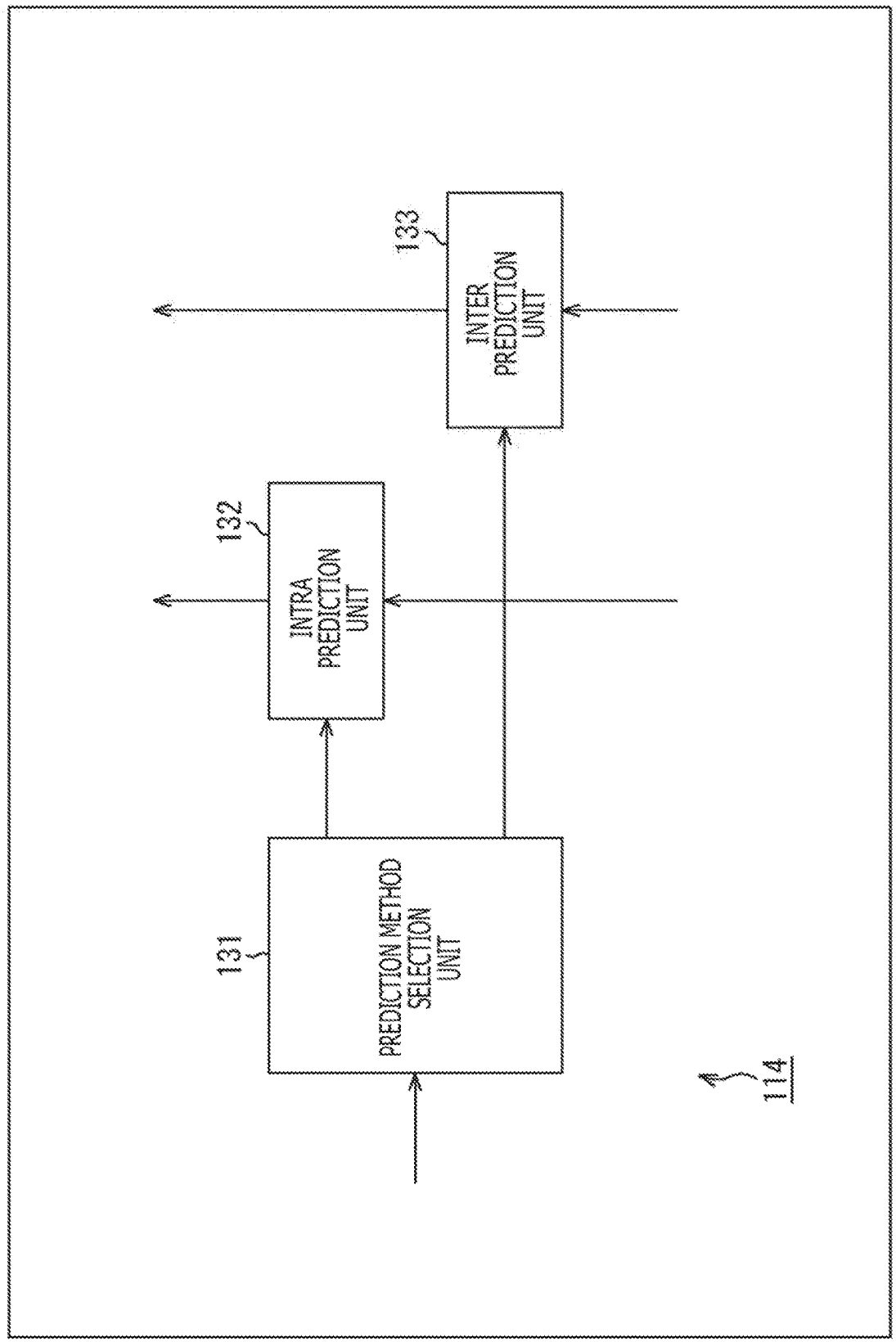
FIG. 11 is a block diagram illustrating a main configuration example of a prediction unit.

FIG. 11 is a block diagram illustrating a main configuration example of the prediction unit 114. As illustrated in FIG.

11, the prediction unit 114 includes, for example, a prediction method selection unit 131, an intra prediction unit 132, and an inter prediction unit 133.

The prediction method selection unit 131 executes a process regarding selection of a prediction method. For example, the prediction method selection unit 131 selects a prediction mode based on the prediction mode information Pinfo. That is, the prediction method selection unit 131 selects the prediction mode designated in the prediction mode information Pinfo (prediction mode applied in the encoding). For example, in a case of selecting a prediction mode of intra prediction (intra prediction mode), the prediction method selection unit 131 controls the intra prediction unit 132 to generate the predicted image in the intra prediction mode. In addition, for example, in a case of selecting a prediction mode of inter prediction (inter prediction mode), the prediction method selection unit 131 controls the inter prediction unit 133 to generate the predicted image in the inter prediction mode. The prediction method selection unit 131 is configured to execute various processes in this way.

The intra prediction unit 132 executes a process regarding intra prediction. For example, the intra prediction unit 132 reads the reference image from the frame memory 116 and uses the reference image to perform the intra prediction in the intra prediction mode designated by the prediction method selection unit 131 to generate a predicted image. The intra prediction unit 132 supplies the generated predicted image to the computation unit 115. The intra prediction unit 132 is configured to execute various processes in this way.

The inter prediction unit 133 executes a process regarding inter prediction. For example, the inter prediction unit 133 reads the reference image from the frame memory 116 and uses the reference image to perform the inter prediction in the inter prediction mode designated by the prediction method selection unit 131 to generate a predicted image. The inter prediction unit 133 supplies the generated predicted image to the computation unit 115. The inter prediction unit 133 is configured to execute various processes in this way.

<Intra Prediction Unit>

Figure 12:
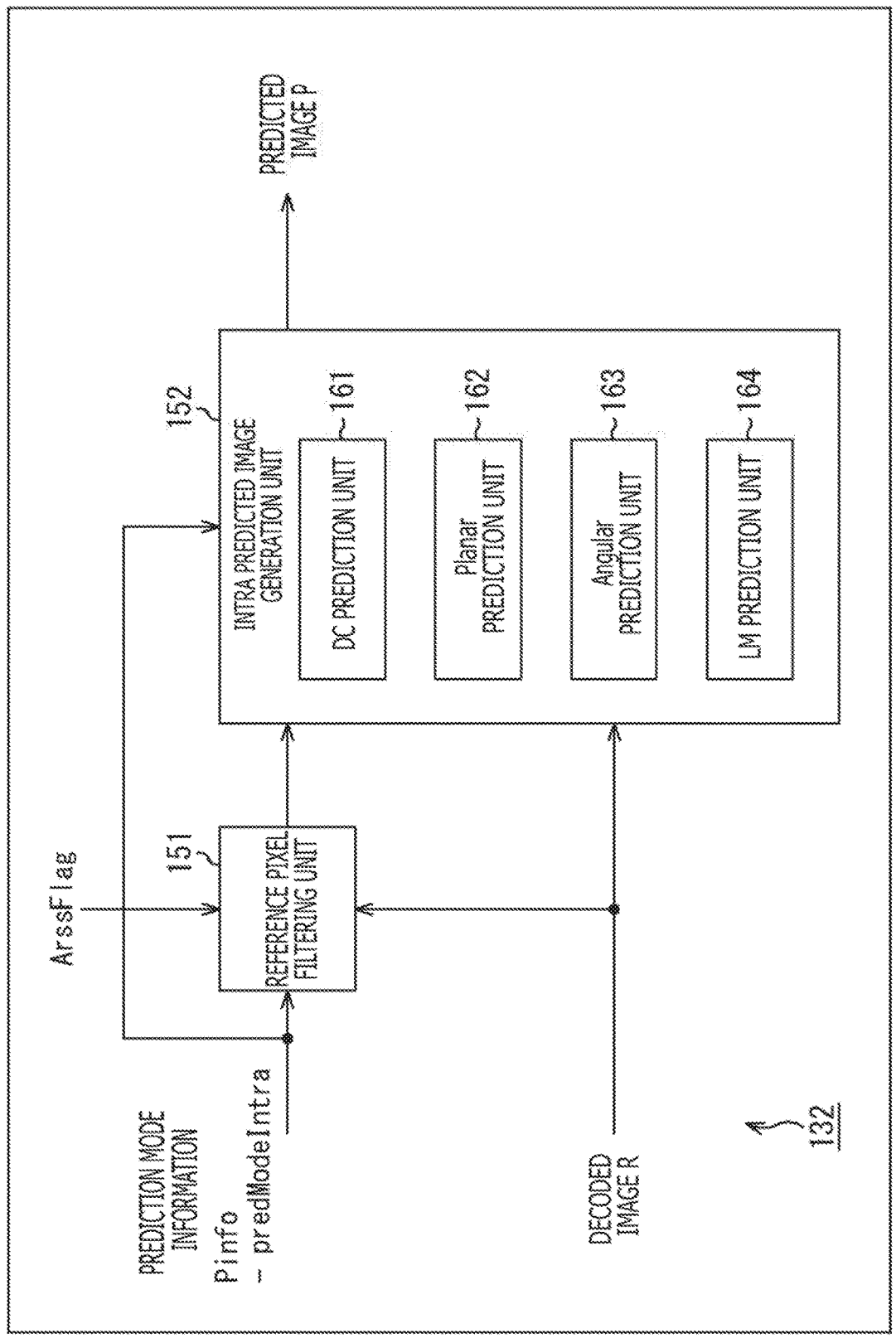
FIG. 12 is a block diagram illustrating a main configuration example of an intra prediction unit.

FIG. 12 is a block diagram illustrating a main configuration example of the intra prediction unit 132. As illustrated in FIG. 12, the intra prediction unit 132 includes, for example, a reference pixel filtering unit 151 and an intra predicted image generation unit 152.

<Reference Pixel Filtering Unit>

The reference pixel filtering unit 151 receives the prediction mode information Pinfo, the ARSS flag ArssFlag, and the decoded image R of the frame to be processed supplied from the frame memory 116. First, the reference pixel filtering unit 151 sets, as illustrated for example in FIG. 13, reference samples refSamples(x) (x=−2*width, . . . 2*width−1) used for the intra prediction of the block to be processed from the decoded image R. That is, the reference pixel filtering unit 151 acquires a surrounding pixel group 171 of the decoded image R adjacent to and above a block 170 to be processed as in the following Equation (2). In addition, the reference pixel filtering unit 151 acquires a surrounding pixel group 172 of the decoded image R adjacent to and on the left of the block 170 to be processed as in the following Equation (3), in place of a surrounding pixel group 174 of a region obtained by rotating the region of the surrounding pixel group 172 as indicated by an arrow 173.

for i in range of −1 to 2*width−1 (i=−1 . . . 2*width−1):

$$\text{refSamples}(i) = R(x0+i, y0-1) \tag{2}$$

for j in range of −2*width to −1 (j=−2*width . . . −1):

$$\text{refSamples}(j) = R(x0-1, y0+j+1) \tag{3}$$

Here, x0 and y0 are an x-coordinate and a y-coordinate of the upper left pixel of the block to be processed, respectively.

Notes: in a case where there is no decoded pixel at the generation of the reference samples refSamples(x) so that the decoded pixel cannot be referenced, one of the following methods of [1] to [4] is used to set the reference samples refSamples(x).

[1] In a case where pixels of R(x0+i, y0−1) corresponding to i=width . . . 2*width−1 cannot be referenced, a pixel of, for example, R(x0+width−1, y0−1) is set for refSamples(i).

[2] In a case where pixels of R(x0−1, y0+j+1) corresponding to j=−2*width . . . −width cannot be referenced, a pixel of, for example, R(x0−1, y0−width+1) is set for refSamples(j).

[3] In a case where pixels of R(x0+i, y0−1) corresponding to i=−1 . . . width−1 cannot be referenced, a value of, for example, 1<<(bitDepth−1) is set for refSamples(i).

[4] In a case where pixels of R(x0, y0+j+1) corresponding to j=−width . . . −1 cannot be referenced, a value of, for example, 1<<(bitDepth−1) is set for refSamples(j).

Subsequently, the reference pixel filtering unit 151 refers to the ARSS flag ArssFlag and the intra prediction mode predModeIntra to select a filter f to be used in the adaptive pixel filtering process.

The reference pixel filtering unit 151 uses the selected filter f to smooth the reference samples refSamples(x) (x=−2*width, . . . 2*width−1) as in the following Equation (4) to generate refSamples'(x) after filtering.

$$\text{refSamples}' = f * \text{refSamples} \tag{4}$$

An operator "*" in Equation (4) represents a convolution operation. Note that in a case where the filter is not referenced (filter is not applied), refSamples(x) before filtering is set for refSample'(x) as in the following Equation (5).

$$\text{refSamples}'(x) = \text{refSamples}(x)(x=-2*\text{width}, \ldots 2*\text{width}-1) \tag{5}$$

The reference pixel filtering unit 151 outputs the reference samples refSamples'.

<Intra Predicted Image Generation Unit>

The intra predicted image generation unit 152 receives the reference samples refSamples' and the prediction mode information Pinfo and uses the prediction method corresponding to the intra prediction mode preModeIntra to thereby generate the predicted image P from the reference samples refSamples' and output the predicted image P. The intra predicted image generation unit 152 includes a DC prediction unit 161, a Planar prediction unit 162, an Angular prediction unit 163, and an LM prediction unit 164.

Figure 14:
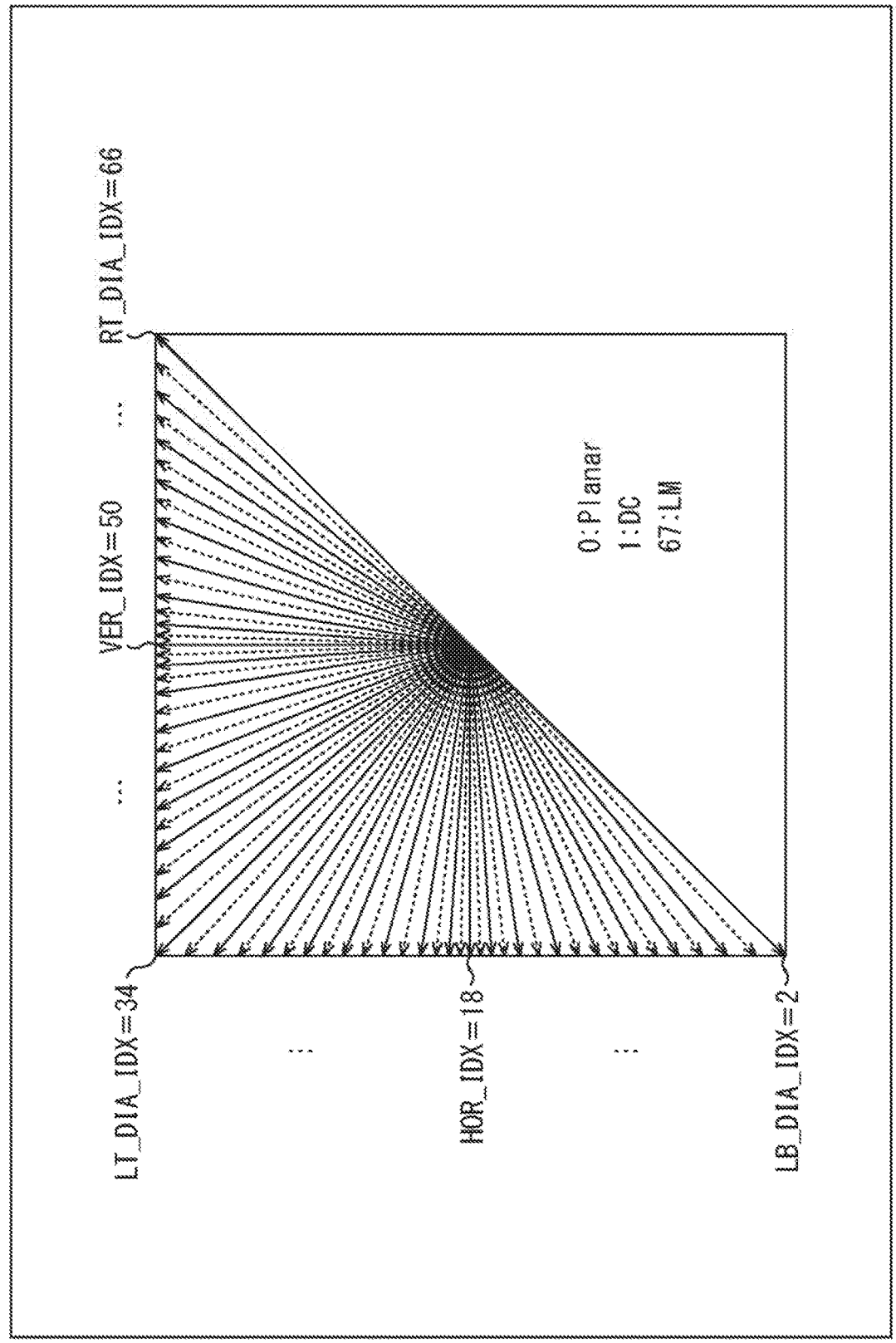
FIG. 14 is a diagram illustrating an example of a situation of Angular prediction.

In a case where the intra prediction mode preModeIntra indicates DC prediction, the DC prediction unit 161 generates a DC predicted image and outputs the DC predicted image as the predicted image P. In a case where the intra prediction mode predModeIntra indicates Planar prediction, the Planar prediction unit 162 generates a Planar predicted image and outputs the Planar predicted image as the predicted image P. In a case where the intra prediction mode predModeIntra indicates Angular prediction, the Angular prediction unit 163 generates an Angular predicted image and outputs the Angular predicted image as the predicted image P. In a case where the intra prediction mode predModeIntra indicates LM prediction, the LM prediction unit 164 generates an LM predicted image and outputs the LM predicted image as the predicted image P. FIG. 14 illustrates an example of identification numbers allocated to the intra prediction modes.

<Decoding Unit>

Figure 13:
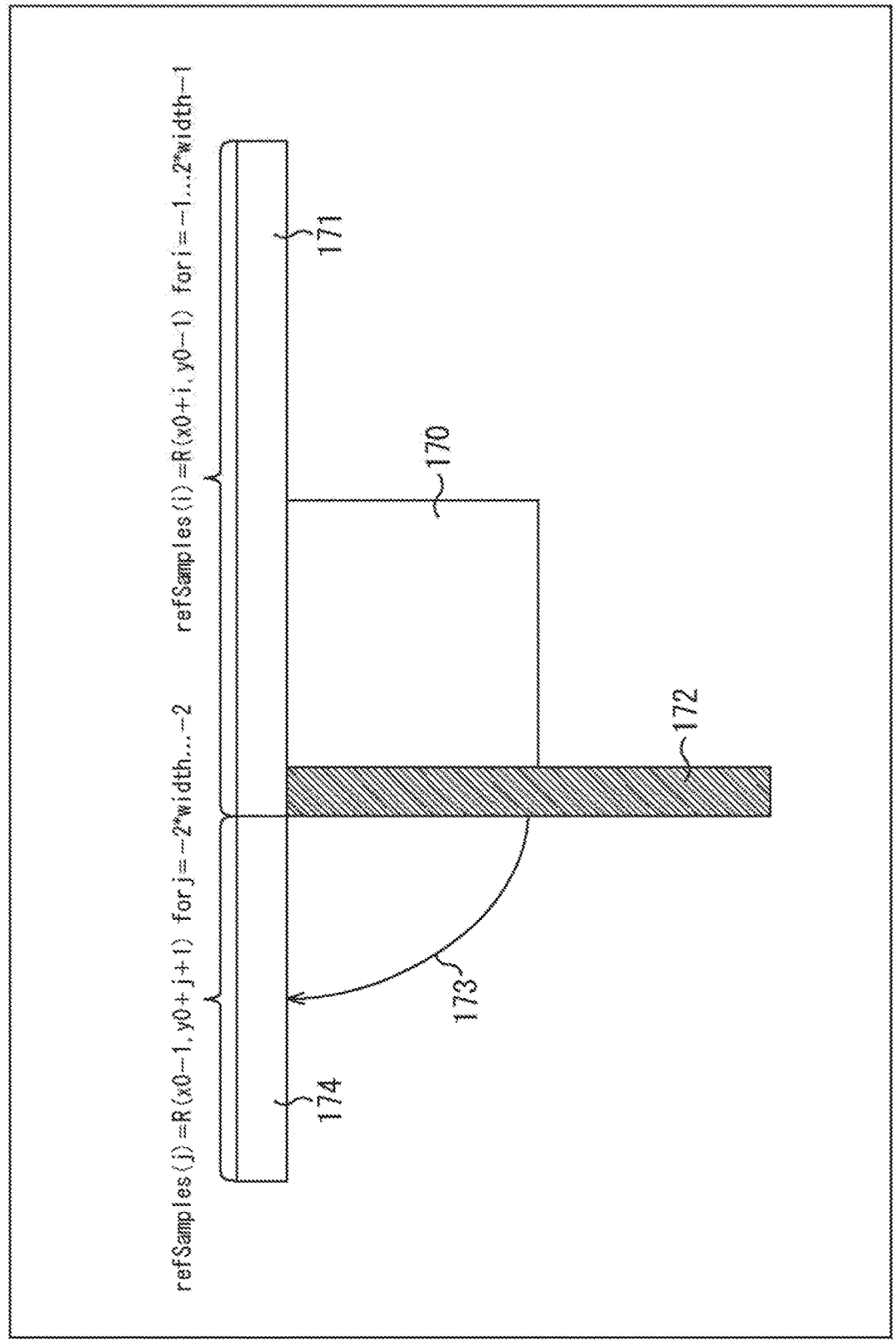
FIG. 13 is a diagram illustrating an example of a situation of reference sample setting.
Figure 15:
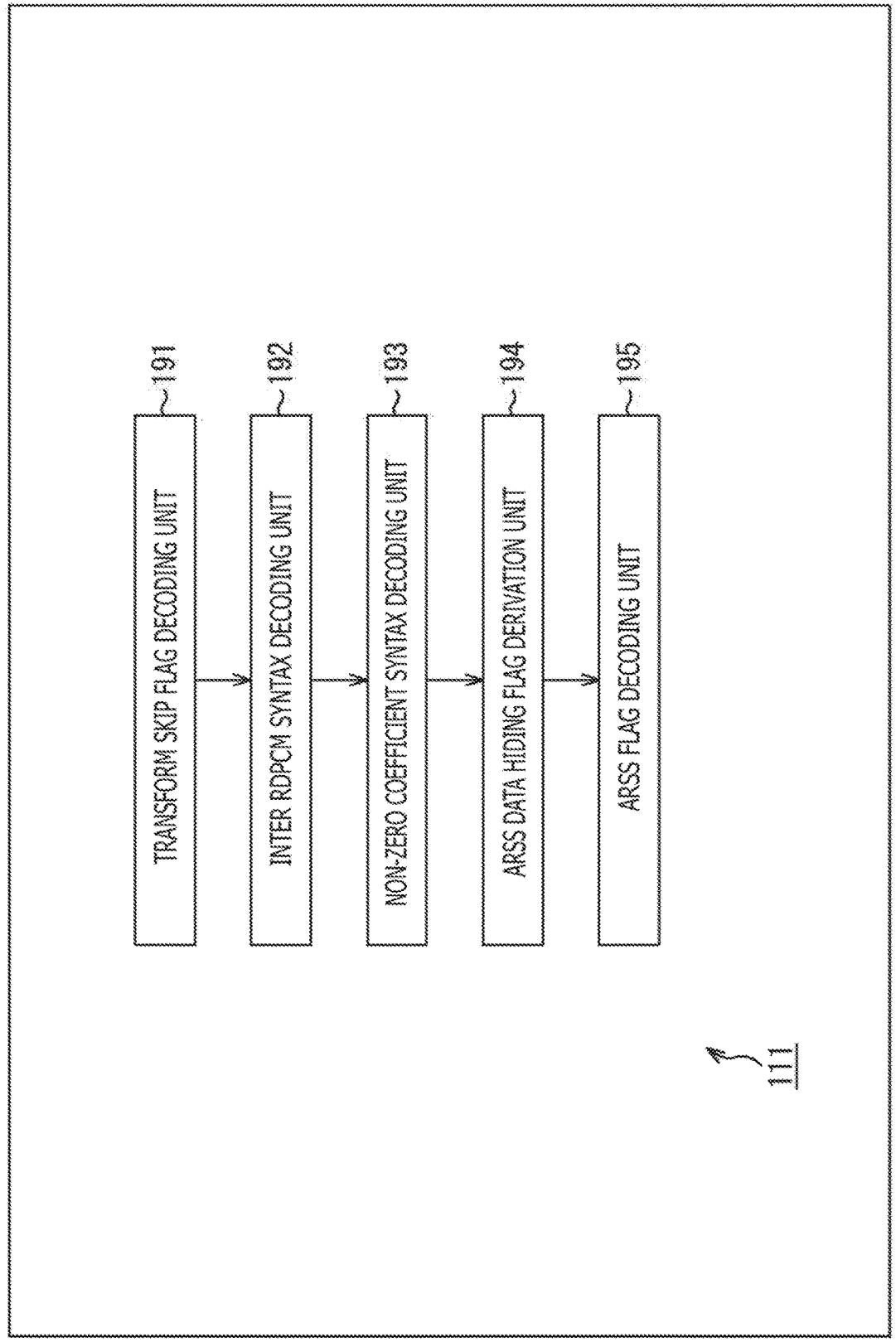
FIG. 15 is a block diagram illustrating a main configuration example of a decoding unit.

FIG. 13 is a block diagram illustrating a main configuration example of the decoding unit 111. As illustrated in FIG. 15, the decoding unit 111 includes a transform skip flag decoding unit 191, an inter RDPCM syntax decoding unit 192, a non-zero coefficient syntax decoding unit 193, an ARSS data hiding flag derivation unit 194, and an ARSS flag decoding unit 195. The transform skip flag decoding unit 191 is configured to execute a process regarding decoding of the transform skip flag (ts_flag). The inter RDPCM syntax decoding unit 192 is configured to execute a process related to decoding of the syntax regarding the inter RDPCM. The non-zero coefficient syntax decoding unit 193 is configured to execute a process related to decoding of the syntax regarding the non-zero coefficient. The ARSS data hiding flag derivation unit 194 is configured to execute a process regarding derivation of the ARSS data hiding flag indicating whether to hide the ARSS flag. The ARSS flag decoding unit 195 is configured to execute a process regarding decoding of the ARSS flag indicating whether to apply the ARSS.

<Flow of Image Decoding Process>

Next, the process executed by the image decoding apparatus 100 configured in this way will be described. The image decoding apparatus 100 executes an image decoding process to execute, for example, a process related to decoding of encoded data in which the data regarding the image supplied from the encoding side is encoded.

Once the image decoding process is started, the decoding unit 111 decodes the input encoded data (bitstream) to acquire the data regarding the image in step S101. The data regarding the image is quantized. That is, a quantized coefficient is obtained. In step S102, the inverse quantization unit 112 applies inverse quantization that is the opposite process of the quantization performed on the encoding side to the quantized coefficient obtained in step S101 and obtains the transform coefficient Coeff_IQ.

In step S103, the inverse transform unit 113 applies an inverse transformation process that is the opposite process of the transformation process executed on the encoding side to the transform coefficient Coeff_IQ obtained in the process of step S102 and obtains the predicted residual D'. In step S104, the prediction unit 114 executes a prediction process and refers to the reference image stored in the frame memory 116 to generate the predicted image P by using the prediction method designated on the encoding side.

In step S105, the computation unit 115 adds the predicted residual D' obtained in the process of step S103 and the predicted image P obtained in the process of step S104 as in Equation (1) to derive the local decoded image $R_{local}$. The computation unit 115 outputs the local decoded image $R_{local}$ as a decoded image.

Furthermore, in step S106, the frame memory 116 stores the local decoded image $R_{local}$ obtained in the process of step S105. In step S107, the loop filter unit 117 applies a predetermined filtering process to the local decoded image stored in the frame memory 116. Note that the local decoded image after filtering is stored in the frame memory 116.

When the process of step S107 is finished, the image decoding process ends.

<Flow of Prediction Process>

Next, an example of a flow of the prediction process executed in step S104 of FIG. 16 will be described with reference to a flow chart of FIG. 17.

Once the prediction process is started, the prediction method selection unit 131 of the prediction unit 114 selects a prediction method based on the prediction mode information Pinfo or the like supplied from the encoding side in step S111. In step S112, the prediction method selection unit 131 determines whether the selected prediction mode is the intra prediction mode. In a case where the prediction method selection unit 131 determines that the intra prediction is selected, the process proceeds to step S113.

In step S113, the intra prediction unit 132 executes an intra prediction process and performs intra prediction to generate a predicted image. When the process of step S113 is finished, the prediction process ends, and the process returns to FIG. 16.

In addition, in a case where the prediction method selection unit 131 determines that the inter prediction mode is selected in step S112, the process proceeds to step S114. In step S114, the inter prediction unit 133 performs inter prediction to generate a predicted image. When the process of step S114 is finished, the process ends, and the process returns to FIG. 16.

<Flow of Intra Prediction Process>

Next, an example of a flow of the intra prediction process executed in step S113 of FIG. 17 will be described with reference to a flow chart of FIG. 18. Once the intra prediction process is started, the reference pixel filtering unit 151 sets the reference samples refSamples from the decoded image R in step S121.

In step S122, the reference pixel filtering unit 151 executes a filter selection process and selects the filter f to be applied to the reference samples refSamples based on the prediction mode information Pinfo and the ARSS flag ArssFlag.

In step S123, the reference pixel filtering unit 151 performs a convolution operation of the selected filter f and the reference samples refSamples to generate the reference samples refSamples' after filtering and supplies the reference samples refSamples' after filtering to the intra predicted image generation unit 152.

In step S124, the intra predicted image generation unit 152 uses the prediction method corresponding to the intra prediction mode predModeIntra to generate the predicted image P based on the reference samples refSamples' and outputs the predicted image P.

Figure 17:
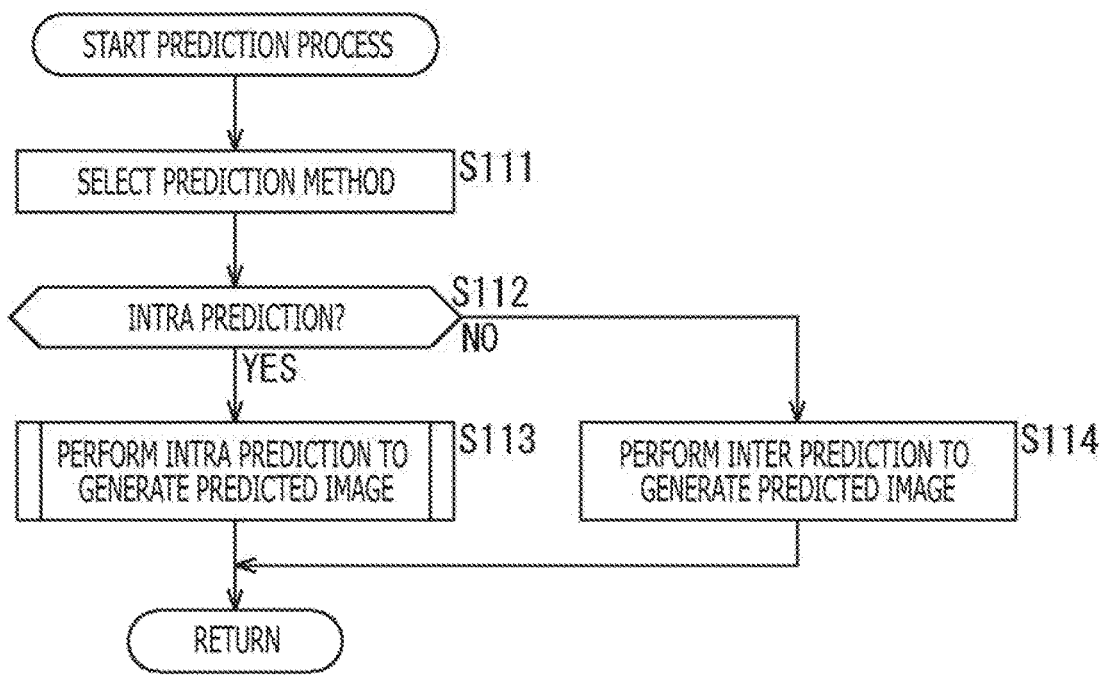
FIG. 17 is a flow chart describing an example of a flow of a prediction process.
Figure 18:
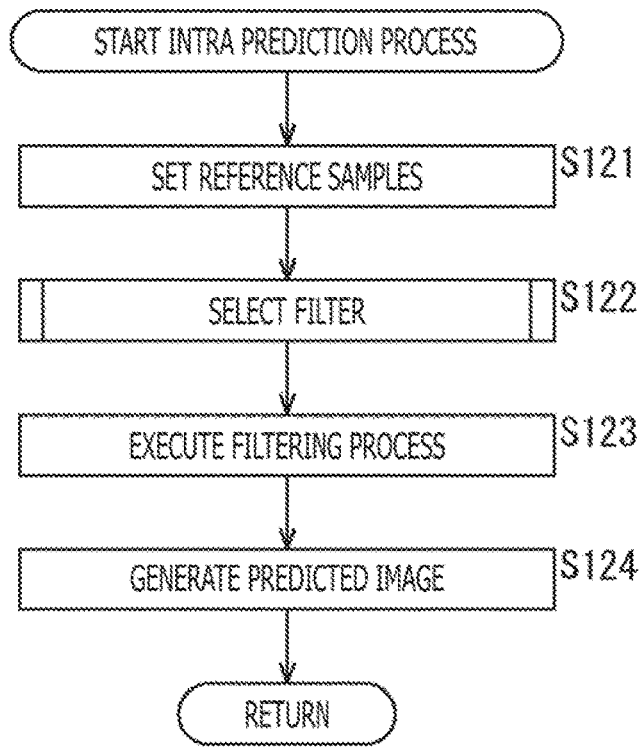
FIG. 18 is a flow chart describing an example of flow of an intra prediction process.

When the process of step S124 is finished, the intra prediction process ends, and the process returns to FIG. 17.

<Flow of Filter Selection Process>

Figure 19:
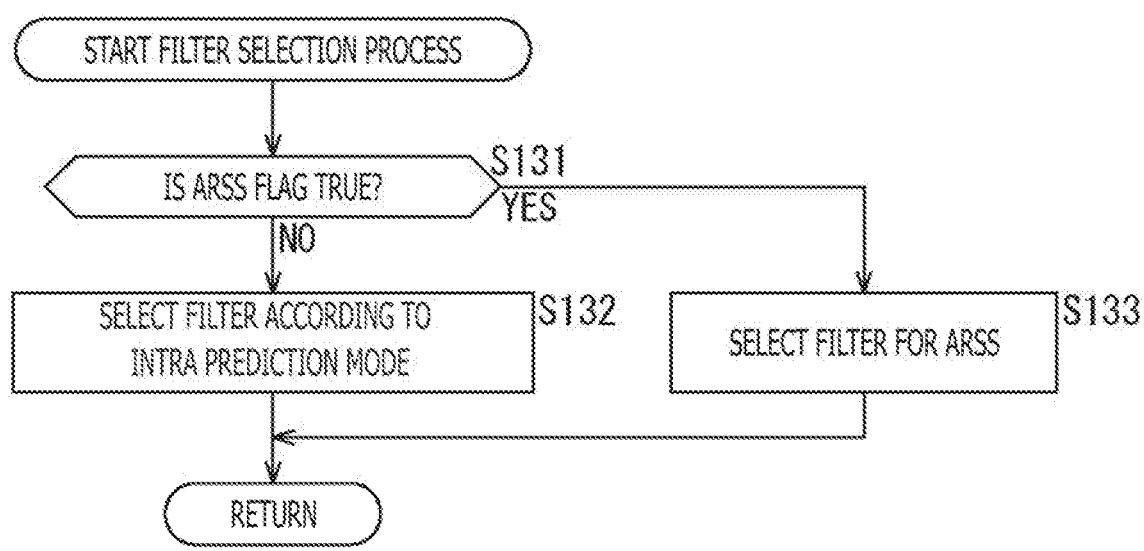
FIG. 19 is a flow chart describing an example of a flow of a filter selection process.

Next, an example of a flow of the filter selection process executed in step S122 of FIG. 18 will be described with reference to a flow chart of FIG. 19. Once the filter selection process is started, the reference pixel filtering unit 151 determines whether the ARSS flag is true (1) in step S131. If the reference pixel filtering unit 151 determines that the ARSS flag is false (0), the process proceeds to step S132.

In step S132, the reference pixel filtering unit 151 selects a filter according to the intra prediction mode selected in step S111 of FIG. 17 (that is, intra prediction mode designated from the encoding side based on the prediction mode information Pinfo or the like). Once the filter is selected, the filter selection process ends, and the process returns to FIG. 18. That is, in this case, the filter according to the intra prediction mode is used to execute the filtering process in step S123 of FIG. 18.

In addition, if the reference pixel filtering unit 151 determines that the ARSS flag is true (1) in step S131, the process proceeds to step S133. In step S133, the reference pixel filtering unit 151 selects the filter for ARSS. Once the filter is selected, the filter selection process ends, and the process returns to FIG. 18. That is, in this case, the ARSS is performed in step S123 of FIG. 18.

The image decoding apparatus 100 can execute each process in this way to perform the ARSS according to the value of the ARSS flag set on the encoding side. Note that in the processes of the steps described above, the processing order of the steps may be switched, or the details of the processes may be changed within a possible range. Note that in step S132, "the reference pixel filtering unit 151 selects a filter according to the intra prediction mode selected in step S111 of FIG. 17" may be replaced with an operation of "not selecting the reference pixel filter (turning off the reference pixel filtering process)." Alternatively, the operation may be replaced with an operation of selecting a filter f={1} as the reference filter, in which the number of taps is 1, and the filter coefficient is 1. The operation is equivalent to turning off the reference pixel filtering process. Note that the change is also applied to the reference pixel filtering unit 151 included in the image decoding apparatus.

<Flow of Decoding Process>

Next, an example of a flow of the decoding process executed in step S101 of FIG. 16 will be described with reference to a flow chart of FIG. 20. Note that FIG. 21 illustrates an example of the syntax corresponding to the decoding process.

Once the decoding process is started, the transform skip flag decoding unit 191 determines, for example, whether a predetermined condition 1 (condition 1) as in the following Equation (6) is true in step S141. More specifically, the transform skip flag decoding unit 191 determines whether the transform skip enabled flag ts_enabled_flag is 1 (true), the size of the transform block is equal to or smaller than the threshold MaxTSSize, and the transform quantization bypass flag transquant_bypass_flag is 0 (flag).

$$\text{Condition1:ts\_enabled\_flag \&\& width*height}<=\text{MaxTSSize \&\& !transquant\_bypass\_flag} \quad (6)$$

Here, the value of MaxTSSize is 16. The value of MaxTSSize is not limited to this, and the value may be set based on a parameter defining the MaxTSSize notified by the header information.

Notes: In Equation (6), the part where the size of the transform block and the threshold are compared may be replaced with a logarithmic expression indicated in the following Equation (7) (condition1a).

$$\text{Condition1}a\text{:ts\_enabled\_flag \&\& (log 2TbWidth+log 2TbHeight}<=\text{log 2MaxTSSize) \&\& !transquant\_bypass\_flag} \quad (7)$$

Here, the value of log 2MaxTSSize is, for example, 4. The value of log 2MaxTSSize is not limited to this, and the value may be set by a parameter defining the log 2MaxTSSize notified by the header information.

In a case where the condition of Equation (6) (Equation (7)) is not satisfied, that is, in a case where the transform skip flag decoding unit 191 determines that the condition 1 is false (0), the process proceeds to step s142. In this case, the desired transform skip flag is not transmitted from the encoding side (not included in the encoded data), and the transform skip flag decoding unit 191 sets the value of the transform skip flag ts_flag to 0 in step S142. Once the value of the transform skip flag ts_flag is set to 0, the process proceeds to step S144.

Furthermore, in a case where the transform skip flag decoding unit 191 determines that the condition 1 is true (1) (condition of Equation (6) or Equation (7) is satisfied) in step S141, the process proceeds to step S143. In this case, the desired transform skip flag is included in the encoded data. Therefore, the transform skip flag decoding unit 191 parses and decodes the transform skip flag ts_flag included in the encoded data in step S143. Once the transform skip flag ts_flag is decoded, the process proceeds to step S144.

In step S144, the inter RDPCM syntax decoding unit 192 decodes the syntax group regarding the inter RDPCM from the encoded data (inter RDPCM flag inter_rdpcm_flag and inter RDPCM direction flag inter_rdpcm_dir_flag included in code SYN103 in FIG. 21).

In step S145, the non-zero coefficient syntax decoding unit 193 decodes the syntax group regarding the non-zero coefficient in the transform block from the encoded data.

In step S146, the ARSS data hiding flag derivation unit 194 derives a flag ArssDataHidden indicating whether Arss-Flag is hidden in the data (also referred to as Arss data hiding flag) based on the following Conditional Expression (8). More specifically, the ARSS data hiding flag derivation unit 194 sets the Arss data hiding flag ArssDataHidden to a value of 1 (true) when the CU to be processed is an intra CU, a color space identifier compID is luma, the Arss enabled flag arss_enabled_flag is 1 (true), the intra prediction mode predModeIntra is not DC prediction, the size of the transform block is equal to or smaller than a predetermined maximum value MaxARSSBlkSize and equal to or greater than a predetermined minimum value MinARSSBlkSize, the transform quantization bypass flag transquant_bypass_flag is 0 (false), the transform skip flag ts_flag is 0 (false), and the RDPCM mode flag rdpcmModeFlag is 0 (false). In other cases, the Arss data hiding flag ArssDataHidden is set to a value of 0 (false).

$$\begin{aligned}
\text{ArssDataHidden} = \\
(\text{ CuPreMode[x0][y0]}&==\text{MODE\_INTRA} \\
\&\& \text{ compID}&==\text{COMPONENT\_Y} \\
\&\& \text{ arss\_enabled\_flag} & \\
\&\& \text{ predModeIntra } &!= \text{ DC\_IDX} \\
\&\& \text{ width * height } &<= \text{ MaxARSSBlkSize} \\
\&\& \text{ width * height } &>= \text{ MinARSSBlkSize} \\
\&\& \text{ !transquant\_bypass\_flag} & \\
\&\& \text{ !ts\_flag} & \\
\&\& \text{ !rdpcmModeFlag }) & \quad \ldots (8)
\end{aligned}$$

Here, the MaxARSSBlkSize represents the maximum value of the block size in the ARSS and is, for example, 1024. In addition, the MinARSSBlkSize represents the minimum value of the block size in the ARSS and is, for example, 64. Note that the MaxARSSBlkSize and the MinARSSBlkSize may be set by parameters defining the MaxARSSBlkSize and the MinARSSBlkSize notified by the header information.

Notes: In Equation (8) described above, the part where the size of the block and the threshold are compared may be replaced with a logarithmic expression indicated in the following Equation (9).

$$\begin{aligned}
\text{ArssDataHidden} = \\
(\text{ CuPredMode[x0][y0]}&==\text{MODE\_INTRA} \\
\&\& \text{ compID}&==\text{COMPONENT\_Y} \\
\&\& \text{ arss\_enabled\_flag} & \\
\&\& \text{ predModeIntra } &!= \text{ DC\_IDX} \\
\&\& \text{ (log2TbWidth + log2TbHeight} &<= \\
\text{log2MaxARSSBlkSize)} & \\
\&\& \text{ (log2TbWidth + log2TbHeight} &>= \\
\text{log2MinARSSBlkSize)} & \\
\&\& \text{ !transquant\_bypass\_flag} &
\end{aligned}$$

-continued

```
        && !ts_flag
        && !rdpcmModeFlag )      ... (9)
```

Here, the value of log 2MaxARSSBlkSize is 10. The value of log 2MinARSSBlkSize is 8. Note that the values of log 2MaxARSSBlkSize and log 2MinARSSBlkSize are not limited to these, and the values may be set by parameters defining the log 2MaxARSSBlkSize and the log 2MinARSSBlkSize notified by the header information.

Here, the RDPCM mode flag rdpcmModeFlag is derived by the following Equation (10).

rdpcmModeFlag=(interRdpcmModeFlag||intraRdpcm-
ModeFlag) (10)

Note that the interRdpcmModeFlag and the intraRdpcm-ModeFlag in Equation (10) described above are derived by the following Equation (11) and Equation (12), respectively.

interRdpcmModeFlag=inter_rdpcm_flag (11)

That is, the value of the inter RDPCM flag inter_rdpcm_flag is set for the inter RdpcmMode.

```
    intraRdpcmModeFlag =
      ( CuPredMode == MODE_INTRA
      && intra_rdpcm_mode_enabled_flag == 1
      && ts_flag == 1
      && (predModeIntra == HOR_IDX || predModeIntra ==
    VER_IDX))     ... (12)
```

That is, the intraRdpcmModeFlag is set to 1 (true) when the CU to be processed is an intra CU, the intra RDPCM enabled flag intra_rdpcm_mode_enabled_flag is 1 (true), the transform skip flag ts_flag is 1 (true), and the intra prediction mode predModeIntra is horizontal prediction or vertical prediction. In other cases, 0 (false) is set.

In step S147, the ARSS data hiding flag derivation unit 194 determines whether a condition 2 indicated in the following Conditional Expression (13) is satisfied. More specifically, the ARSS data hiding flag derivation unit 194 determines whether the ARSS data hiding flag ArssData-Hidden is 1 (true).

Condition2: ArssDataHidden==1 (13)

In a case where Conditional Expression (13) is not satisfied, that is, in a case where the ARSS data hiding flag derivation unit 194 determines that the condition 2 is false (0), the process proceeds to step S148. In this case, ArssDataHidden included in code SYN105 is 0 in the syntax of FIG. 21. Therefore, in this case, the ARSS flag decoding unit 195 sets ArssFlag to 0 (false) as in the row of code SYN107 of the syntax of FIG. 21. When the process of step S148 is finished, the decoding process ends, and the process returns to FIG. 16.

Furthermore, in a case where the ARSS data hiding flag derivation unit 194 determines that Conditional Expression (13) is satisfied so that the condition 2 is true (1) in step S147, the process proceeds to step S149. In this case, the ArssFlag is hidden in the encoded data, and the ARSS flag decoding unit 195 executes the opposite process of the data hiding to derive the value of the ArssFlag from the data regarding the non-zero coefficient of the transform block.

More specifically, the ARSS flag decoding unit 195 uses the following Equation (14) to derive a sum of absolute values absSum of the level values of the non-zero coefficients in the transform block in step S149.

absSum=Σ|coeff_level[$p$]|over $p$ (14)

Here, the coeff_level [x] represents a level value of the transform coefficient at an xth position in the scan order. The operator |x| is an operator that returns the absolute value of the variable x. "Σ {X_p} over p" is an operator that returns the sum total of the variables X_p corresponding to p regarding the variable p.

Note that the sum of absolute values absSum of the level values of the non-zero coefficients in the transform block may be derived by the following Equation (15).

absSum=calcSumAbsLevel(compID) (15)

Here, the function calcSumAbsLevel(compID) is a function that returns the sum of absolute values of the level values of the transform coefficients in the transform block regarding the color signal indicated by the compID.

In step S150, the ARSS flag decoding unit 195 sets the value of ArssFlag as in the following Equation (16) based on whether the derived sum of absolute values absSum of the level values of the non-zero coefficients in the transform block is even or odd. More specifically, the ARSS flag decoding unit 195 sets the ArssFlag to 1 (true) in a case where the sum of absolute values absSum is odd ((absSum & 0x01)==1). Furthermore, the ARSS flag decoding unit 195 sets the ArssFlag to 0 (false) in a case where the sum of absolute values absSum is even ((absSum & 0x01)==0).

ArssFlag=(absSum & 0x01) (16)

Figure 16:
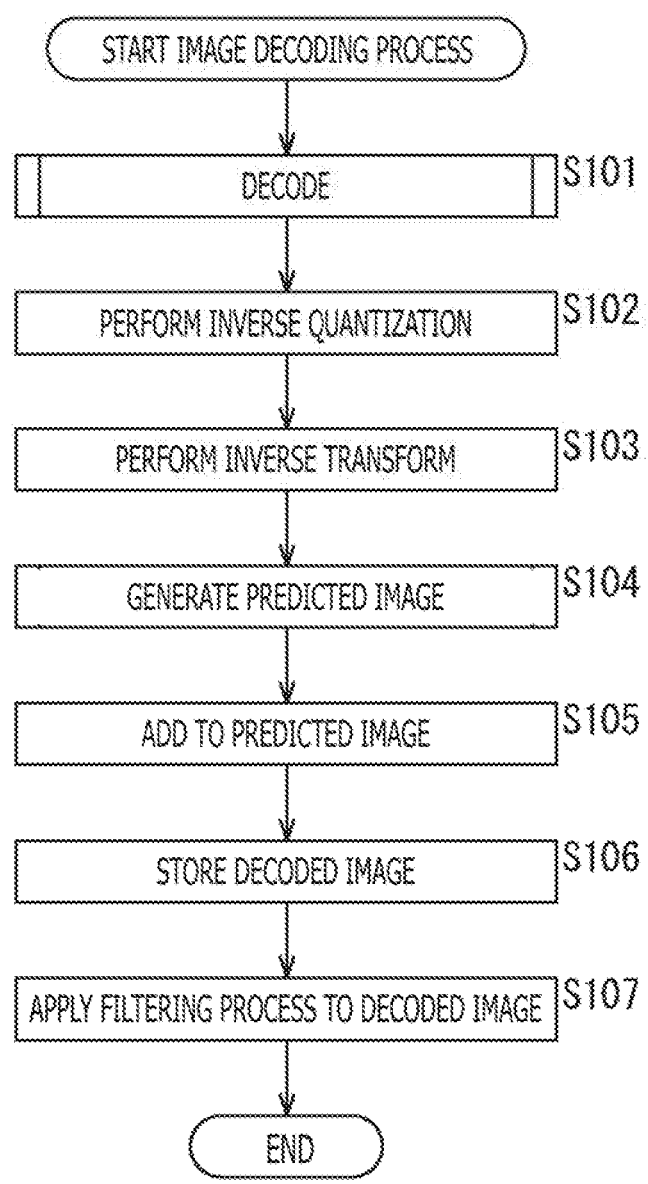
FIG. 16 is a flow chart describing an example of a flow of an image decoding process.

When the process of step S150 is finished, the decoding process ends, and the process returns to FIG. 16. As described with reference to the flow charts of FIGS. 18 and 19, the adaptive reference sample filtering process (including turning off the filtering process) is executed according to the ArssFlag set as described above. In each of the processes described above, the processing order of the steps may be switched, or the details of the process may be changed within a possible range.

For example, although the sum of absolute values absSum of the level values of the non-zero coefficients is derived as the sum total of all the non-zero coefficients is the transform block in Equation (14) and Equation (15), the sum of absolute values absSum is not limited to this.

Specifically, the absSum may be the sum of absolute values of the level values of the non-zero coefficients at even positions in the scan order as indicated in the following Equation (17).

absSum=Σ|coeff_level[$p$]|over $p$, where $p$ is even
(i.e. $p$ % 2==0) (17)

Alternatively, the absSum may be the sum of absolute values of the level values of the non-zero coefficients at odd positions in the scan order as indicated in the following Equation (18).

absSum=Σ|coeff_level[$p$]|over $p$, where $p$ is odd (i.e.
$p$ % 2==1) (18)

In general terms, as indicated in the following Equation (19), the absSum may be the sum of absolute values of the level values of the non-zero coefficients in which a scan position p in the scan order satisfies that the remainder after dividing p by q (p mod q, p % q) is equal to r.

absSum=Σ|coeff_level[$p$]|over $p$, where $p$ mod $q$ is
equal to $r$(i.e. $p$ % $q$==$r$) (19)

The advantage of Equations (17) to (19) is that the ARSS data hiding and other data hiding can coexist. For example, in Equation (17), the ARSS flags can be hidden in the data of the non-zero coefficients at the odd positions in the scan order, and other data can be hidden in the data of the non-zero coefficients at the even positions in the scan order. This is similar in Equation (18). In the case of Equation (19), up to q different pieces of data can be hidden in the data of the non-zero coefficients.

In this way, the ARSS data hiding and the ARSS are controlled by the values of the transform quantization bypass flag transquant_bypass_flag, the transform skip flag ts_flag, the RDPCM enabled flag, and the like. That is, the relationship between the values is as in a table of FIG. 22.

For example, in the Case #1 (transform quantization bypass is not applied, transform skip is applied, and (Inter/Intra) RDPCM is not applied), the ARSS data hiding is disabled. Therefore, in the Case #1, the reduction of the subjective image quality caused by the ARSS data hiding can be suppressed compared to the past technique.

In addition, for example, in the Case #2 (transform quantization bypass is not applied, transform skip is applied, and Inter RDPCM is applied), the ARSS data hiding is disabled. Therefore, in the Case #2, the reduction of the subjective image quality caused by the ARSS data hiding can be suppressed, and the reduction in the prediction efficiency of RDPCM can be suppressed compared to the past technique.

In addition, for example, in the Case #3 (transform quantization bypass is not applied, transform skip is applied, and intra RDPCM is applied), the ARSS data hiding is disabled. Therefore, in the Case #3, the reduction of the subjective image quality caused by the ARSS data hiding can be suppressed, and the reduction in the prediction efficiency of RDPCM can be suppressed compared to the past technique.

In addition, for example, in the Case #4 (transform quantization bypass is applied, transform skip is not applied, and (Inter/Intra) RDPCM is not applied), the ARSS data hiding is disabled. Therefore, in the Case #4, the ARSS data hiding can be disabled to enable the lossless coding compared to the past technique.

In addition, for example, in the Case #5 (transform quantization bypass is applied, transform skip is not applied, and Inter RDPCM is applied), the ARSS data hiding is disabled. Therefore, in the Case #5, the ARSS data hiding can be disabled to enable the lossless coding compared to the past technique. In addition, the reduction in the prediction efficiency of RDPCM caused by the ARSS data hiding can be suppressed.

In addition, for example, in the Case #6 (transform quantization bypass is applied, transform skip is not applied, and intra RDPCM is applied), the ARSS data hiding is disabled. Therefore, in the Case #6, the ARSS data hiding can be disabled to enable the lossless coding compared to the past technique. In addition, the reduction in the prediction efficiency of RDPCM caused by the ARSS data hiding can be suppressed.

Therefore, the reduction in the subjective image quality of the decoded image can be suppressed. Note that the ArssFlag is set to 0 when the ARSS data hiding is disabled, and the ARSS is not applied in these cases. Therefore, when it is confirmed that the data hiding is not to be performed, whether to apply the ARSS does not have to be checked, and the increase in the load of decoding can be suppressed (decoding facilitated). In addition, the ArssFlag does not have to be transmitted in the state in which the data hiding is disabled, and the increase in the code amount can be suppressed.

3. Second Embodiment

<Image Encoding Apparatus>

Figure 23:
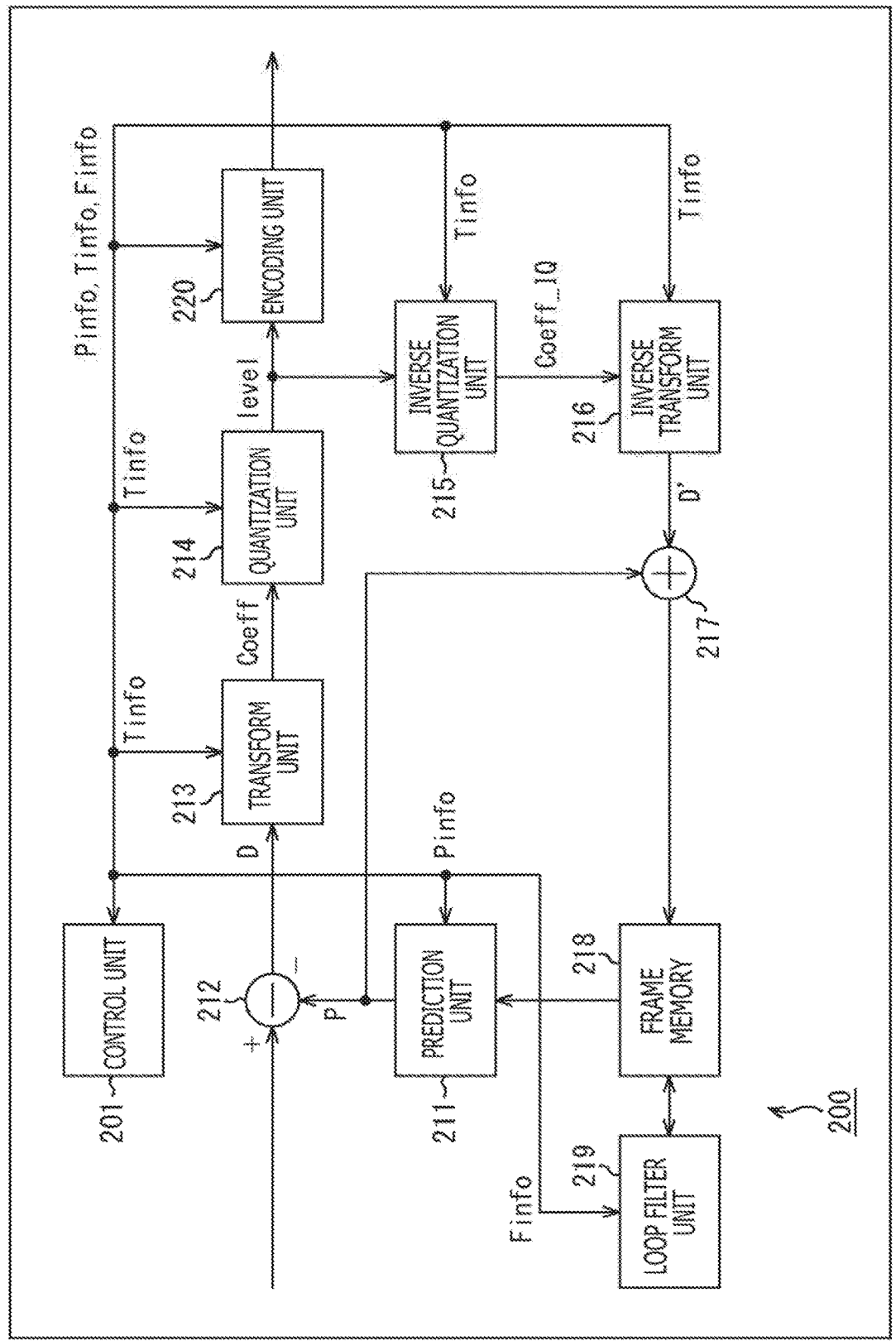
FIG. 23 is a block diagram illustrating a main configuration example of an image encoding apparatus.

Next, encoding for generating encoded data decoded as described above will be described. FIG. 23 is a block diagram illustrating an example of a configuration of an image encoding apparatus that is an aspect of the image processing apparatus according to the present technique. An image encoding apparatus 200 illustrated in FIG. 23 is an image encoding apparatus corresponding to the image decoding apparatus 100 of FIG. 10, and the image encoding apparatus 200 uses an encoding method corresponding to the decoding method of the image decoding apparatus 100 to encode an image to generate encoded data (bitstream) to be decoded by the image decoding apparatus 100. For example, the image encoding apparatus 200 is provided with a technique proposed in the HEVC and a technique proposed in the JVET.

Note that FIG. 23 illustrates main processing sections, flows of data, and the like, and FIG. 23 may not illustrate everything. That is, the image encoding apparatus 200 may include processing sections not illustrated as blocks in FIG. 23, or there may be flows of processes and data not indicated by arrows or the like in FIG. 23.

As illustrated in FIG. 23, the image encoding apparatus 200 includes a control unit 201, a prediction unit 211, a computation unit 212, a transform unit 213, a quantization unit 214, an inverse quantization unit 215, an inverse transform unit 216, a computation unit 217, a frame memory 218, a loop filter unit 219, and an encoding unit 220.

<Control Unit>

The control unit 201 partitions the moving image #2 into blocks of the processing unit (such as CU, PU, and transform block) based on the block size of the processing unit designated from the outside or designated in advance and inputs an image I corresponding to the partitioned blocks into the computation unit 212. In addition, the control unit 201 decides encoding parameters to be supplied to each block (such as the header information Hinfo, the prediction mode information Pinfo, the transform information Tinfo, and the filter information Finfo) based on, for example, RDO (Rate-Distortion Optimization). The decided encoding parameters are supplied to each block. Specifically, the encoding parameters are supplied as follows.

The header information Hinfo is supplied to each block.

The prediction mode information Pinfo is supplied to the encoding unit 220 and the prediction unit 211.

The transform information Tinfo is supplied to the encoding unit 220, the transform unit 213, the quantization unit 214, the inverse quantization unit 215, and the inverse transform unit 216.

The filter information Finfo is supplied to the loop filter unit 219.

<Computation Unit>

The computation unit 212 receives the image I corresponding to the blocks of the processing unit and the predicted image P supplied from the prediction unit 211 and subtracts the predicted image P from the image T as indicated in the following Equation (20) to derive a predicted residual D. The computation unit 212 outputs the predicted residual D to the transform unit 213.

$$D = I - P \quad (20)$$

<Transform Unit>

The transform unit 213 executes an opposite process of the inverse transform unit 113. The transform unit 213 receives the predicted residual D and the transform information Tinfo, applies a transform to the predicted residual D based on the transform information Tinfo to derive a transform coefficient Coeff, and outputs the transform coefficient Coeff to the quantization unit 214.

<Quantization Unit>

The quantization unit 214 executes an opposite process of the inverse quantization unit 112. The quantization unit 214 receives the transform information Tinfo and the transform coefficient Coeff, scales (quantizes) the transform coefficient Coeff based on the transform information Tinfo, and outputs the transform coefficient after the quantization, that is, the quantization transform coefficient level "level," to the encoding unit 220.

<Inverse Quantization Unit>

The inverse quantization unit 215 has a configuration similar to the inverse quantization unit 112 and executes a similar process. That is, the inverse quantization unit 215 executes an opposite process of the quantization unit 214.

<Inverse Transform Unit>

The inverse transform unit 216 has a configuration similar to the inverse transform unit 113 and executes a similar process. That is, the inverse transform unit 216 executes an opposite process of the transform unit 213.

<Computation Unit>

The computation unit 217 adds the predicted residual D' and the predicted image P corresponding to the predicted residual D' to derive the local decoded image $R_{local}$.

<Frame Memory>

The frame memory 218 executes a process related to storage of data regarding the image. For example, the frame memory 218 receives the local decoded image $R_{local}$ supplied from the computation unit 217, reconstructs the picture-based decoded image R, and stores the decoded image R in the buffer of the frame memory 218. The frame memory 218 reads the decoded image R from the buffer and supplies the decoded image R to the loop filter unit 219.

<Loop Filter Unit>

The loop filter unit 219 executes a process regarding the loop filtering process. For example, the loop filter unit 219 reads the decoded image R from the frame memory 218 and executes the loop filtering process designated by the filter information Finfo to generate the decoded image R' after filtering. In addition, the loop filter unit 219 supplies the decoded image R' after filtering to the frame memory 218. Note that the loop filtering process executed by the loop filter unit 219 includes the deblocking filter (DBE (DeBlocking Filter)), the sample adaptive offset (SAO (Sample Adaptive Offset)), the adaptive loop filter (ALF (Adaptive Loop Filter)), and other linear and nonlinear filters (such as a Wiener filter and a bilateral filter).

<Encoding Unit>

The encoding unit 220 executes an opposite process of the decoding unit 111. The encoding unit 220 transforms the encoding parameters supplied from the control unit 14 (header information, prediction mode information Pinfo, transform information Tinfo, and filter information Finfo) and the quantization transform coefficient level "level" supplied from the quantization unit 12 into syntax values of the syntax elements according to the definition of the syntax table. The encoding unit 220 applies variable-length encoding (for example, arithmetic coding) to each syntax value to generate a bit string.

Note that the encoding unit 220 derives the residual information RInfo from the quantization transform coefficient level "level" and encodes the residual information RInfo to generate the bit string. In addition, the encoding unit 220 multiplexes the bit string of each syntax element subjected to the variable-length encoding to generate the encoded data #1 and outputs the encoded data #1.

<Prediction Unit>

Figure 24:
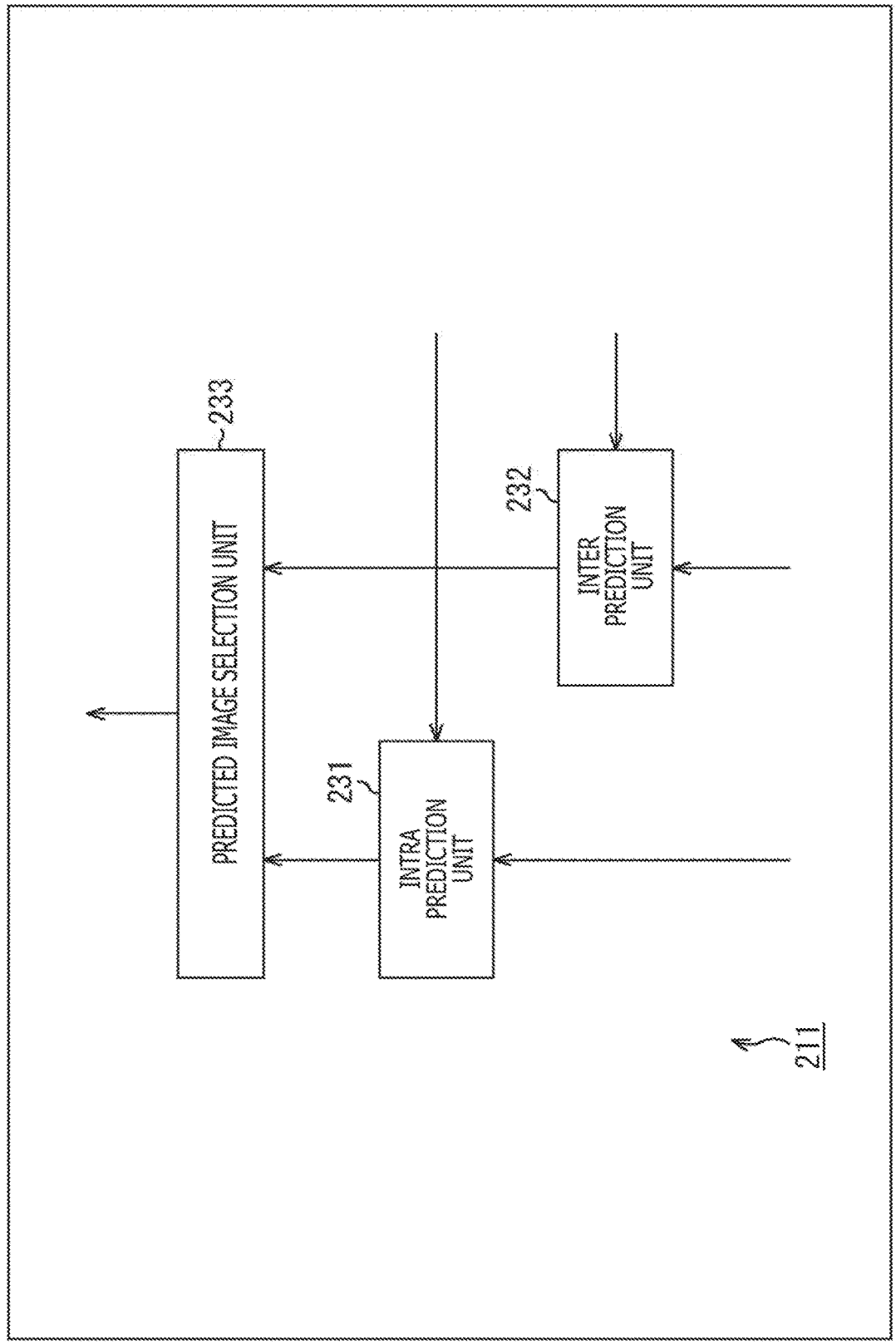
FIG. 24 is a block diagram illustrating a main configuration example of a prediction unit.

FIG. 24 is a block diagram illustrating a main configuration example of the prediction unit 211. As illustrated in FIG. 24, the prediction unit 211 includes an intra prediction unit 231, an inter prediction unit 232, and a predicted image selection unit 233.

The intra prediction unit 231 executes a process regarding the intra prediction. For example, the intra prediction unit 231 reads the reference image from the frame memory 218 based on the prediction mode information Pinfo and uses the reference image to perform the intra prediction to generate a predicted image. The intra prediction unit 132 performs the intra prediction in each intra prediction mode and calculates each cost function (also referred to as cost). The intra prediction unit 231 supplies the generated predicted image of each intra prediction mode to the predicted image selection unit 233 along with the prediction mode information Pinfo and the like.

The inter prediction unit 232 executes a process regarding the inter prediction. For example, the inter prediction unit 232 reads the reference image from the frame memory 218 based on the prediction mode information Pinfo and uses the reference image to perform the inter prediction to generate a predicted image. The inter prediction unit 232 performs the inter prediction in each inter prediction mode and calculates each cost function. The inter prediction unit 232 supplies the generated predicted image of each inter prediction mode to the predicted image selection unit 233 along with the prediction mode information Pinfo and the like.

The predicted image selection unit 233 selects the predicted image in the optimal prediction mode based on, for example, the cost function and the like from among the intra predicted images supplied from the intra prediction unit 231 and the inter predicted images supplied from the inter prediction unit 232. The predicted image selection unit 233 supplies the selected predicted image to the computation unit 212 and the computation unit 217.

<Intra Prediction Unit>

Figure 25:
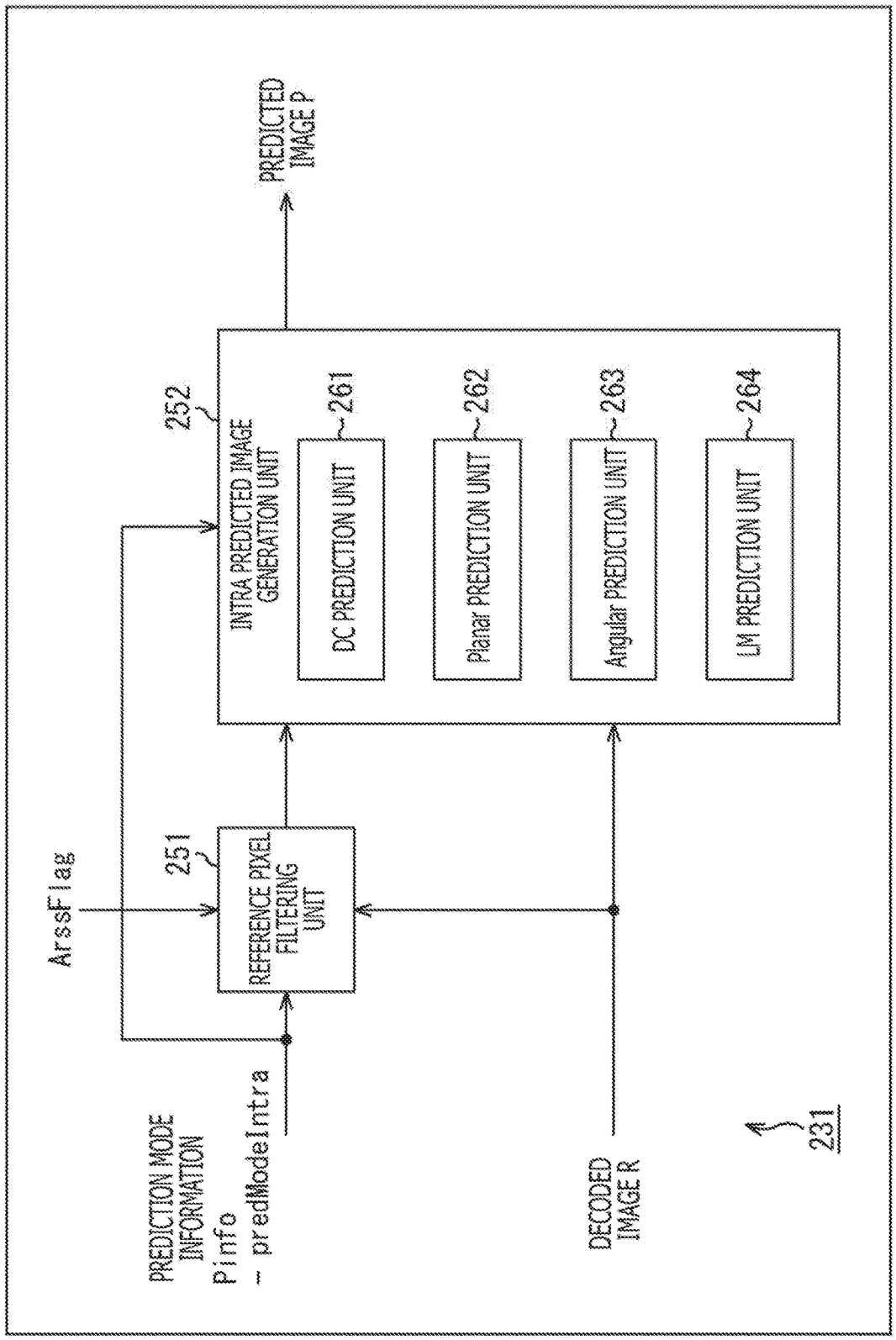
FIG. 25 is a block diagram illustrating a main configuration example of an intra prediction unit.

FIG. 25 is a block diagram illustrating a main configuration example of the intra prediction unit 231. As illustrated in FIG. 25, the intra prediction unit 231 includes, for example, a reference pixel filtering unit 251 and an intra predicted image generation unit 252.

<Reference Pixel Filtering Unit>

The reference pixel filtering unit 251 receives the prediction mode information Pinfo, the ARSS flag ArssFlag, and the decoded image R of the frame to be processed supplied from the frame memory 218. First, the reference pixel filtering unit 251 sets, as indicated in Equation (2) and Equation (3) described above, the reference samples refSamples(x) (x=−2*width, . . . 2*width−1) to be used in the intra prediction of the block to be processed from the decoded image R.

Notes: in a case where there is no decoded pixel at the generation of the reference samples refSamples(x) so that the decoded pixel cannot be referenced, one of the following methods of [1] to [4] is used to set the reference samples refSamples(x).

[1] In a case where pixels of R(x0+i, y0−1) corresponding to i=width . . . 2*width−1 cannot be referenced, a pixel of, for example, R(x0+width−1, y0−1) is set for refSamples(i).

[2] In a case where pixels of R(x0−1, y0+j+1) corresponding to j=−2*width . . . −width cannot be referenced, a pixel of, for example, R(x0−1, y0−width+1) is set for refSamples (j).

[3] In a case where pixels of R(x0+i, y0−1) corresponding to i=−1 . . . width−1 cannot be referenced, a value of, for example, 1<<(bitDepth−1) is set for refSamples(i).

[4] In a case where pixels of R(x0, y0+j+1) corresponding to j=−width . . . −1 cannot be referenced, a value of, for example, 1<<(bitDepth−1) is set for refSamples(j).

Subsequently, the reference pixel filtering unit 251 refers to the ARSS flag ArssFlag and the intra prediction mode predModeIntra to select the filter f to be used in the adaptive pixel filtering process.

The reference pixel filtering unit 251 uses the selected filter f to smooth the reference samples refSamples(x) (x=−2*width, . . . 2*width−1) as in Equation (4) described above to generate the refSamples'(x) after filtering. Note that in a case where the filter is not referenced (in a case where the filter is not applied), the refSamples(x) before filtering is set for the refSamples'(x) as in Equation (5) described above.

The reference pixel filtering unit 251 outputs the reference samples refSamples'.

<Intra Predicted Image Generation Unit>

The intra predicted image generation unit 252 receives the reference samples refSamples' and the prediction mode information Pinfo and uses the prediction method corresponding to the intra prediction mode preModeIntra to thereby generate the predicted image P from the reference samples refSamples' and output the predicted image P. The intra predicted image generation unit 252 includes a DC prediction unit 261, a Planar prediction unit 262, an Angular prediction unit 263, and an LM prediction unit 264.

In a case where the intra prediction mode preModeIntra indicates DC prediction, the DC prediction unit 261 generates a DC predicted image and outputs the DC predicted image as the predicted image P. In a case where the intra prediction mode predModeIntra indicates Planar prediction, the Planar prediction unit 262 generates a Planar predicted image and outputs the Planar predicted image as the predicted image P. In a case where the intra prediction mode predModeIntra indicates Angular prediction, the Angular prediction unit 263 generates an Angular predicted image and outputs the Angular predicted image as the predicted image P. In a case where the intra prediction mode predModeIntra indicates LM prediction, the LM prediction unit 264 generates an LM predicted image and outputs the LM predicted image as the predicted image P.

<Encoding Unit>

Figure 26:
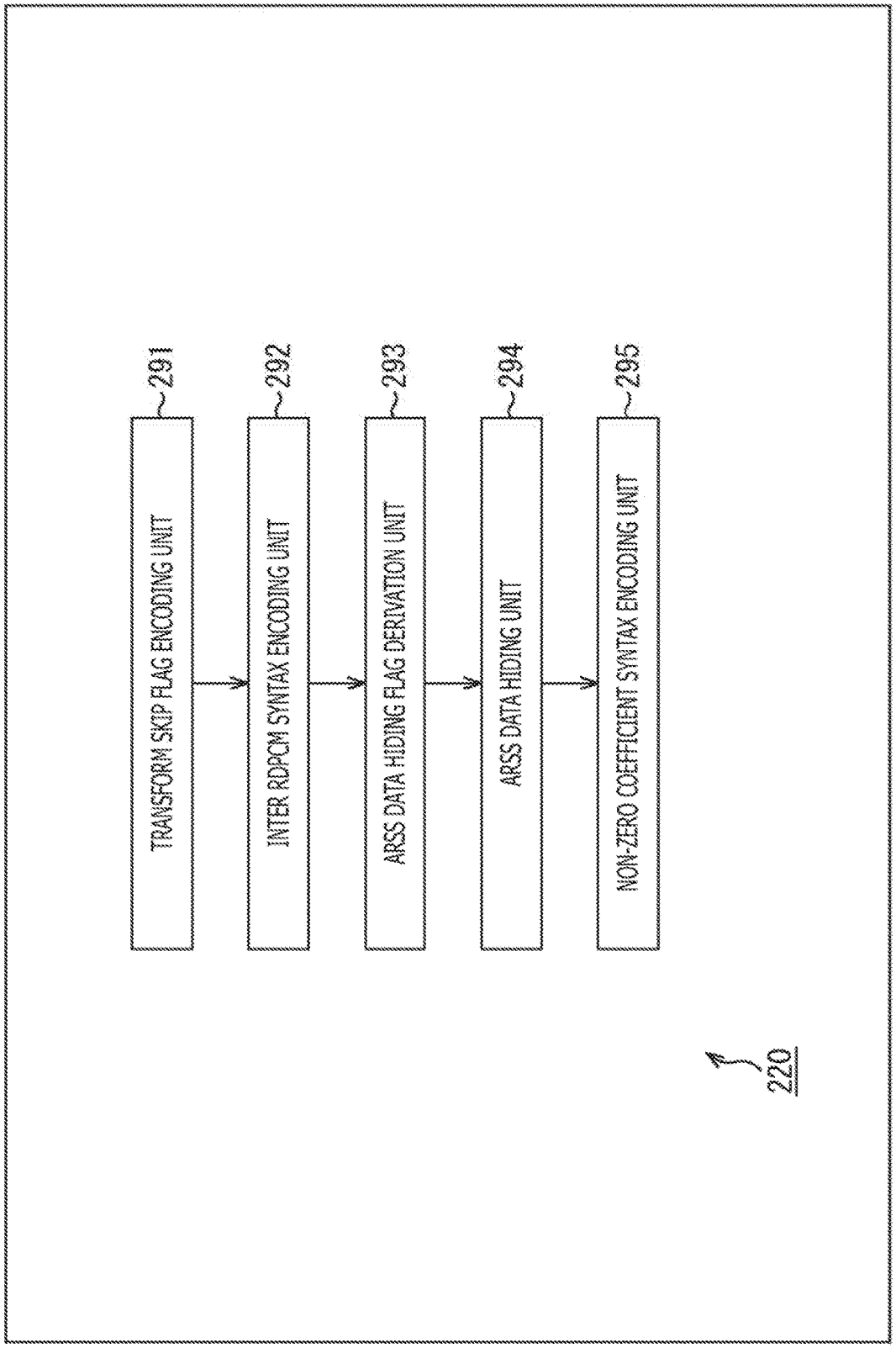
FIG. 26 is a block diagram illustrating a main configuration example of an encoding unit.

FIG. 26 is a block diagram illustrating a main configuration example of the encoding unit 220. As illustrated in FIG. 26, the encoding unit 220 includes a transform skip flag encoding unit 291, an inter RDPCM syntax encoding unit 292, an ARSS data hiding flag derivation unit 293, an ARSS data hiding unit 294, and a non-zero coefficient syntax encoding unit 295. The transform skip flag encoding unit 291 is configured to execute a process regarding encoding of the transform skip flag (ts_flag). The inter RDPCM syntax encoding unit 292 is configured to execute a process related to encoding of the syntax regarding the inter RDPCM. The ARSS data hiding flag derivation unit 293 is configured to execute a process regarding derivation of the ARSS data hiding flag indicating whether to hide the ARSS flag. The ARSS data biding unit 294 is configured to execute a process regarding the ARSS data hiding. The non-zero coefficient syntax encoding unit 295 is configured to execute a process related to encoding of the syntax regarding the non-zero coefficient.

<Flow of Image Encoding Process>

Next, a process executed by the image encoding apparatus 200 configured in this way will be described. The image encoding apparatus 200 executes an image encoding process to execute, for example, a process regarding encoding of an image.

Once the image encoding process is started, the control unit 201 executes an encoding control process to perform operations, such as partitioning the blocks and setting the encoding parameters, in step S201. In step S202, the prediction unit 211 executes a prediction process to generate the predicted image or the like in the optimal prediction mode.

In step S203, the computation unit 212 computes the difference between the input image and the predicted image in the optimal mode selected in the prediction process of step S202. That is, the computation unit 212 generates the predicted residual D between the input image and the predicted image. The amount of data of the predicted residual D obtained in this way is reduced compared to the original image data. Therefore, the amount of data can be compressed compared to the case in which the image is encoded without the process.

In step S204, the transform unit 213 applies a transformation process to the predicted residual D generated in the process of step S203 to derive the transform coefficient Coeff. Note that the transformation process is the opposite process of the inverse transformation process of step S103 and is the opposite process of the inverse transformation process executed in the image decoding process described above.

In step S205, the quantization unit 214 performs an operation, such as using the quantization parameter calculated by the control unit 201, to quantize the transform coefficient Coeff obtained in the process of step S204 to derive the quantization transform coefficient level "level."

In step S206, the inverse quantization unit 215 performs inverse quantization of the quantization transform coefficient level "level" generated in the process of step S205 based on the characteristics corresponding to the characteristics of the quantization to derive the transform coefficient Coeff_IQ.

In step S207, the inverse transform unit 216 uses the method corresponding to the transformation process of step S204 to perform the inverse transform of the transform coefficient Coeff_IQ obtained in the process of step S206 to derive the predicted residual D'. Note that the inverse transformation process is executed as in the inverse transformation process executed in the image decoding process described above.

In step S208, the computation unit 217 adds the predicted image obtained in the prediction process of step S202 to the predicted residual D' derived in the process of step S207 to generate a locally decoded image.

In step S209, the frame memory 218 stores the locally decoded image obtained in the process of step S208.

In step S210, the encoding unit 220 encodes the quantization transform coefficient level "level" obtained in the process of step S205. For example, the encoding unit 220 performs arithmetic coding or the like to encode the quantization transform coefficient level "level" that is information regarding the image to generate encoded data. Furthermore, is this case, the encoding unit 220 encodes various encoding parameters (header information Hinfo, prediction mode information Pinfo, and transform information Tinfo). In addition, the encoding unit 220 derives the residual information RInfo from the quantization transform coefficient level "level" to encode the residual information RInfo.

In step S211, the loop filter unit 219 applies a predetermined filtering process to the local decoded image stored in the frame memory 218. When the process of step S21 is finished, the image encoding process ends. Note that in step S211, the local decoded image after filtering is stored in the frame memory 218.

<Flow of Prediction Process>

Next, an example of a flow of the prediction process executed in step S202 of FIG. 27 will be described with reference to a flow chart of FIG. 28. Once the prediction process is started, the intra prediction unit 231 of the prediction unit 211 executes an intra prediction process to generate a predicted image in the intra prediction mode in step S221.

In step S222, the inter prediction unit 232 of the prediction unit 211 performs inter prediction to generate a predicted image in the inter prediction mode.

In step S223, the predicted image selection unit 233 selects the predicted image in the optimal intra prediction mode from the predicted images generated in the process based on information, such as, for example, cost function values. When the process of step S223 is finished, the process returns to FIG. 27.

<Flow of Intra Prediction Process>

Next, an example of a flow of the intra prediction process executed in step S221 of FIG. 28 will be described with reference to a flow chart of FIG. 29.

Once the intra prediction process is started, the reference pixel filtering unit 251 sets reference samples in step S231. In step S232, the reference pixel filtering unit 251 executes an adaptive reference sample smoothing process. In step S254, the intra predicted image generation unit 252 generates predicted images in all executable intra prediction modes. That is, the reference pixel filtering unit 251 executes the process for both of the case in which the ARSS is applied and the case in which the ARSS is not applied in step S232.

In step S234, the intra predicted image generation unit 252 calculates the cost function value of each predicted image. In step S235, the intra predicted image generation unit 252 selects the predicted image in the optimal intra prediction mode. That is, whether to apply the ARSS in the case where the intra prediction is adopted is also decided at this point. The intra predicted image generation unit 252 supplies the selected predicted image to the predicted image selection unit 233.

Figure 28:
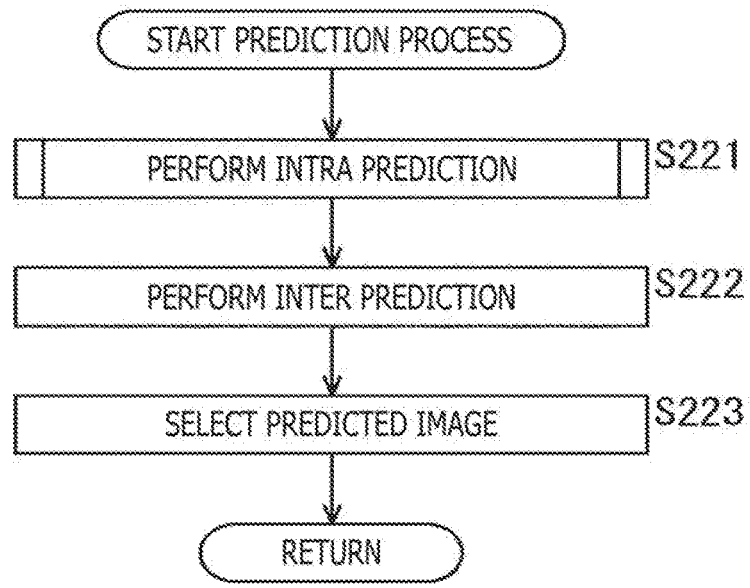
FIG. 28 is a flow chart describing an example of a flow of a prediction process.
Figure 29:
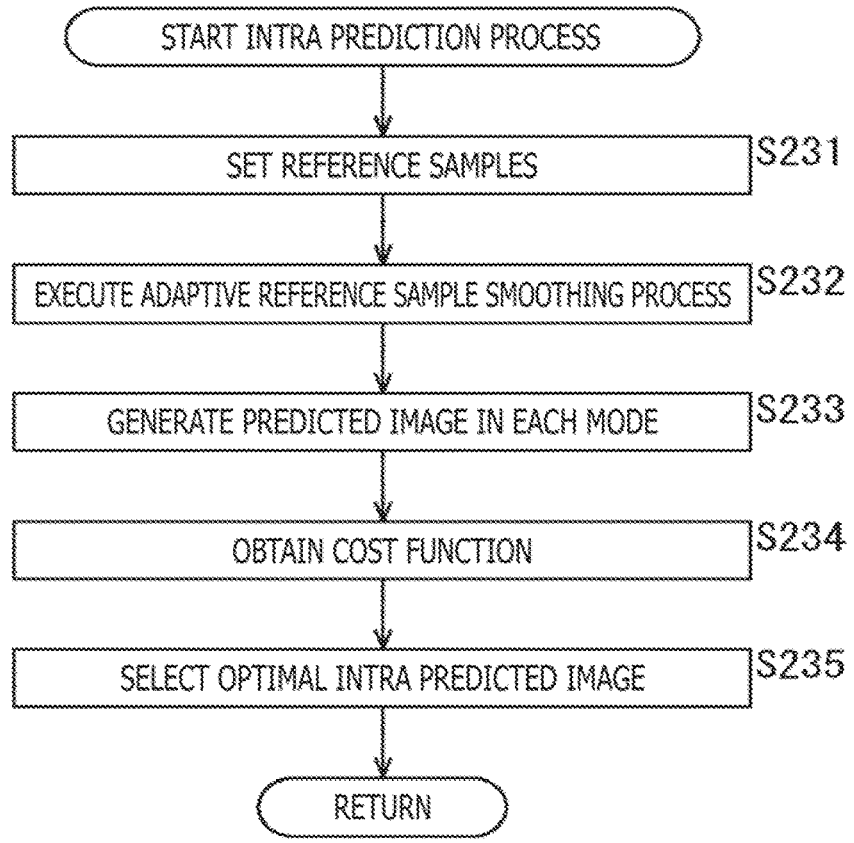
FIG. 29 is a flow chart describing an example of flow of an intra prediction process.

When the process of step S235 is finished, the intra prediction process ends, and the process returns to FIG. 28.

<Flow of Encoding Process>

Next, an example of a flow of the encoding process executed in step S210 of FIG. 27 will be described with reference to a flow chart of FIG. 30. Note that the syntax illustrated in FIG. 21 corresponds to the encoding process.

Once the encoding process is started, the transform skip flag encoding unit 291 determines whether the predetermined condition 1 as in, for example, Equation (6) (or Equation (7)) described above is true in step S241. More specifically, the transform skip flag encoding unit 291 determines whether the transform skip enabled flag ts_enabled_flag is 1 (true), the size of the transform block is equal to or smaller than the threshold MaxTSSize, and the transform quantization bypass flag transquant_bypass_flag is 0 (false).

In a case where the transform skip flag encoding unit 291 determines that the condition 1 is true (1) (condition of Equation (6) or Equation (7) is satisfied) in step S241, the process proceeds to step S242. In step S242, the transform skip flag encoding unit 291 encodes the transform skip flag ts_flag. When the process of step S242 is finished, the process proceeds to step S243. Furthermore, in a case where the transform skip flag encoding unit 291 determines that the condition 1 is false (0) in step S241, the process of step S242 is skipped, and the process proceeds to step S243.

In step S243, the inter RDPCM syntax encoding unit 292 encodes the syntax group regarding the inter RDPCM (inter RDPCM flag inter_rdpcm_flag and inter RDPCM direction flag inter_rdpcm_dir_flag included in code SYN103 in FIG. 21).

In step S244, the ARSS data hiding flag derivation unit 293 derives the flag ArssDataHidden indicating whether the ArssFlag is hidden in the data (also referred to as Arss data hiding flag) based on Equations (8) to (12) described above.

In step S245, the encoding unit 220 determines whether the condition 2 indicated in Equation (13) described above is satisfied. More specifically, the encoding unit 220 determines whether the ARSS data hiding flag ArssDataHidden is 1 (true). In a case where the encoding unit 220 determines that the condition 2 is true, the process proceeds to step S246.

In step S246, the ARSS data hiding unit 294 hides the value of ArssFlag in the data regarding the non-zero coefficient of the transform block.

More specifically, when the value of ArssFlag is 1 (true), the ARSS data hiding unit 294 corrects, for example, the coefficient value of the last coefficient so that the sum of absolute values of the level values of the non-zero coefficients in the transform block becomes odd.

For example, in the correction method of the coefficient value in this case, the coefficient value of the last coefficient is not corrected when the sum total absSum (=calcAbsLevelSum(compID)) of the level values is odd. In addition, the coefficient value of the last coefficient is corrected by +1 or −1 when the sum total absSum (=calcAbsLevelSum(compID)) of the level values is even. Whether to correct the coefficient value by "+1" or "−1" is optimally selected from the viewpoint of RDO.

In addition, when the value of ArssFlag is 1 (true), the ARSS data hiding unit 294 may correct, for example, the coefficient value of the last coefficient so that the sum of absolute values of the level values of the non-zero coefficients in the transform block becomes even.

For example, in the correction method of the coefficient value in this case, the coefficient value of the last coefficient is not corrected when the sum total absSum (=calcSumAbsLevel(compID)) of the level values is even. In addition, for example, the coefficient value of the last coefficient is corrected by +1 or −1 when the sum total absSum (=calcSumAbsLevel(compID)) of the level values is odd. Whether to correct the coefficient value by "+1" or "−1" is optimally selected from the viewpoint of RDO.

Notes: Although the coefficient in which the level value is corrected is not limited to the last coefficient, it is desirable that the coefficient be positioned at a high frequency. This is because it is difficult to perceive the change in the spatial domain.

When the process of step S246 is finished, the process proceeds to step S247. Furthermore, in a case where the encoding unit 220 determines that the condition 2 is false in step S245, the process of step S246 is skipped, and the process proceeds to step S247.

In step S247, the non-zero coefficient syntax encoding unit 295 encodes the syntax group regarding the non-zero coefficients in the transform block.

Figure 27:
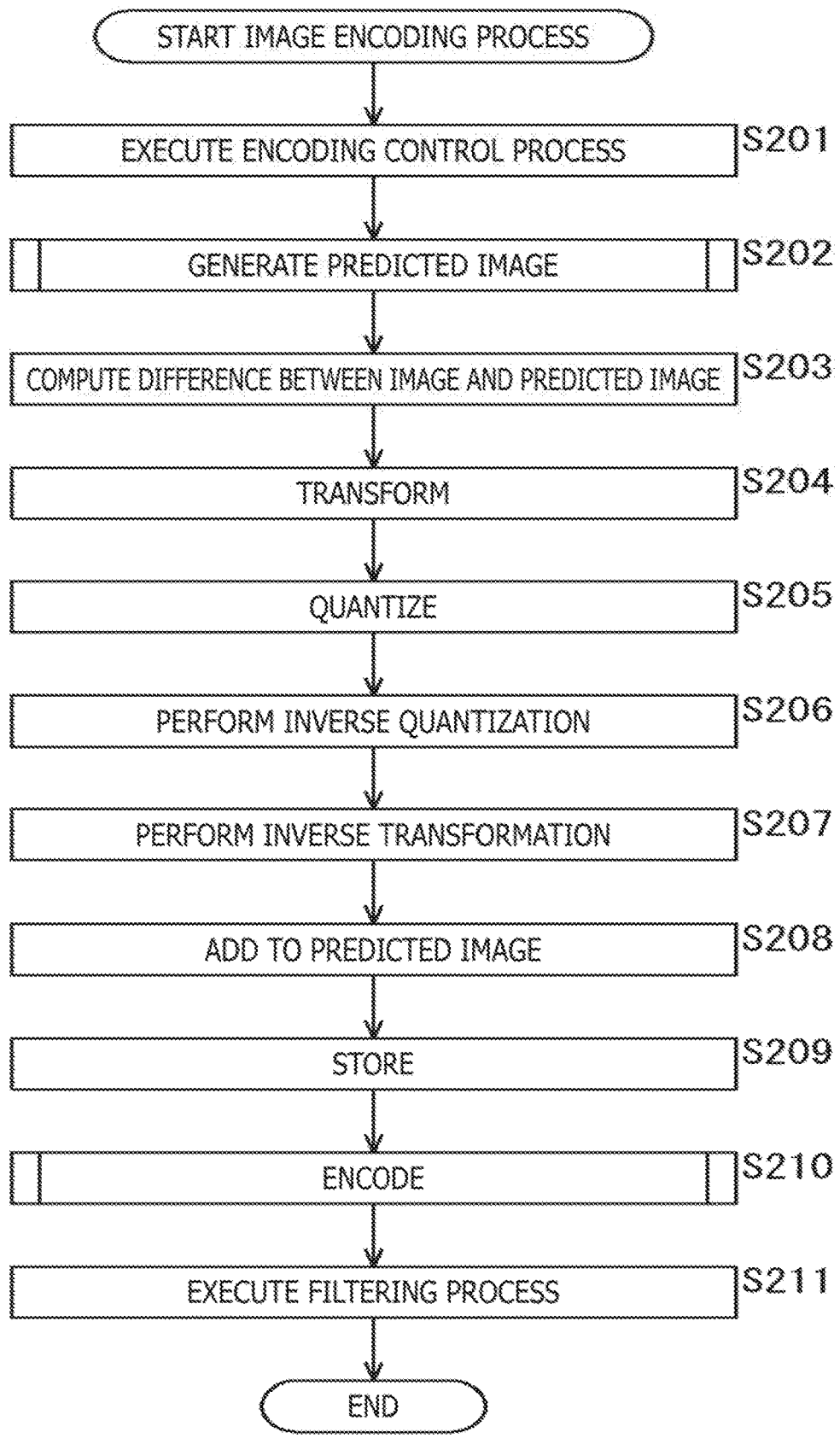
FIG. 27 is a flow chart describing an example of a flow of an image encoding process.

When the process of step S247 is finished, the encoding process ends, and the process returns to FIG. 27. In each of the processes described above, the processing order of the steps may be switched, or the details of the process may be changed within a possible range.

For example, although the sum of absolute values absSum of the level values of the non-zero coefficients is derived as the sum total of all the non-zero coefficients in the transform block, the sum of absolute values absSum is not limited to this.

Specifically, the absSum may be the sum of absolute values of the level values of the non-zero coefficients at even positions in the scan order as indicated in Equation (17) described above. Alternatively, the absSum may be the sum of absolute values of the level values of the non-zero coefficients at odd positions in the scan order as indicated in Equation (18) described above.

In general terms, as indicated in Equation (19) described above, the absSum may be the sum of absolute values of the level values of the non-zero coefficients in which the scan position p in the scan order satisfies that the remainder after dividing p by q (p mod q, p % q) is equal to r.

The advantage of Equations (17) to (19) is that the ARSS data hiding and other data hiding can coexist. For example, in Equation (17), the ARSS flags can be hidden in the data of the non-zero coefficients at the odd positions in the scan order, and other data can be hidden in the data of the non-zero coefficients at the even positions in the scan order. This is similar in Equation (18). In the case of Equation (19), up to q different pieces of data can be hidden in the data of the non-zero coefficients.

In this way, the ARSS data hiding and the ARSS are controlled by the values of the transform quantization bypass flag transquant_bypass_flag, the transform skip flag ts_flag, the RDPCM enabled flag, and the like. That is, the relationship between the values is as in the table of FIG. 22 described above.

For example, in the Case #1 (transform quantization bypass is not applied, transform skip is applied, and (Inter/Intra) RDPCM is not applied), the ARSS data hiding is disabled. Therefore, in the Case #1, the reduction of the subjective image quality caused by the ARSS data hiding can be suppressed compared to the past technique.

In addition, for example, in the Case #2 (transform quantization bypass is not applied, transform skip is applied, and inter RDPCM is applied), the ARSS data hiding is disabled. Therefore, in the Case #2, the reduction of the subjective image quality caused by the ARSS data hiding can be suppressed, and the reduction in the prediction efficiency of RDPCM can be suppressed compared to the past technique.

In addition, for example, in the Case #3 (transform quantization bypass is not applied, transform skip is applied, and intra RDPCM is applied), the ARSS data hiding is disabled. Therefore, in the Case #3, the reduction of the subjective image quality caused by the ARSS data hiding can be suppressed, and the reduction in the prediction efficiency of RDPCM can be suppressed compared to the past technique.

In addition, for example, in the Case #4 (transform quantization bypass is applied, transform skip is not applied, and (Inter/Intra) RDPCM is not applied), the ARSS data hiding is disabled. Therefore, in the Case #4, the ARSS data hiding can be disabled to enable the lossless coding compared to the past technique.

In addition, for example, in the Case #5 (transform quantization bypass is applied, transform skip is not applied, and inter RDPCM is applied), the ARSS data hiding is disabled. Therefore, in the Case #5, the ARSS data hiding can be disabled to enable the lossless coding compared to the past technique. In addition, the reduction in the prediction efficiency of RDPCM caused by the ARSS data hiding can be suppressed.

In addition, for example, in the Case #6 (transform quantization bypass is applied, transform skip is not applied, and intra RDPCM is applied), the ARSS data hiding is disabled. Therefore, in the Case #6, the ARSS data hiding can be disabled to enable the lossless coding compared to the past technique. In addition, the reduction in the prediction efficiency of RDPCM caused by the ARSS data hiding can be suppressed.

Therefore, the reduction in the subjective image quality of the decoded image can be suppressed. Note that the ArssFlag is set to 0 when the ARSS data hiding is disabled, and the ARSS is not applied in these cases. Therefore, the ArssFlag does not have to be encoded, and the increase in the load of encoding can be suppressed (encoding is facilitated). In addition, the ArssFlag is not transmitted in this case, and the increase in the code amount can be suppressed.

4. Third Embodiment

<Signaling of ArssFlag>

In the first embodiment and the second embodiment, although the ArssFlag is set to 0 to disable the ARSS data hiding in the description above, the setting is not limited to this. In the case where the data hiding is not performed, the ArssFlag may be explicitly signaled.

Figure 31:
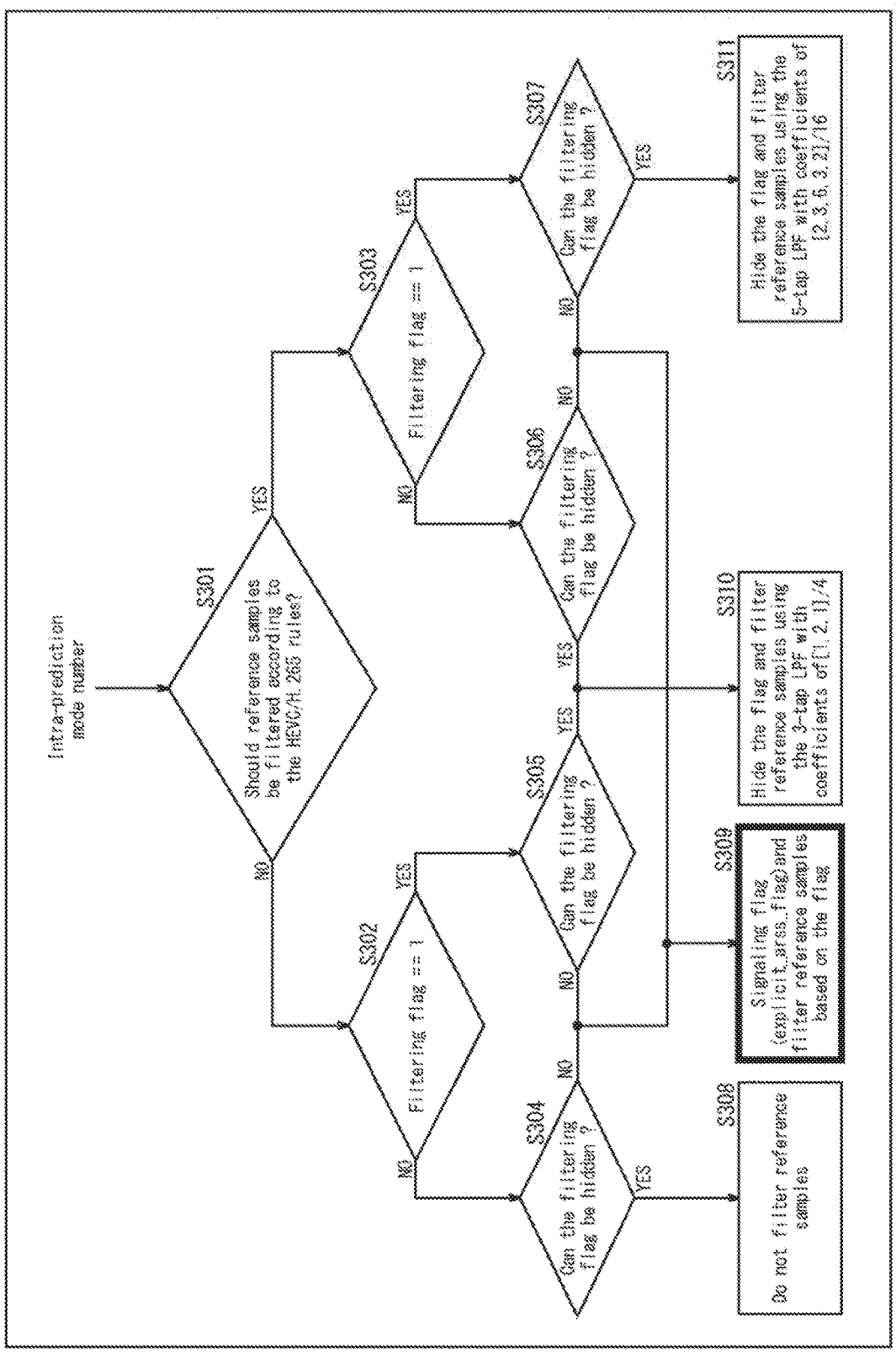
FIG. 31 is a diagram illustrating an example of a situation of replacement in the ARSS data hiding.

For example, identification information (identification number) for identifying the intra prediction mode may be processed as in S308 to S311 according to determination of steps S301 to S307 in FIG. 31. In this case, the data is hidden in the cases of step S308, step S310, and step S311, and ArssFlag (explicit_arss_flag) is explicitly signaled in the case of step S309.

<Flow of Decoding Process>

In this case, the image decoding apparatus 100 has a configuration similar to the case of the first embodiment. In addition, the image decoding process (FIG. 16), the prediction process (FIG. 17), the intra prediction process (FIG. 18), and the filter selection process (FIG. 19) are executed as in the case of the first embodiment.

Figure 32:
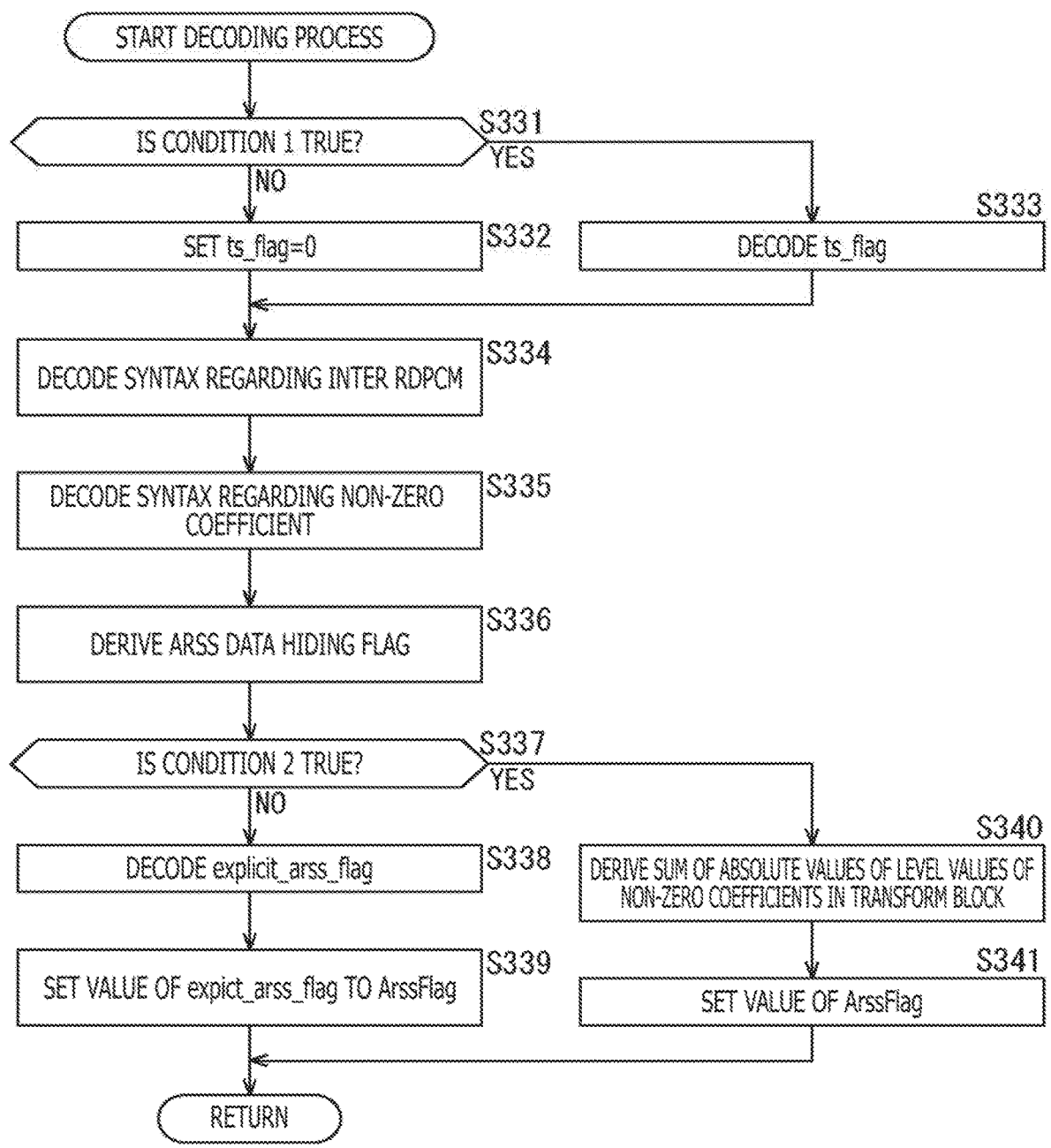
FIG. 32 is a flow chart describing an example of flow of a decoding process.

An example of a flow of the decoding process in this case will be described with reference to a flow chart of FIG. 32. Note that FIG. 33 illustrates an example of the syntax corresponding to the decoding process.

Figure 20:
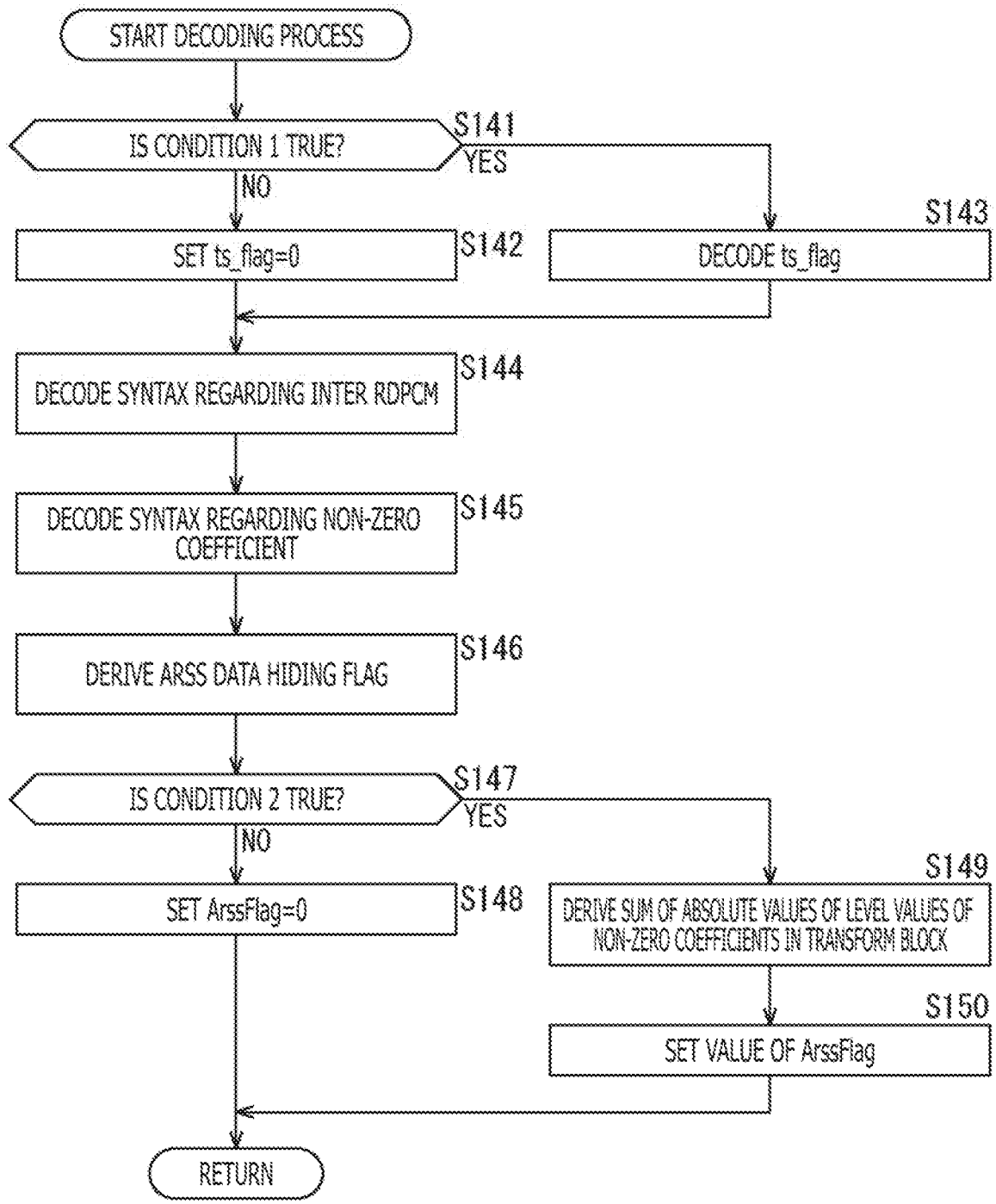
FIG. 20 is a flow chart describing an example of a flow of a decoding process.

Processes of steps S331 to S337 are executed as in the processes of steps S141 to S147 (FIG. 20). In a case where it is determined that the condition 2 is false (0) in step S337, the process proceeds to step S338.

In step S338, the ARSS flag decoding unit 195 decodes an ARSS control flag explicit_arss_flag from the encoded data. The process corresponds to the syntax of eleventh to thirteenth rows from above in FIG. 33. The semantics regarding the ARSS control flag explicit_arss_flag is as illustrated in FIG. 34.

The ARSS control flag explicit_arss_flag is a flag indicating whether to apply an adaptive reference sample smoothing process to the reference pixel used for the intra prediction of the block to be processed. A case in which the value of the ARSS control flag explicit_arss_flag is 1 indicates that the adaptive reference sample smoothing process is to be applied to the reference pixel to be used for the intra prediction of the block to be processed. A case in which the value of the ARSS control flag explicit_arss_flag is 0 indicates that the adaptive reference sample smoothing process is not to be applied to the reference pixel to be used for the intra prediction of the block to be processed. Note that the meaning of the values of the flag may be switched. For example, in the case in which the value is 1 may indicate that the adaptive reference sample smoothing process is not to be applied, and the case in which the value is 0 may indicate that the adaptive reference sample smoothing process is to be applied.

In step S339, the ARSS flag decoding unit 195 sets the value of the decoded ARSS control flag explicit_arss_flag to ArssFlag as in the following Equation (21).

$$\text{ArssFlag}=\text{explicit\_arss\_flag} \qquad (21)$$

When the process of step S339 is finished, the decoding process ends, and the process returns to FIG. 16. In addition, processes of step S340 and step S341 are executed as in the processes of step S149 and step S150 (FIG. 20).

As described, when the data hiding is disabled in this case, the ArssFlag is explicitly transmitted as the ARSS control flag explicit_arss_flag. Therefore, the image decoding apparatus 100 can apply the adaptive reference smoothing process based on the ArssFlag (ARSS control flag explicit_arss_flag).

That is, in each case, the ARSS data hiding flag and the ArssFlag (ARSS control flag explicit_arss_flag) are handled as in a table of FIG. 35.

For example, in the Case #1 (transform quantization bypass is not applied, transform skip is applied, and (Inter/Intra) RDPCM is not applied), the ARSS data hiding is disabled, and the explicit_arss_flag (ArssFlag) is signaled. Therefore, in the Case #1, the reduction of the subjective image quality caused by the ARSS data hiding can be suppressed compared to the past technique. Furthermore, the ARSS can be controlled to suppress the reduction of the encoding efficiency.

In addition, for example, in the Case #2 (transform quantization bypass is not applied, transform skip is applied, and Inter RDPCM is applied), the ARSS data hiding is disabled, and the explicit_arss_flag (ArssFlag) is signaled. Therefore, in the Case #2, the reduction of the subjective image quality caused by the ARSS data hiding can be suppressed, and the reduction in the prediction efficiency of RDPCM can be suppressed compared to the past technique. Furthermore, the ARSS can be controlled to suppress the reduction of the encoding efficiency.

In addition, for example, in the Case #3 (transform quantization bypass is not applied, transform skip is applied, and Intra RDPCM is applied), the ARSS data hiding is disabled, and the explicit_arss_flag (ArssFlag) is signaled. Therefore, in the Case #3, the reduction of the subjective image quality caused by the ARSS data hiding can be suppressed, and the reduction in the prediction efficiency of RDPCM can be suppressed compared to the past technique. Furthermore, the ARSS can be controlled to suppress the reduction of the encoding efficiency.

In addition, for example, in the Case #4 (transform quantization bypass is applied, transform skip is not applied, and (Inter/Intra) RDPCM is not applied), the ARSS data hiding is disabled, and the explicit_arss_flag (ArssFlag) is signaled. Therefore, in the Case #4, the ARSS data hiding can be disabled to enable the lossless coding compared to the past technique. Furthermore, the ARSS can be controlled to suppress the reduction of the encoding efficiency.

In addition, for example, in the Case #5 (transform quantization bypass is applied, transform skip is not applied, and Inter RDPCM is applied), the ARSS data hiding is disabled, and the explicit_arss_flag (ArssFlag) is signaled. Therefore, in the Case #5, the ARSS data hiding can be disabled to enable the lossless coding compared to the past technique. In addition, the reduction in the prediction efficiency of RDPCM caused by the ARSS data hiding can be suppressed. Furthermore, the ARSS can be controlled to suppress the reduction of the encoding efficiency.

In addition, for example, in the Case #6 (transform quantization bypass is applied, transform skip is not applied, and intra RDPCM is applied), the ARSS data hiding is disabled, and the explicit_arss_flag (ArssFlag) is signaled. Therefore, in the Case #6, the ARSS data hiding can be disabled to enable the lossless coding compared to the past technique. In addition, the reduction in the prediction efficiency of RDPCM caused by the ARSS data hiding can be suppressed. Furthermore, the ARSS can be controlled to suppress the reduction of the encoding efficiency.

Therefore, the reduction in the subjective image quality of the decoded image can be suppressed.

5. Fourth Embodiment

<Flow of Encoding Process>

Next, encoding for generating the encoded data to be decoded as in the third embodiment will be described. In this case, the image encoding apparatus 200 also has a configuration similar to the case of the second embodiment. In addition, the image encoding process (FIG. 27), the prediction process (FIG. 28), and the intra prediction process (FIG. 29) are executed as in the case of the second embodiment.

An example of a flow of the encoding process in this case will be described with reference to a flow chart of FIG. 36. Note that the syntax illustrated in FIG. 33 corresponds to the encoding process.

Figure 30:
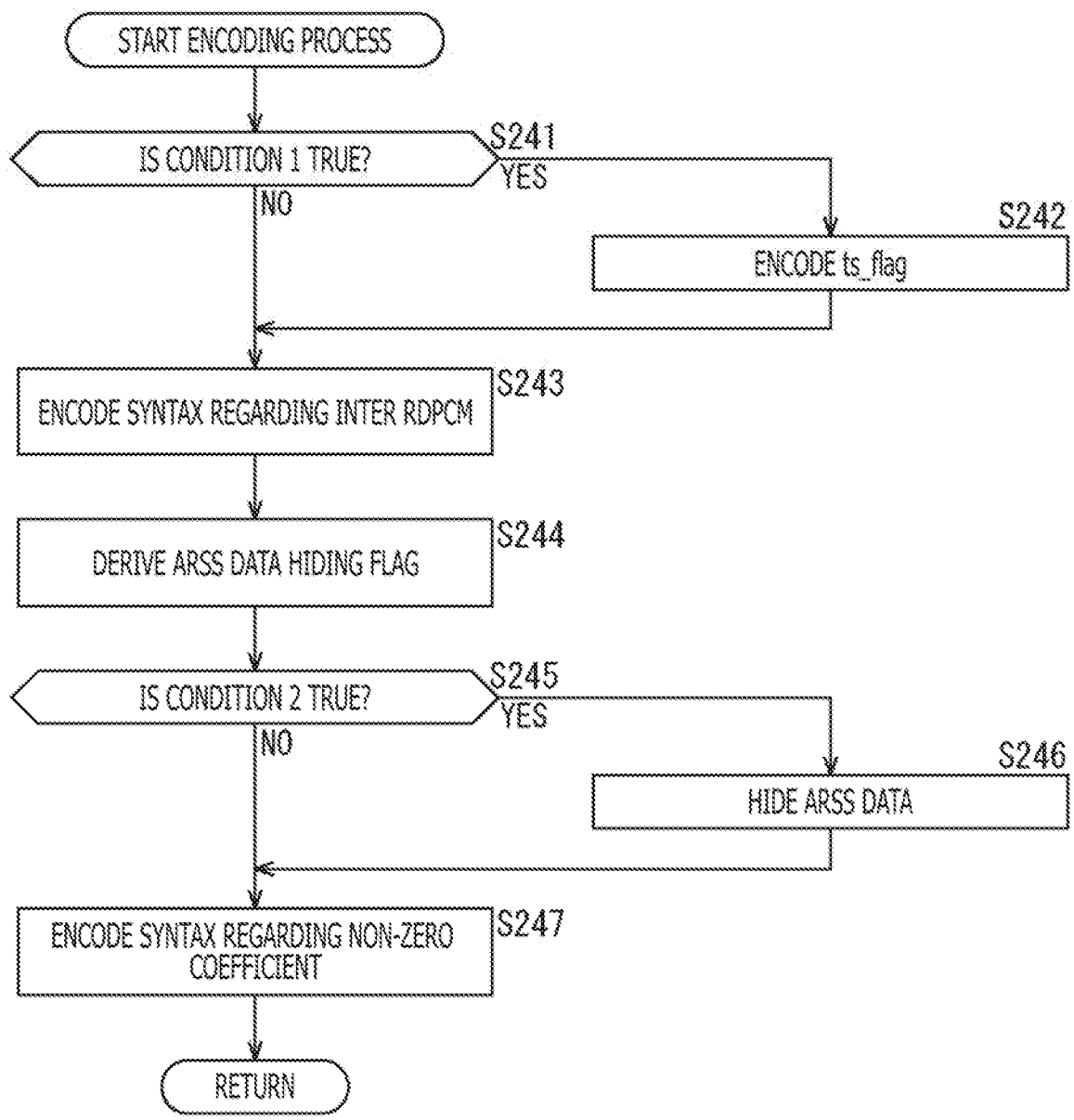
FIG. 30 is a flow chart describing an example of a flow of as encoding process.

Processes of steps S361 to S365 are executed as in the processes of steps S341 to S245 (FIG. 30). In a case where it is determined that the condition 2 is false (0) in step S345, the process proceeds to step S366.

In step S366, the ARSS data hiding unit 294 sets the value of the ArssFlag to the ARSS control flag explicit_arss_flag as in the following Equation (22).

$$\text{explicit\_arss\_flag}=\text{ArssFlag} \qquad (22)$$

In step S367, the ARSS data hiding unit 294 encodes the ARSS control flag explicit_arss_flag. When the process of step S367 is finished, the process proceeds to step S369.

Processes of step S368 and step S369 are executed as in the processes of step S246 and step S247 (FIG. 30).

As described, when the data hiding is disabled in this case, the ArssFlag is explicitly transmitted as the ARSS control flag explicit_arss_flag. Therefore, the image encoding apparatus 200 can apply the adaptive reference sample smoothing process based on the ArssFlag (ARSS control flag explicit_arss_flag).

That is, in each case, the ARSS data hiding flag and the ArssFlag (ARSS control flag explicit_arss_flag) are handled as in the table of FIG. 35 described above.

For example, in the Case #1 (transform quantization bypass is not applied, transform skip is applied, and (Inter/Intra) RDPCM is not applied), the ARSS data hiding disabled, and the explicit_arss_flag (ArssFlag) is signaled. Therefore, in the Case #1, the reduction of the subjective image quality caused by the ARSS data hiding can be suppressed compared to the past technique. Furthermore, the ARSS can be controlled to suppress the reduction of the encoding efficiency.

In addition, for example, in the Case #2 (transform quantization bypass is not applied, transform skip is applied, and Inter RDPCM is applied), the ARSS data hiding is disabled, and the explicit_arss_flag (ArssFlag) is signaled. Therefore, in the Case #2, the reduction of the subjective image quality caused by the ARSS data hiding can be suppressed, and the reduction in the prediction efficiency of RDPCM can be suppressed compared to the past technique. Furthermore, the ARSS can be controlled to suppress the reduction of the encoding efficiency.

In addition, for example, in the Case #3 (transform quantization bypass is not applied, transform skip is applied, and intra RDPCM is applied), the ARSS data hiding is disabled, and the explicit_arss_flag (ArssFlag) is signaled. Therefore, in the Case #3, the reduction of the subjective image quality caused by the ARSS data hiding can be suppressed, and the reduction in the prediction efficiency of RDPCM can be suppressed compared to the past technique. Furthermore, the ARSS can be controlled to suppress the reduction of the encoding efficiency.

In addition, for example, in the Case #4 (transform quantization bypass is applied, transform skip is not applied, and (Inter/Intra) RDPCM is not applied), the ARSS data hiding is disabled, and the explicit_arss_flag (ArssFlag) is signaled. Therefore, in the Case #4, the ARSS data hiding can be disabled to enable the lossless coding compared to the past technique. Furthermore, the ARSS can be controlled to suppress the reduction of the encoding efficiency.

In addition, for example, in the Case #5 (transform quantization bypass is applied, transform skip is not applied, and Inter RDPCM is applied), the ARSS data hiding is disabled, and the explicit_arss_flag (ArssFlag) is signaled. Therefore, in the Case #5, the ARSS data hiding can be disabled to enable the lossless coding compared to the past technique. In addition, the reduction in the prediction efficiency of RDPCM caused by the ARSS data hiding can be suppressed. Furthermore, the ARSS can be controlled to suppress the reduction of the encoding efficiency.

In addition, for example, in the Case #6 (transform quantization bypass is applied, transform skip is not applied, and intra RDPCM is applied), the ARSS data hiding is disabled, and the explicit_arss_flag (ArssFlag) is signaled. Therefore, in the Case #6, the ARSS data hiding can be disabled to enable the lossless coding compared to the past technique. In addition, the reduction in the prediction efficiency of RDPCM caused by the ARSS data hiding can be suppressed. Furthermore, the ARSS can be controlled to suppress the reduction of the encoding efficiency.

Therefore, the reduction in the subjective image quality of the decoded image can be suppressed.

6. Fifth Embodiment

<Disabling Hiding of Target Data>

Although the data hiding of the ArssFlag has been described in the embodiments, the target of control according to the present technique is not limited to the ArssFlag. Arbitrary data to be hidden can be the target of the present technique. Hereinafter, the data to be hidden will be referred to as target data (target_data). The target data can be any data. For example, similar to the ArssFlag, the target data may be control data for controlling a predetermined process.

<Decoding Unit>

In that case, the control of the image decoding apparatus 100 can be similar to the case of the first embodiment. That is, the data hiding of the target data may be disabled in the case where the transform quantization bypass is applied, in the case where the transform skip is applied, or in the case where the RDPCM is applied. The target data may not be transmitted from the encoding side and may be set to the initial value.

Figure 37:
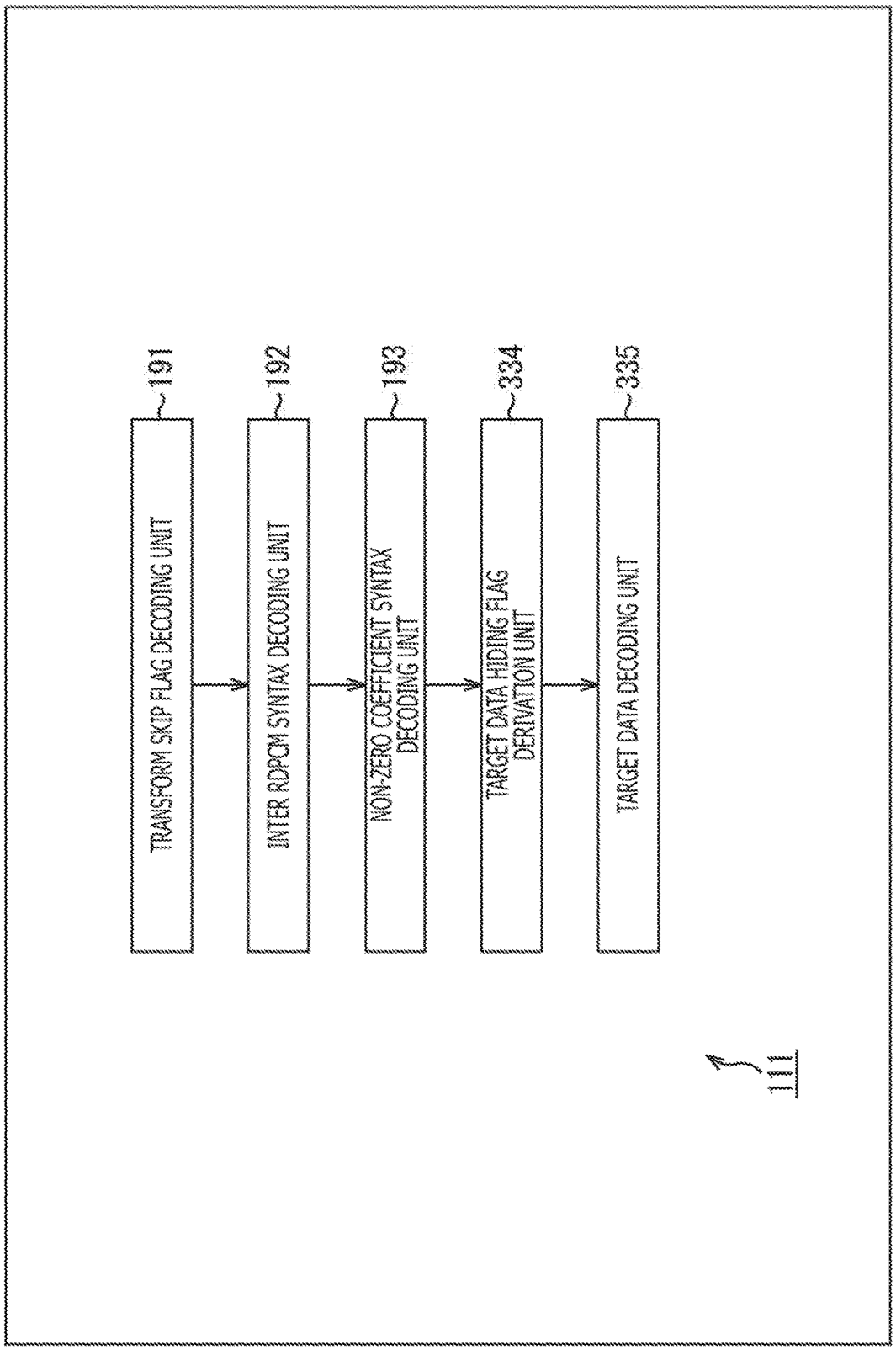
FIG. 37 is a block diagram illustrating a main configuration example of the decoding unit.

In that case, the image decoding apparatus 100 basically has a configuration similar to the configuration described in the first embodiment. FIG. 37 is a block diagram illustrating a main configuration example of the decoding unit 111 in this case. The decoding unit 111 can process not only the ArssFlag, but also general target data. That is, as illustrated in FIG. 37, the decoding unit 111 includes a target data hiding flag derivation unit 334 in place of the ARSS data hiding flag derivation unit 194 of the case of FIG. 15 and includes a target data decoding unit 335 in place of the ARSS flag decoding unit 195.

The target data hiding flag derivation unit 334 is configured to execute a process regarding derivation of a target data hiding flag indicating whether to hide the target data. The target data decoding unit 335 is configured to execute a process regarding decoding of target data indicating whether to apply a predetermined process.

<Flow of Decoding Process>

An example of a flow of the decoding process executed by the decoding unit 111 will be described with reference to a flow chart of FIG. 38. Note that the other processes can be executed as in the case of the first embodiment.

The processes of steps S381 to S385 are executed as in the processes of steps S141 to S145.

In step S386, the target data hiding flag derivation unit 334 derives a target data hiding flag. The derivation method is similar to the derivation method of the ARSS data hiding flag in step S146.

In step S387, the target data decoding unit 335 determines whether the condition 2 is true. In this case, a conditional expression as illustrated for example in FIG. 39 is set for the condition 2.

In a case where the target data decoding unit 335 determines that the condition 2 is false (0), the process proceeds to step S388. In step S388, the target data decoding unit 335 initializes the target data. That is, the target data with the initial value is set. The initial value may be any value.

When the process of step S388 is finished, the decoding process ends, and the process returns to FIG. 16. Furthermore, in a case where the target data decoding unit 335 determines that the condition 2 is true in step S387, the process proceeds to step S389. In step S389, the target data decoding unit 335 uses Equation (14) described above (or Equations (17) to (19)) to derive the sum of absolute values absSum of the level values of the non-zero coefficients in the transform block. Furthermore, in step S390, the target data decoding unit 335 sets the value of the target data based on whether the derived sum of absolute values of the level values of the non-zero coefficients in the transform block is even or odd. That is, the target data decoding unit 335 extracts the hidden target data from the encoded data. When the process of step S390 is finished, the decoding process ends, and the process returns to FIG. 16.

Therefore, in this case, the target data and the data hiding of the target data are controlled as in FIG. 40 based on the values of the transform quantization bypass flag transquant_bypass_flag, the transform skip flag ts_flag, the RDPCM enabled flag, and the like. That is, in each case, the control is performed as in the case of the first embodiment, and similar advantages effects can be obtained. Therefore, the reduction in the subjective image quality of the decoded image can also be suppressed in this case.

7. Sixth Embodiment

<Encoding Unit>

Next, encoding for generating encoded data to be decoded as described above will be described. In this case, the image encoding apparatus 200 can also perform the control as in the case of the second embodiment. That is, the data hiding of the target data may be disabled in the case where the transform quantization bypass is applied, in the case where the transform skip is applied, or in the case where the RDPCM is applied. The target data may not be transmitted and may be set to the initial value on the decoding side.

Figure 41:
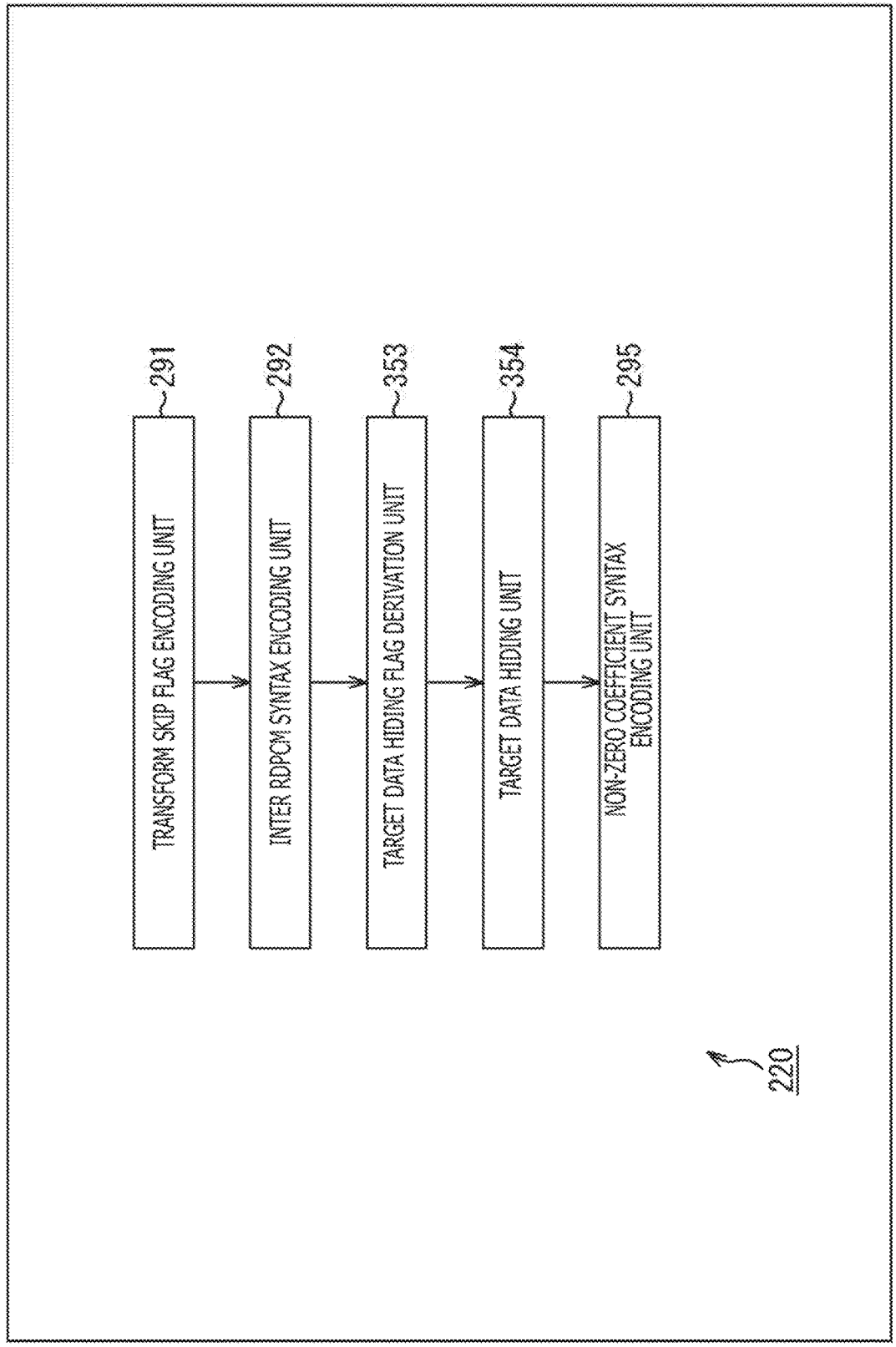
FIG. 41 is a block diagram illustrating a main configuration example of the encoding unit.

In that case, the image encoding apparatus 200 basically has a configuration similar to the configuration described in the second embodiment. FIG. 41 is a block diagram illustrating a main configuration example of the encoding unit 220 in this case. The encoding unit 220 can process not only the ArssFlag, it also general target data. That is, as illustrated in FIG. 41, the encoding unit 220 includes a target data hiding flag derivation unit 353 in place of the ARSS data hiding flag derivation unit 293 in the case of FIG. 26 and includes a target data hiding unit 354 in place of the ARSS data hiding unit 294.

The target data hiding flag derivation unit 353 is configured to execute a process regarding derivation of the target data hiding flag indicating whether to hide the target data. The target data hiding unit 354 is configured to execute a process regarding hiding of the target data.

<Flow of Encoding Process>

An example of a flow of the encoding process executed by the encoding unit 220 will be described with reference to a flow chart of FIG. 42. Note that the other processes can be executed as in the case of the second embodiment.

Processes of steps S401 to S403 are executed as in the processes of steps S241 to S243 (FIG. 30).

In step S404, the target data hiding flag derivation unit 353 derives the target data hiding flag. The derivation method is similar to the derivation method of the ARSS data hiding flag in step S244.

In step S405, the target data hiding unit 354 determines whether the condition 2 is true. In this case, the conditional expression as illustrated for example in FIG. 29 is set for the condition 2.

In a case where the target data hiding unit 354 determines that the condition 2 is true (1), the process proceeds to step S406. In step S406, the target data hiding unit 354 hides the target data. More specifically, when the value of the target data is 1 (true), the target data hiding unit 354 corrects, for example, the coefficient value of the last coefficient so that the sum of absolute values of the level values of the non-zero coefficients in the transform block becomes odd. The correction method of the correction value in this case is similar to the case of the second embodiment.

When the process of step S406 is finished, the process proceeds to step S407. Furthermore, in a case where the target data hiding unit 354 determines that the condition 2 is false (0) in step S405, the process of step S406 is skipped, and the process proceeds to step S407.

The process of step S407 is executed as in the process of step S247 (FIG. 30).

Therefore, is this case, the target data and the data hiding of the target data are controlled as in FIG. 40 based on the values of the transform quantization bypass flag transquant_bypass_flag, the transform skip flag ts_flag, the RDPCM enabled flag, and the like. That is, in each case, the control is performed as in the case of the second embodiment, and similar advantageous effects can be obtained.

Therefore, in this case, the reduction in the subjective image quality of the decoded image can also be suppressed.

8. Seventh Embodiment

<Explicit Signaling of Target Data>

In the case where the target data is the target as in the fifth embodiment and the sixth embodiment, the target data may also be explicitly signaled in the case where the data hiding is disabled as in the third embodiment.

<Flow of Decoding Process>

Figure 43:
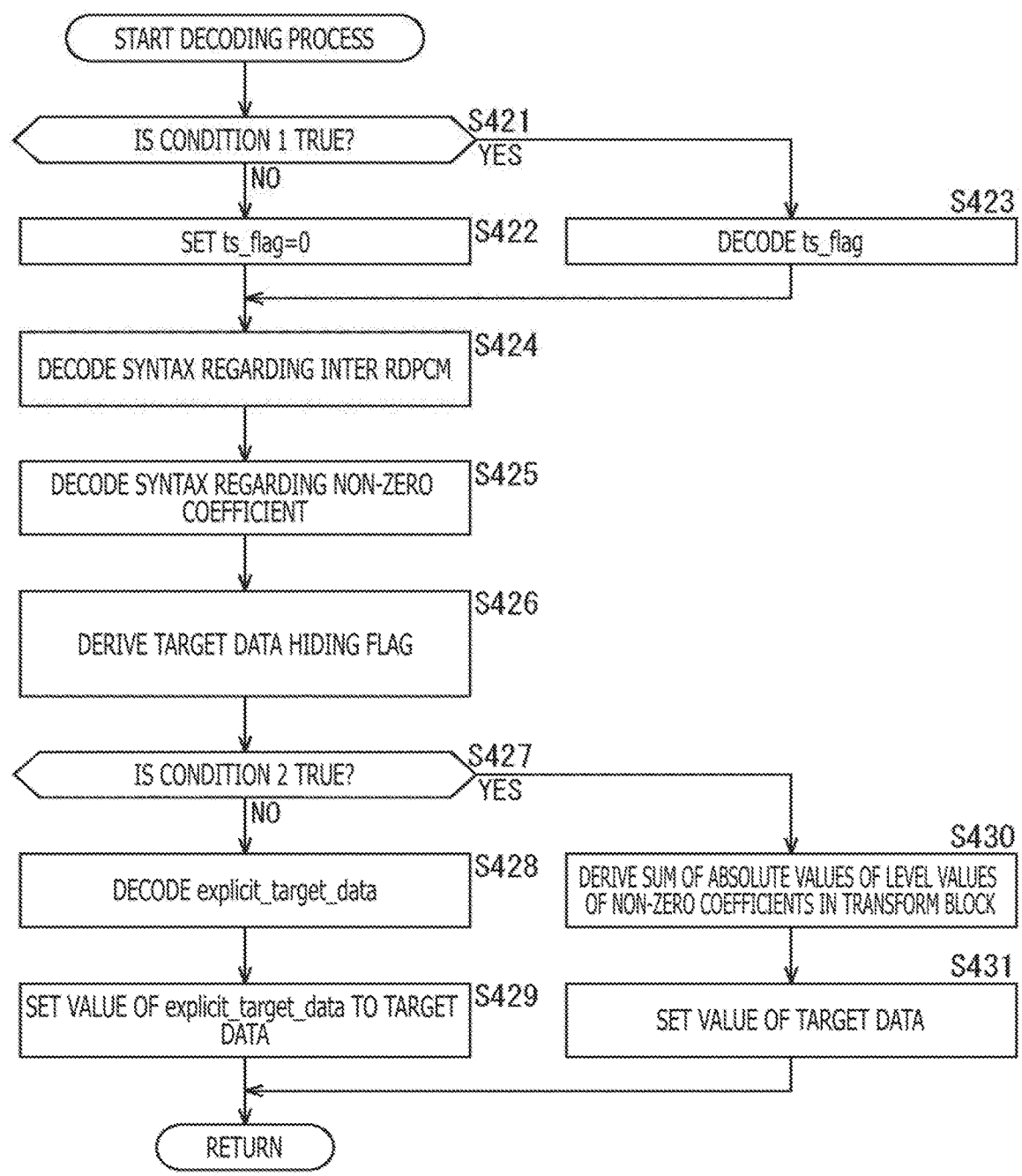
FIG. 43 is a flow chart describing an example of flow of a decoding process.

In this case, the image decoding apparatus 100 also has a configuration similar to the case of the fifth embodiment. An example of a flow of the decoding process in this case will be described with reference to a flow chart of FIG. 43. Note that the other processes can be executed as is the case of the first embodiment.

Figure 38:
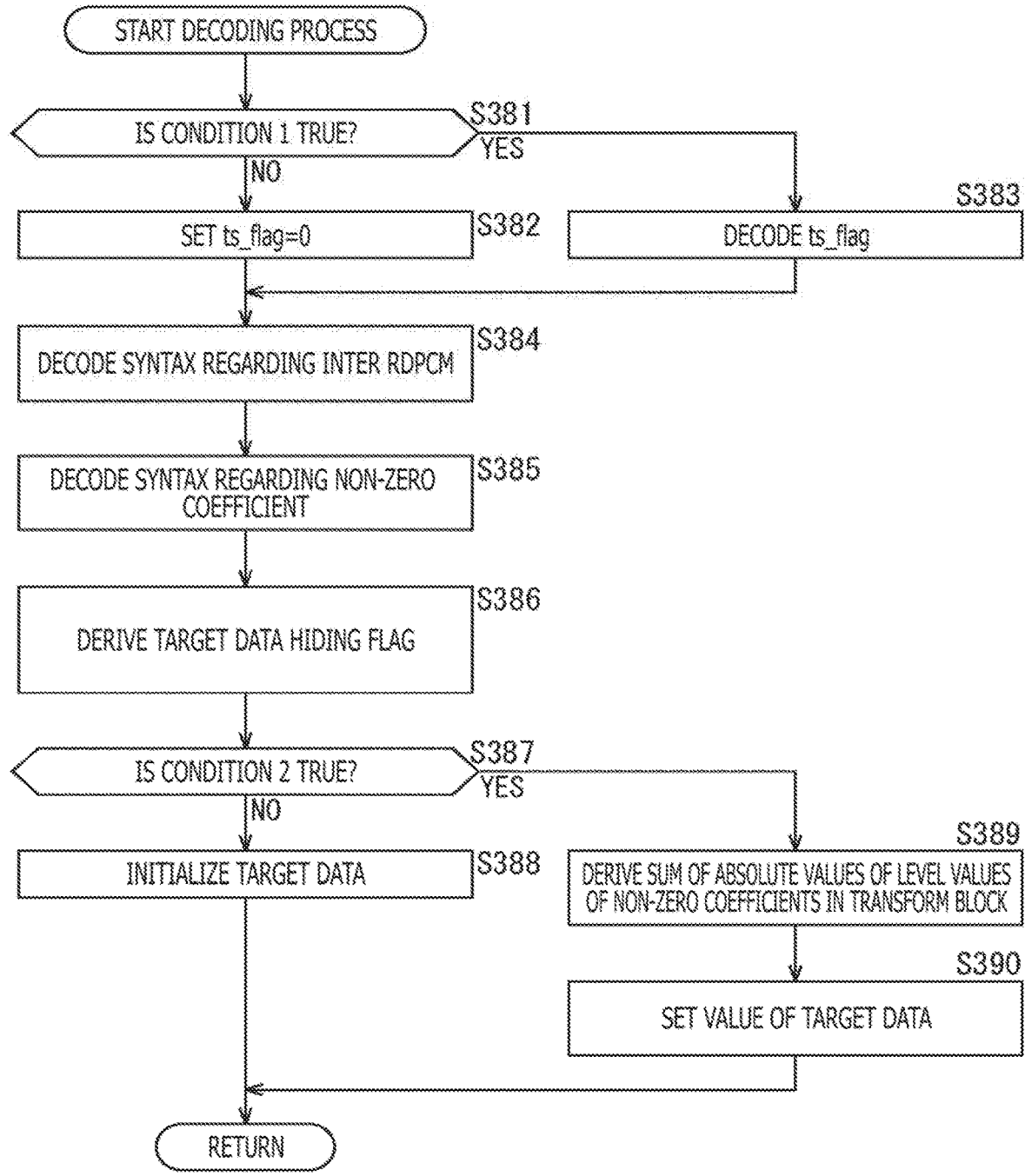
FIG. 38 is a flow chart describing an example of a flow of a decoding process.

Processes of steps S421 to S427 are executed as in the processes of steps S381 to S387 (FIG. 38). In a case where it is determined that the condition 2 is false (0) in step S427, the process proceeds to step S428.

In step S428, the target data decoding unit 335 decodes the target data control flag explicit_target_data from the encoded data.

In step S429, the target data decoding unit 335 sets the value of the target data control flag explicit_target_data to the target data (target_data).

When the process of step S429 is finished, the decoding process ends, and the process returns to FIG. 16. In addition, processes of step S430 and step S431 are executed as is the processes of step S389 and step S390 (FIG. 38).

As described, in this case, the target data is explicitly transmitted as the target data control flag explicit_target_data when the data hiding is disabled. Therefore, the image decoding apparatus 100 can execute a predetermined process based on the target data (target data control flag explicit_target_data).

That is, in each case, the target data hiding flag and the target data (target data control flag explicit_target_data) are controlled as in a table of FIG. 44. That is, in each case, the control is performed as in the case of the third embodiment, and similar advantageous effects can be obtained. Therefore, the reduction in the subjective image quality of the decoded image can also be suppressed in this case.

9. Eighth Embodiment

<Flow of Encoding Process>

Next, encoding for generating encoded data decoded as described above will be described. In this case, the image encoding apparatus 200 can also perform the control as in the case of the fourth embodiment. That is, the data hiding of the target data may be disabled in the case where the transform quantization bypass is applied, in the case where the transform skip is applied, or in the case where the RDPCM is applied. The target data may be explicitly signaled.

Figure 45:
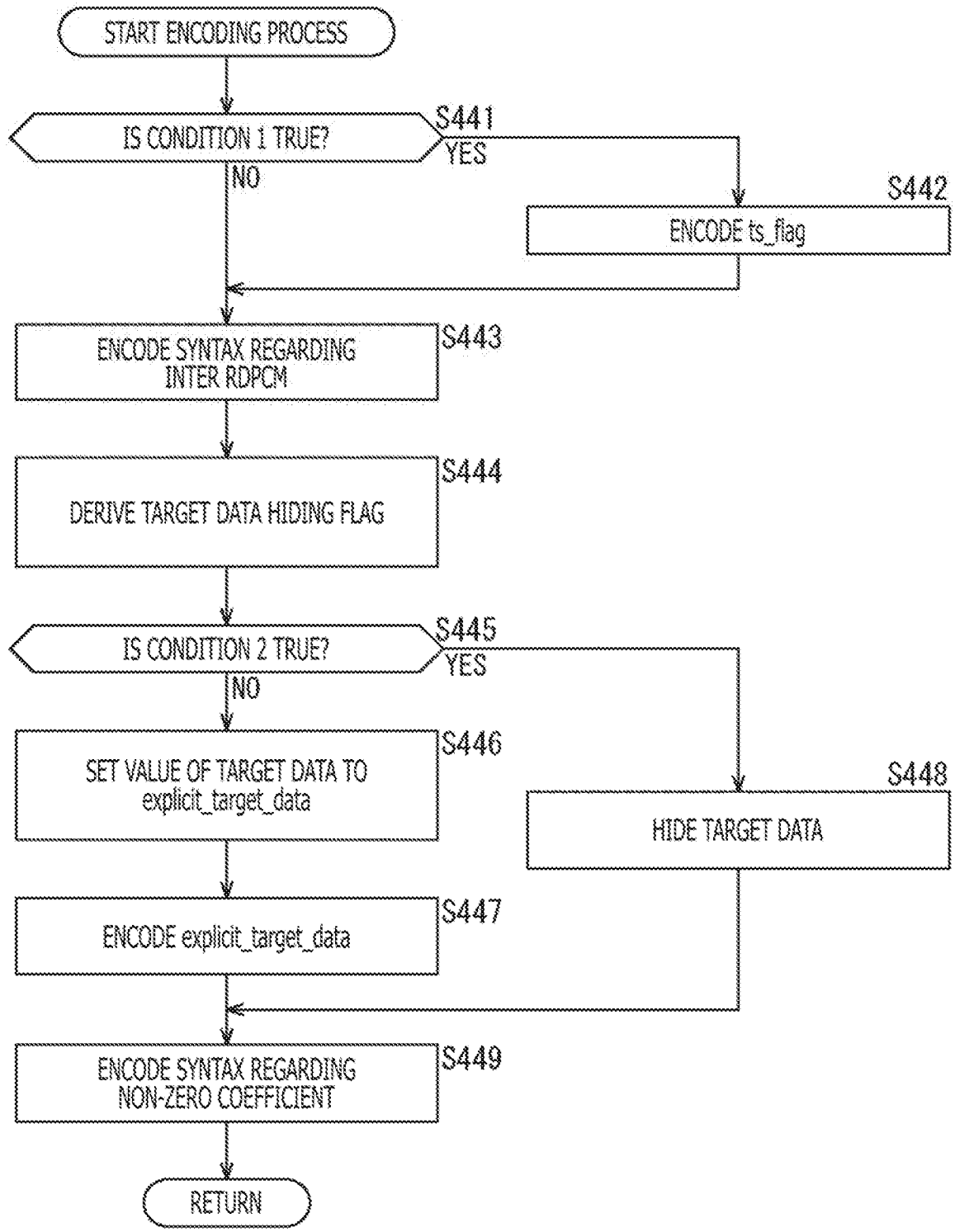
FIG. 45 is a flow chart describing an example of a flow of an encoding process.

In that case, the image encoding apparatus 200 basically has a configuration similar to the configuration described in the fourth embodiment. An example of a flow of the encoding process in this case will be described with reference to a flow chart of FIG. 45. Note that the other processes can be executed as in the case of the fourth embodiment.

Figure 42:
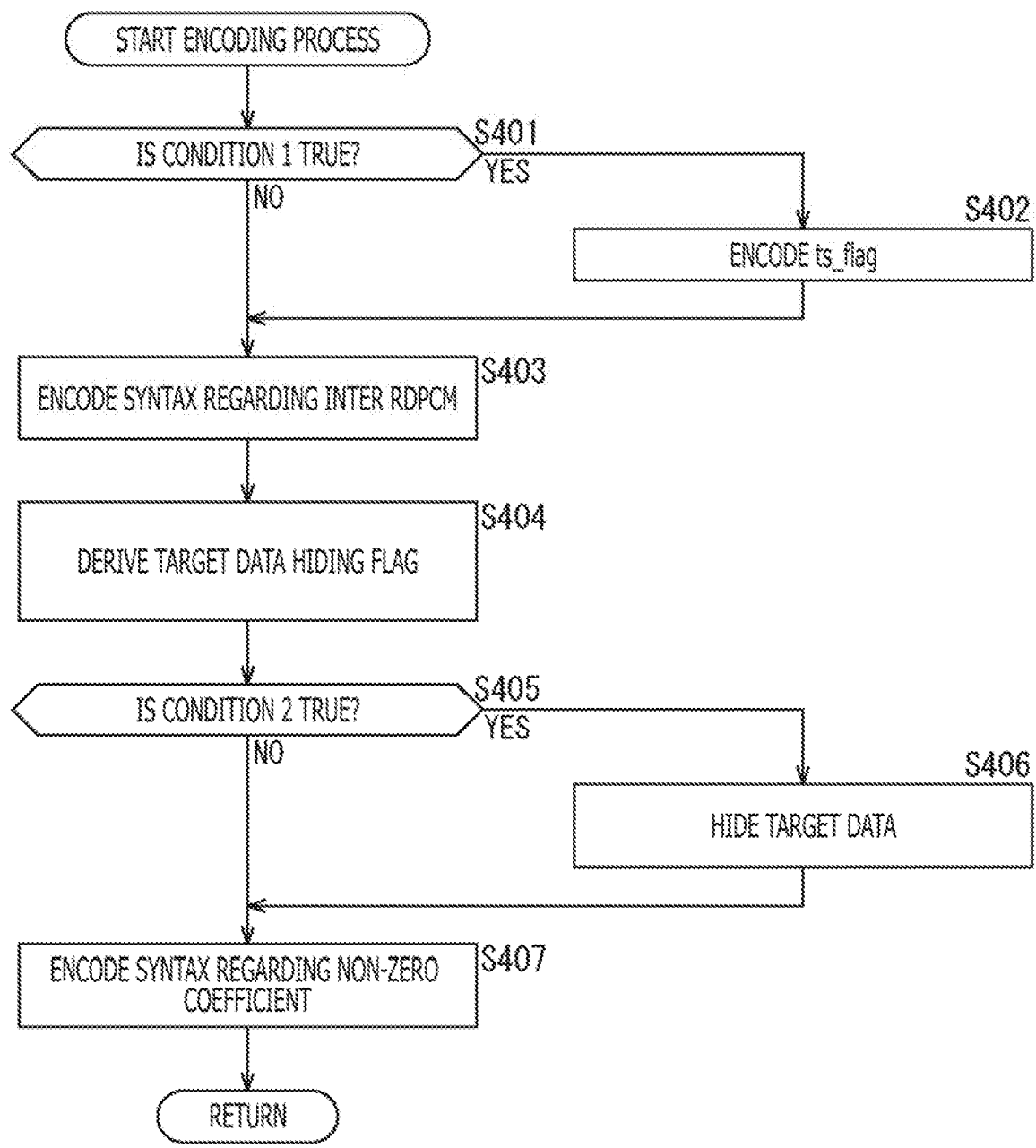
FIG. 42 is a flow chart describing an example of a flow of an encoding process.

Processes of steps S441 to S445 are executed as in the processes of steps S401 to S405 (FIG. 42).

In a case where it is determined that the condition 2 is false (0) in step S445, the process proceeds to step S446. In step S446, the target data hiding unit 354 sets the value of the target data to the target data control flag explicit_target_data.

In step S447, the target data hiding unit 354 encodes the target data control flag explicit_target_data. When the process of step S447 is finished, the process proceeds to step S449.

Processes of step S448 and step S449 are executed as in the processes of step S406 and step S407 (FIG. 42).

As described, in this case, the target data is explicitly transmitted as the target data control flag explicit_target_data when the data hiding is disabled. Therefore, the image encoding apparatus 200 can execute a predetermined process based on the target data (target data control flag explicit_target_data).

That is, in each case, the target data hiding flag and the target data (target data control flag explicit_target_data) are controlled as in the table of FIG. 44 described above. That is, in each case, the control is performed as in the case of the fourth embodiment, and similar advantageous effects can be obtained. Therefore, the reduction in the subjective image quality of the decoded image can also be suppressed in this case.

10. Ninth Embodiment

<Transform Information Tinfo>

The target data described in the fifth to eighth embodiments may be any information. For example, the target data may include a single piece of information or may include a plurality of pieces of information.

In addition, for example, the target data may include the transform information Tinfo. For example, the target data may include the adaptive primary transform flag apt_flag indicating whether to apply the adaptive primary transform in encoding (opposite process in decoding). FIG. 46 illustrates an example of the syntax of residual_coding in this case. As illustrated in FIG. 46, the condition of hiding in this case is as in the seventh row from above. When this AptFlagHidden is true, the adaptive primary transform flag apt_flag is hidden in the data as described in the ninth row and the tenth row from above. When the AptFlagHidden is false, the transmission of the adaptive primary transform flag apt_flag is skipped as in the twelfth row from above, and the value of the adaptive primary transform flag apt_flag is set to "0" on the decoding side.

Note that in the case where the data hiding is disabled, it is obvious that the adaptive primary transform flag apt_flag may be explicitly signaled. FIG. 47 illustrates an example of the syntax of the residual_coding in this case.

Figure 48:
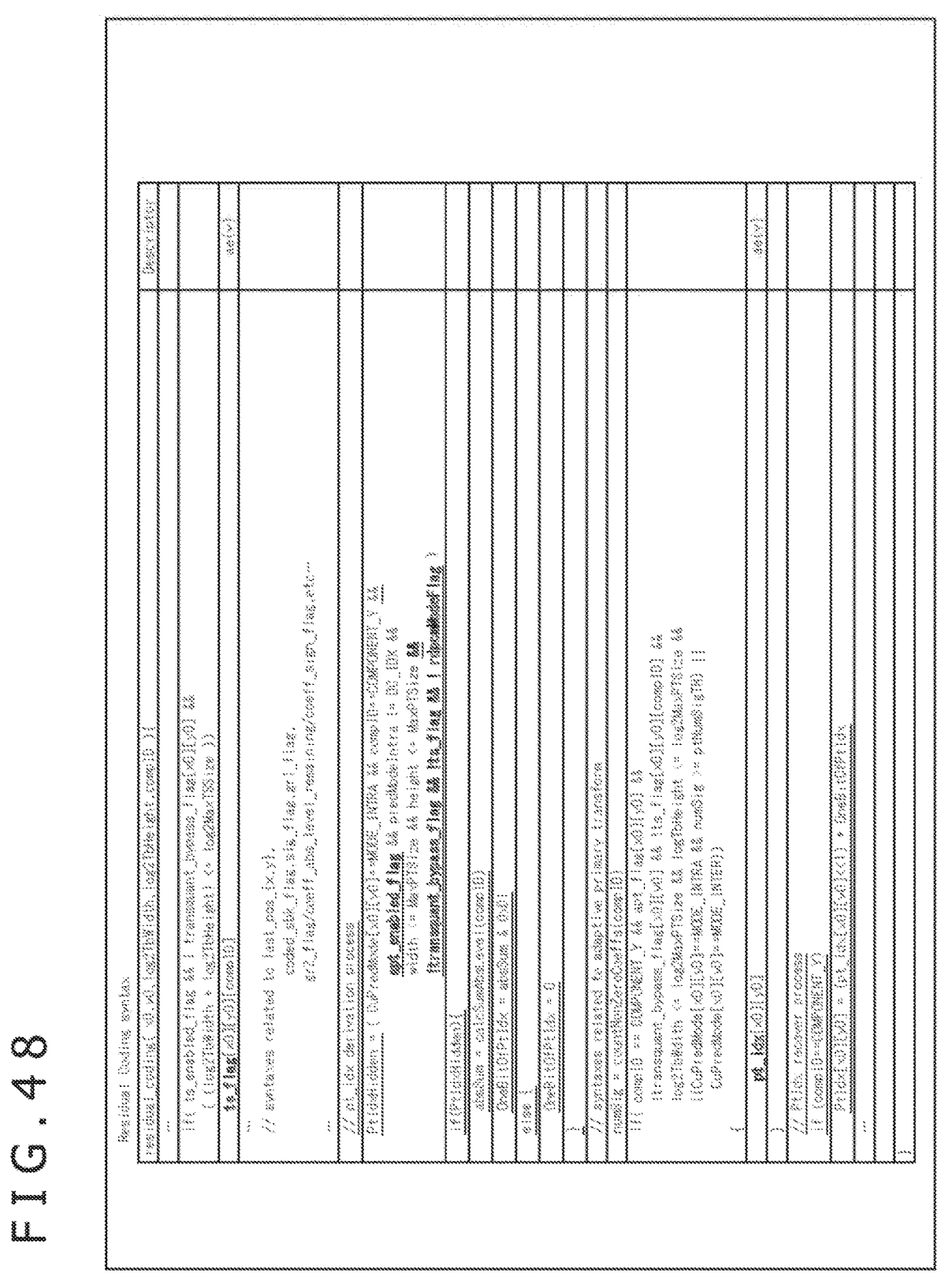

In addition, for example, the target data may include the primary transform identifier pt_idx that is an identifier indicating which primary transform (inverse primary transform) is to be applied for the primary transform (inverse primary transform) in the vertical direction and the horizontal direction. FIG. 48 illustrates an example of the syntax of the residual_coding in this case. This case can also be handled as in the case of FIG. 47.

As illustrated in FIG. 48, part of the bits of the primary transform identifier pt_idx may be hidden. For example, the upper one bit of the primary transform identifier pt_idx may be hidden, or the lower one bit may be hidden.

For example, in a case of PtIdxHidden=1 as in the eighth to tenth rows from above, that is, in a case where the syntax of part of the pt_idx (for example: upper bit, lower bit) is hidden, the lower bit of the pt_idx may be decoded based on the data hiding. In addition, for example, in a case of PtIdxHidden=0 as in the eleventh and twelfth rows from above, that is, in a case where the syntax of part of the pt_idx is not hidden, the lower bit may be estimated to be 0, and OneBitOfPtIdx=0 may be estimated.

Note that as described in the seventeenth row from above, the rest of the data excluding the lower bit of the pt_idx may be decoded in the case of PtIdxHidden=1, that is, in the case where the syntax of part of the pt_idx is hidden. The data including the lower bit of the pt_idx may be decoded from the encoded data in the case of PtIdxHidden=0.

Furthermore, as in the nineteenth and twentieth rows from above, the true primary transform identifier PtIdx may be derived from the decoded pt_idx and the OneBitOfPtIdx (lower bit of pt_idx) obtained by the opposite process of the data hiding.

In addition, for example, the target data may include the secondary transform identifier st_idx that is an identifier indicating which secondary transform (inverse secondary transform) is to be applied. FIG. 49 illustrates an example of the syntax of the residual_coding in this case. This case can also be handled as in the case of FIG. 48.

In these cases, advantageous effects similar to the cases of the embodiments described above can be obtained.

11. Tenth Embodiment

<Prediction Mode Information Pinfo>

In addition, the target data may include, for example, the prediction mode information Pinfo. For example, the target data may include luma intra prediction mode remaining data rem_intra_luma_pred_mode[x0][y0]. In addition, the target data may include, for example, chroma intra prediction mode intra_chroma_pred_mode[x0][y0]. In addition, the target data may include, for example, a merge index merge_idx. In addition, the target data may include, for example, an inter prediction identifier inter_pred_idc. In addition, the target data may include, for example, an identifier ref_idx_lX:LX(X=0,1) for designating the reference picture to be used for prediction. FIGS. 30 and 51 illustrate an example of the syntax of the prediction unit in the case where these pieces of information are included.

In addition, the upper one bit or the lower one bit of the data representing each syntax may be hidden. That is, part of the target data may be hidden. FIG. 52 illustrates an example of the syntax of the residual_coding in this case. That is, the case in which the target data is the prediction mode information Pinfo can be handled as in the case in which the target data is the transform information Tinfo.

12. Etc.

<Data Units of Information>

The data units in setting the information regarding the image or the information regarding encoding and decoding of the image (or the data units of the target data) described above are arbitrary, and the data units are not limited to the examples. For example, the information may be set for each TU (Transform Unit), TB (Transform Block), PU (Prediction Unit), PB (Prediction Block), CU (Coding Unit), ECU (Largest Coding Unit), sub-block, block, tile, slice, picture, sequence, or component, or the data in the data units may be the target. Obviously, the data unit is set for each piece of information. That is, all the information may not be set (or targeted) in the same data unit. Note that the storage location of the information is arbitrary, and the information may be stored in the header, the parameter set, or the like of the data unit described above. In addition, the information may be stored in a plurality of places.

<Control Information>

The control information regarding the present technique described in each of the embodiments may be transmitted from the encoding side to the decoding side. For example, control information (for example, enabled_flag) for controlling whether to permit (or prohibit) the application of the present technique described above may be transmitted. In addition, for example, control information for designating one or both of an upper limit and a lower limit of the block size that permits (or prohibits) the application of the present technique described above may be transmitted.

<Encoding and Decoding>

The present technique can be applied to arbitrary image encoding and decoding systems. That is, the specifications of various processes regarding the image encoding and decoding, such as the transform (inverse transform), the quantization (inverse quantization), the encoding (decoding), and the prediction, are arbitrary and are not limited to the examples described above. For example, a transform (inverse transform) other than the primary transform (inverse primary transform) and the secondary transform (inverse secondary transform) (that is, three or more transforms (inverse transforms)) may be performed in the transform (inverse transform). In addition, the encoding (decoding) may be a reversible system or an irreversible system. Furthermore, the quantization (inverse quantization), the loop filtering process, and the like may be skipped.

<Field of Application of Present Technique>

The systems, the apparatuses, the processing sections, and the like according to the present technique can be used in arbitrary fields, such as, for example, traffic, medical care, crime prevention, agriculture, livestock industry, mining industry, cosmetics, factories, home appliances, weather, and nature monitoring. The usage is also arbitrary.

For example, the present technique can be applied to a system or a device used for providing content to be viewed and the like. The present technique can also be applied to, for example, a system or a device used for traffic, such as for monitoring the traffic conditions and controlling the automatic drive. Furthermore, the present technique can be applied to, for example, a system or a device used for security. Furthermore, the present technique can be applied to, for example, a system or a device used for automatic control of a machine or the like. Furthermore, the present technique can also be applied to, for example, a system or a device used for agriculture or livestock industry. Furthermore, the present technique can also be applied to, for example, a system or a device that monitors the state of the nature, such as volcanos, forests, and oceans, and the wildlife. In addition, the present technique can also be applied to, for example, a system or a device used for sports.

<Application to Multi-View Image Encoding/Decoding System>

The series of processes described above can be applied to a multi-view image encoding/decoding system that performs encoding and decoding of multi-view images including images from a plurality of viewpoints (views). In that case, the present technique can be applied to the encoding and decoding from each viewpoint (view).

<Application to Tiered Image Encoding/Decoding System>

In addition, the series of processes described above can be applied to a tiered image encoding (scalable encoding) and decoding system that encodes and decodes tiered images divided into a plurality of layers (tiers) to provide a scalability function for a predetermined parameter. In that case, the present technique can be applied to the encoding and decoding of each tier (layer).

<Computer>

The series of processes described above can be executed by hardware or can be executed by software. In the case where the series of processes are executed by software, a program included in the software is installed on a computer. Here, examples of the computer include a computer incorporated into dedicated hardware and a general-purpose personal computer that can execute various functions by installing various programs.

FIG. 53 is a block diagram illustrating a configuration example of the hardware of the computer that uses a program to execute the series of processes described above.

In a computer 800 illustrated in FIG. 53, a CPU (Central Processing Unit) 801, a ROM (Read Only Memory) 802, and a RAM (Random Access Memory) 803 are connected to each other through a bus 804.

An input-output interface 810 is also connected to the bus 804. An input unit 811, an output unit 812, a storage unit 813, a communication unit 814, and a drive 815 are connected to the input-output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a non-volatile memory, and the like. The communication unit 814 includes, for example, a network interface. The drive 815 drives a removable medium 821, such as a magnetic disk, an optical disk, a magneto-optical disk, and a semiconductor memory.

In the computer configured in this way, the CPU 801 loads, for example, a program stored in the storage unit 813 to the RAM 803 through the input-output interface 810 and the bus 804 to execute the program to thereby execute the series of processes described above. Data and the like necessary for the CPU 801 to execute various processes are also appropriately stored in the RAM 803.

The program executed by the computer (CPU 801) can be applied by, for example, recording the program in the removable medium 621 as a package medium or the like. In this case, the removable medium 821 can be mounted on the drive 815 to install the program on the storage unit 813 through the input-output interface 810.

The program can also be provided through a wired or wireless transmission medium, such as a local area network, the Internet, and digital satellite broadcasting. In this case, the program can be received by the communication unit 814 and installed on the storage unit 813.

In addition, the program can also be installed in advance on the ROM 802 or the storage unit 813.

<Application of Present Technique>

The image encoding apparatus 200 and the image decoding apparatus 100 according to the embodiments described above can be applied to, for example, various electronic devices, such as a transmitter and a receiver in satellite broadcasting, cable broadcasting like cable TV, distribution through the Internet, or distribution to a terminal through cellular communication, a recording apparatus that records images in a medium like an optical disk, a magnetic disk, or a flash memory, and a reproduction apparatus that reproduces images from these storage media.

First Application Example

Television Receiver

Figure 54:
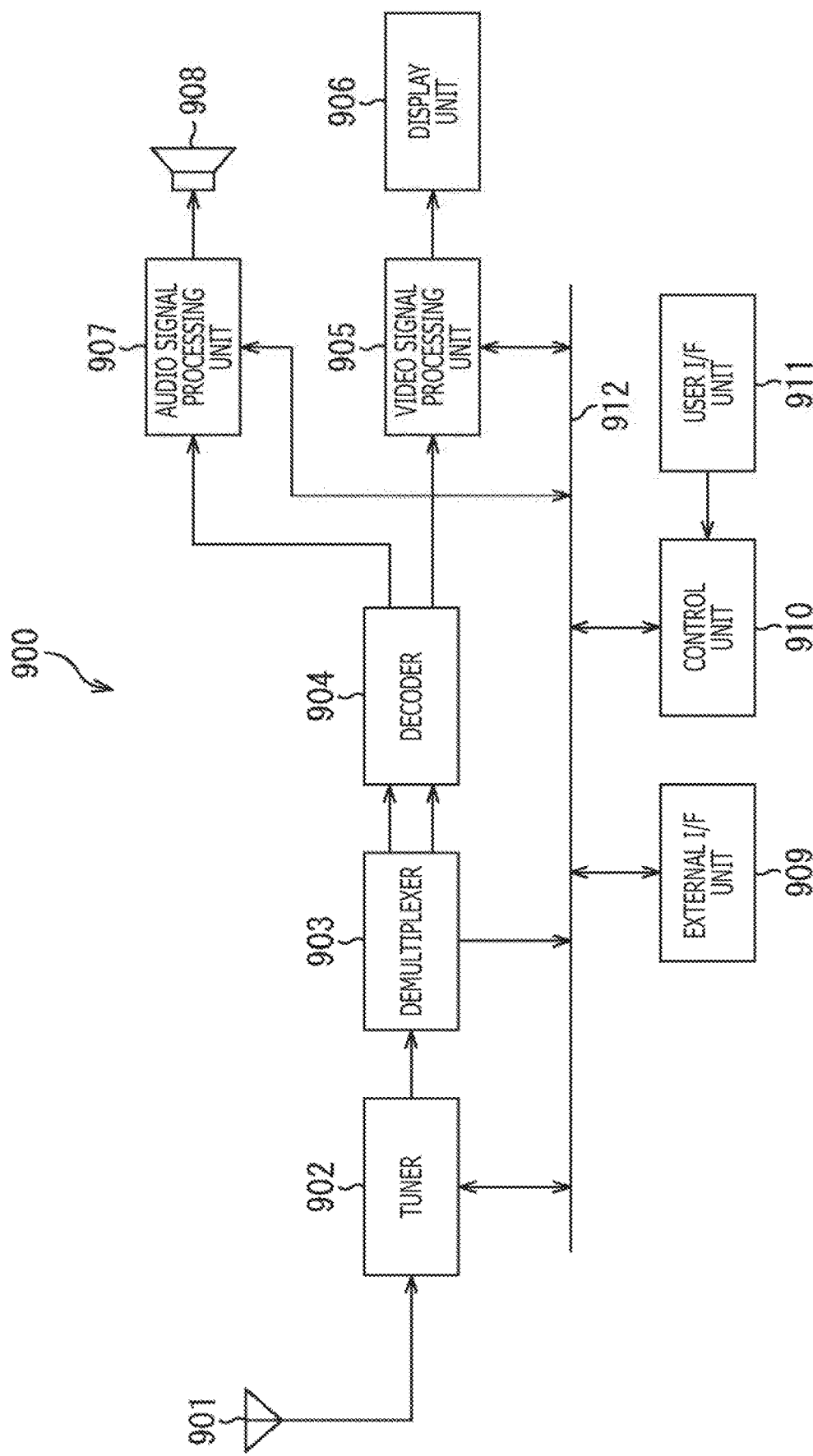
FIG. 54 is a block diagram illustrating an example of a schematic configuration of a television apparatus.

FIG. 54 illustrates an example of a schematic configuration of a television apparatus according to the embodiments described above. A television apparatus 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from a broadcast signal received through the antenna 901 and demodulates the extracted signal. The tuner 902 then outputs an encoded bitstream obtained by the demodulation to the demultiplexer 903. That is, the tuner 902 plays a role of a transmission unit in the television apparatus 900 that receives an encoded stream in which an image is encoded.

The demultiplexer 903 separates a video stream and an audio stream of a program to be viewed from the encoded bitstream and outputs each of the separated streams to the decoder 904. The demultiplexer 903 also extracts auxiliary data, such as EPG (Electronic Program Guide), from the encoded bitstream and supplies the extracted data to the control unit 910. Note that in a case where the encoded bitstream is scrambled, the demultiplexer 903 may descramble the encoded bitstream.

The decoder 904 decodes the video stream and the audio stream input from the demultiplexer 903. The decoder 904 then outputs the video data generated in the decoding process to the video signal processing unit 905. The decoder 904 also outputs the audio data generated in the decoding process to the audio signal processing unit 907.

The video signal processing unit 905 reproduces the video data input from the decoder 904 and causes the display unit 906 to display the video. The video signal processing unit 905 may also cause the display unit 906 to display an application screen supplied through a network. The video signal processing unit 905 may also apply, for example, an additional process, such as noise removal, to the video data according to the setting. The video signal processing unit 905 may further generate, for example, an image of GUI (Graphical User Interface), such as a menu, a button, and a cursor, and superimpose the generated image on the output image.

The display unit 906 is driven by a drive signal supplied from the video signal processing unit 905, and the display unit 906 displays a video or an image on a video screen of a display device (for example, liquid crystal display, plasma display, OELD (Organic ElectroLuminescence Display) (organic EL display), or the like).

The audio signal processing unit 907 applies a reproduction process, such as D/A conversion and amplification, to the audio data input from the decoder 904 and causes the speaker 908 to output the sound. The audio signal processing unit 907 may also apply an additional process, such as noise removal, to the audio data.

The external interface unit 909 is an interface for connecting the television apparatus 900 and an external device or a network. For example, the decoder 904 may decode a video stream or an audio stream received through the external interface unit 909. That is, the external interface unit 909 also plays a role of a transmission unit in the television apparatus 900 that receives an encoded stream in which an image is encoded.

The control unit 910 includes a processor, such as a CPU, and a memory, such as a RAM and a ROM. The memory stores a program executed by the CPU, program data, EPG data, data acquired through the network, and the like. The CPU reads and executes the program stored in the memory at, for example, the start of the television apparatus 900. The CPU executes the program to control the operation of the television apparatus 900 according to, for example, an operation signal input from the user interface unit 911.

The user interface unit 911 is connected to the control unit 910. The user interface unit 911 includes, for example, a button and a switch for the user to operate the television apparatus 900, a reception unit of a remote control signal, and the like. The user interface unit 911 detects an operation by the user through these constituent elements to generate an operation signal and outputs the generated operation signal to the control unit 910.

The bus 912 mutually connects the tuner 902, the demultiplexer 903, the decoder 904, the video signal processing unit 905, the audio signal processing unit 907, the external interface unit 909, and the control unit 910.

In the television apparatus 900 configured in this way, the decoder 904 may have the function of the image decoding apparatus 100 described above. That is, the decoder 904 may use the methods described in the embodiments to decode the encoded data. As a result, the television apparatus 900 can obtain advantageous effects similar to the advantageous effects of the embodiments described with reference to FIGS. 1 to 52.

Furthermore, in the television apparatus 900 configured in this way, the video signal processing unit 905 may be able to, for example, encode the image data supplied from the decoder 904 and output the obtained encoded data to the outside of the television apparatus 900 through the external interface unit 909. In addition, the video signal processing unit 905 may have the function of the image encoding apparatus 200 described above. That is, the video signal processing unit 905 may use the methods described in the embodiments to encode the image data supplied from the decoder 904. As a result, the television apparatus 900 can obtain advantageous effects similar to the advantageous effects of the embodiments described with reference to FIGS. 1 to 52.

Second Application Example

Mobile Phone

Figure 55:
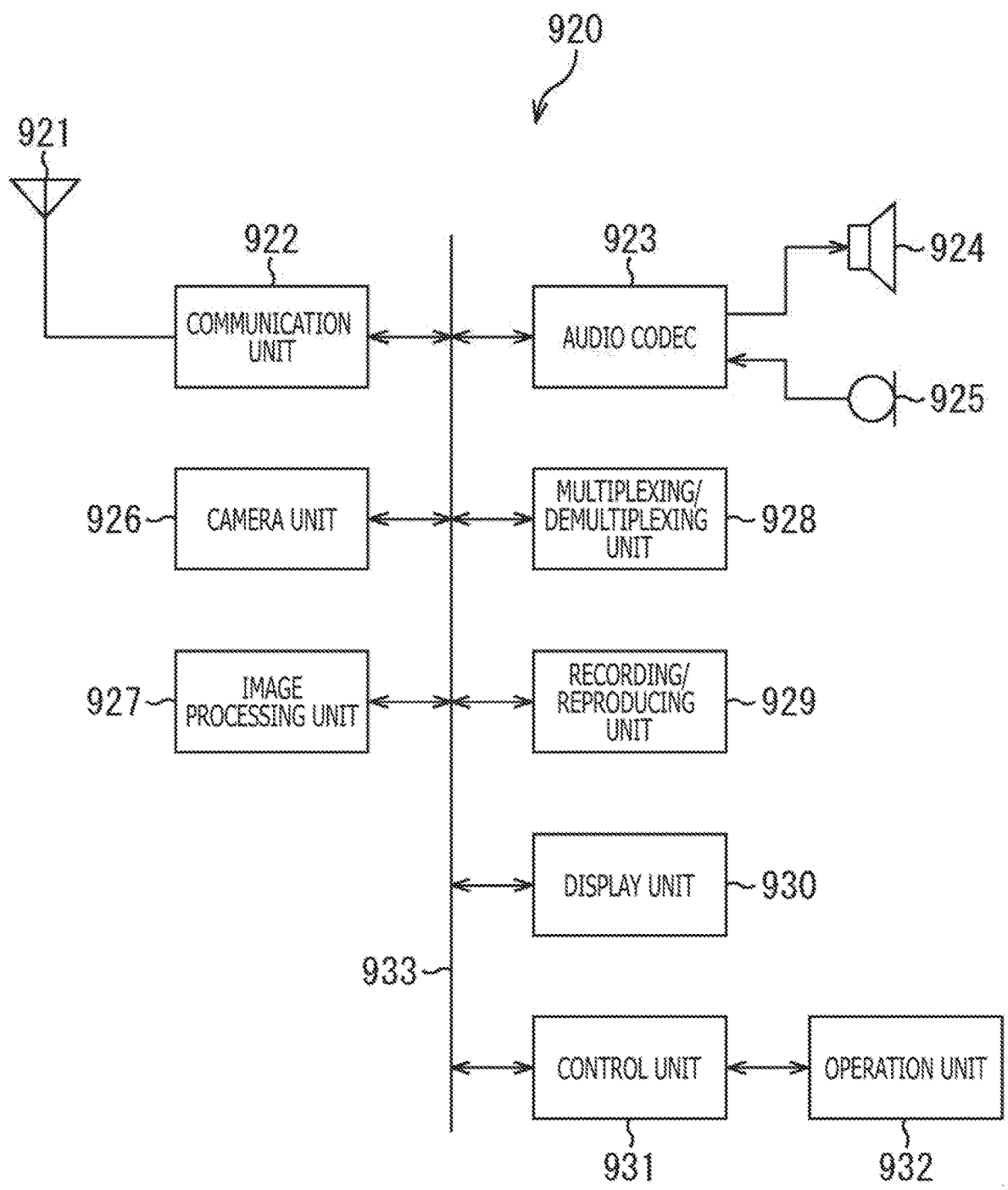
FIG. 55 is a block diagram illustrating an example of a schematic configuration of a mobile phone.

FIG. 55 illustrates an example of a schematic configuration of a mobile phone according to the embodiments described above. A mobile phone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/demultiplexing unit 928, the recording/reproducing unit 929, the display unit 930, and the control unit 931.

The mobile phone 920 performs operations, such as transmitting and receiving an audio signal, transmitting and receiving email or image data, capturing an image, and recording data, in various operation modes including a voice call mode, a data communication mode, an imaging mode, and a TV phone mode.

In the voice call mode, an analog audio signal generated by the microphone 925 is supplied to the audio codec 923. The audio codec 923 converts the analog audio signal into audio data and performs A/D conversion to compress the converted audio data. The audio codec 923 then outputs the compressed audio data to the communication unit 922. The communication unit 922 encodes and modulates the audio data to generate a transmission signal. The communication unit 922 then transmits the generated transmission signal to a base station (not illustrated) through the antenna 921. The communication unit 922 also amplifies a wireless signal received through the antenna 921 and converts the frequency to acquire a reception signal. The communication unit 922 then demodulates and decodes the reception signal to generate audio data and outputs the generated audio data to the audio codec 923. The audio codec 923 expands and performs D/A conversion of the audio data to generate an analog audio signal. The audio codec 923 then supplies the generated audio signal to the speaker 924 to output the sound.

In addition, for example, the control unit 931 generates character data of an email according to an operation by the user through the operation unit 932 in the data communication mode. The control unit 931 also causes the display unit 930 to display the characters. The control unit 931 also generates email data according to a transmission instruction from the user through the operation unit 932 and outputs the generated email data to the communication unit 922. The communication unit 922 encodes and modulates the email data to generate a transmission signal. The communication unit 922 then transmits the generated transmission signal to a base station (not illustrated) through the antenna 921. The communication unit 922 also amplifies a wireless signal received through the antenna 921 and converts the frequency to acquire a reception signal. The communication unit 922 then demodulates and decodes the reception signal to restore the email data and outputs the restored email data to the control unit 931. The control unit 931 causes the display unit 930 to display the content of the email and supplies the email data to the recording/reproducing unit 929 to write the email data to a storage medium of the recording/reproducing unit 929.

The recording/reproducing unit 929 includes an arbitrary read/write storage medium. For example, the storage medium may be a built-in storage medium, such as a RAM and a flash memory, or may be an externally mounted storage medium, such as a hard disk, a magnetic disk, a magneto-optical disk, an optical disk, a USB (Universal Serial Bus) memory, and a memory card.

In addition, for example, the camera unit 926 images a subject to generate image data and outputs the generated image data to the image processing unit 927 in the imaging mode. The image processing unit 927 encodes the image data input from the camera unit 926 and supplies the encoded stream to the recording/reproducing unit 929 to write the encoded stream to the storage medium of the recording/reproducing unit 929.

Furthermore, the recording/reproducing unit 929 reads an encoded stream recorded in the storage medium and outputs the encoded stream to the image processing unit 927 in the image display mode. The image processing unit 927 decodes the encoded stream input from the recording/reproducing unit 929 and supplies the image data to the display unit 930 to display the image.

In addition, for example, the multiplexing/demultiplexing unit 928 multiplexes a video stream encoded by the image processing unit 927 and an audio stream input from the audio codec 923 and outputs the multiplexed stream to the communication unit 922 in the TV phone mode. The communication unit 922 encodes and modulates the stream to generate a transmission signal. The communication unit 922 then transmits the generated transmission signal to a base station (not illustrated) through the antenna 921. The communication unit 922 also amplifies a wireless signal received through the antenna 921 and converts the frequency to acquire a reception signal. The transmission signal and the reception signal can include encoded bitstreams. The communication unit 922 then demodulates and decodes the reception signal to restore the stream and outputs the restored stream to the multiplexing/demultiplexing unit 928. The multiplexing/demultiplexing unit 928 separates a video stream and an audio stream from the input stream, outputs the video stream to the image processing unit 927, and outputs the audio stream to the audio codec 923. The image processing unit 927 decodes the video stream to generate video data. The video data is supplied to the display unit 930, and the display unit 930 displays a series of images. The audio codec 923 expands and performs D/A conversion of the audio stream to generate an analog audio signal. The audio codec 923 then supplies the generated audio signal to the speaker 924 to output the sound.

In the mobile phone 920 configured in this way, the image processing unit 927 may have, for example, the function of the image encoding apparatus 200. That is, the image processing unit 927 may use the methods described in the embodiments to encode the image data. As a result, the mobile phone 920 can obtain advantageous effects similar to the advantageous effects of the embodiments described with reference to FIGS. 1 to 52.

Furthermore, in the mobile phone 920 configured in this way, the image processing unit 927 may have, for example, the function of the image decoding apparatus 100 described above. That is, the image processing unit 927 may use the methods described in the embodiments to decode the encoded data. As a result, the mobile phone 920 can obtain advantageous effects similar to the advantageous effects of the embodiments described with reference to FIGS. 1 to 52.

Third Application Example

Recording/Reproducing Apparatus

Figure 56:
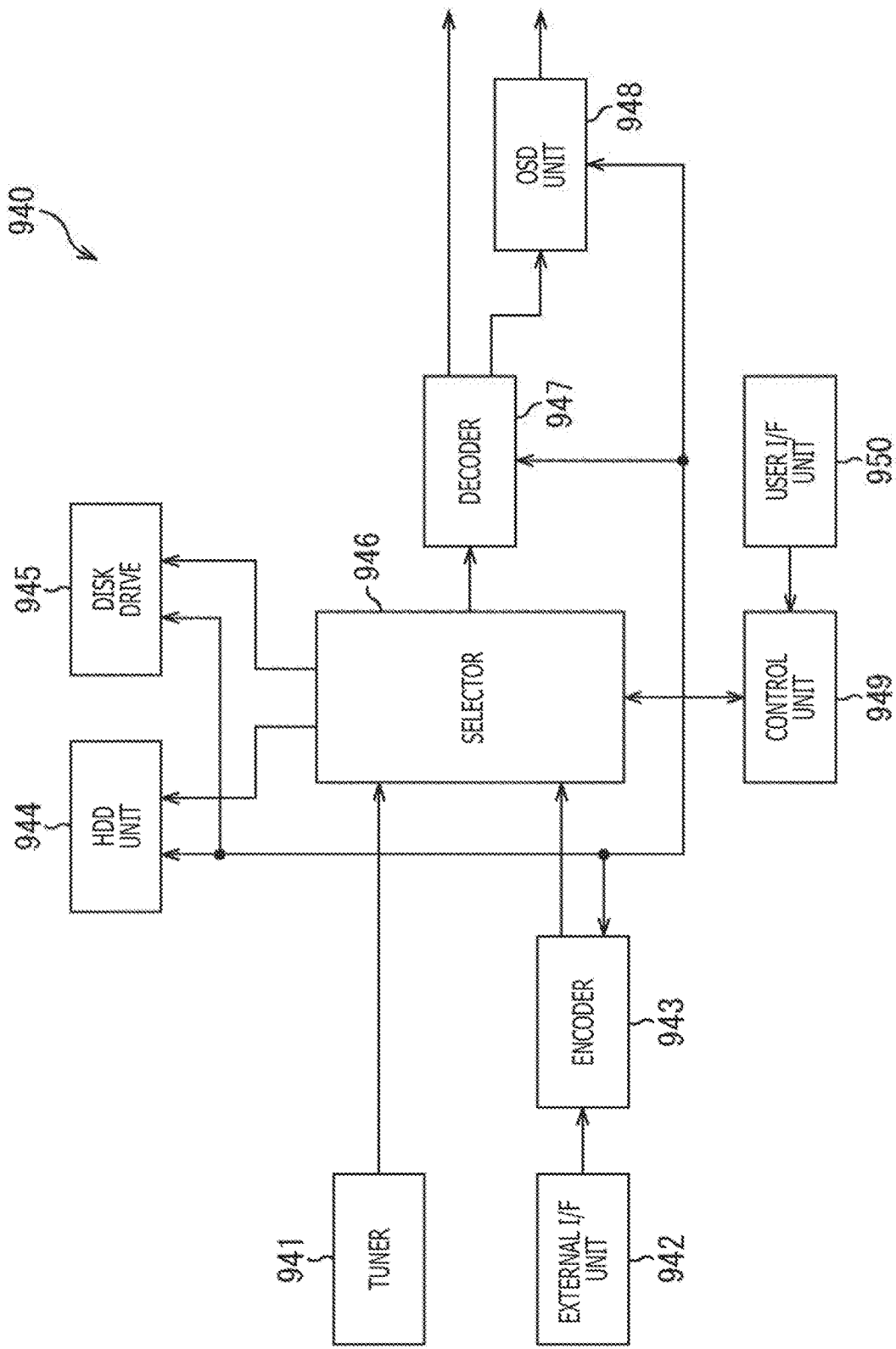
FIG. 56 is a block diagram illustrating an example of a schematic configuration of a recording/reproducing apparatus.

FIG. 56 illustrates an example of a schematic configuration of a recording/reproducing apparatus according to the embodiments described above. For example, a recording/reproducing apparatus 940 encodes audio data and video data of a received broadcast program and records the audio data and the video data in a recording medium. The recording/reproducing apparatus 940 may also encode audio data and video data acquired from another apparatus and record the audio data and the video data in the recording medium, for example. The recording/reproducing apparatus 940 also reproduces data recorded in the recording medium on a monitor and a speaker according to an instruction of the user, for example. In this case, the recording/reproducing apparatus 940 decodes audio data and video data.

The recording/reproducing apparatus 940 includes a tuner 941, an external interface (I/F) unit 942, an encoder 943, an HDD (Hard Disk Drive) unit 944, a disk drive 945, a selector 946, a decoder 947, an OSD (On-Screen Display) unit 948, a control unit 949, and a user interface (I/F) unit 950.

The tuner 941 extracts a signal of a desired channel from a broadcast signal received through an antenna (not illustrated) and demodulates the extracted signal. The tuner 941 then outputs an encoded bit stream obtained by the demodulation to the selector 946. That is, the tuner 941 lays a role of a transmission unit in the recording/reproducing apparatus 940.

The external interface unit 942 is an interface for connecting the recording/reproducing apparatus 940 and an external device or a network. The external interface unit 942 may be, for example, an IEEE (Institute of Electrical and Electronic Engineers) 1394 interface, a network interface, a USB interface, a flash memory interface, or the like. For example, video data and audio data received through the external interface unit 942 are input to the encoder 943. That is, the external interface unit 942 plays a role of a transmission unit in the recording/reproducing apparatus 940.

The encoder 943 encodes video data and audio data in a case where the video data and the audio data input from the external interface unit 942 are not encoded. The encoder 943 then outputs an encoded bitstream to the selector 946.

The HDD unit 944 records encoded bitstreams including compressed content data of video, sound, and the like, various programs, and other data in an internal hard disk. The HDD unit 944 also reads the data from the hard disk at the reproduction of the video and the sound.

The disk drive 945 records and reads data to and from a mounted recording medium. The recording medium mounted on the disk drive 945 may be, for example, a DVD (Digital Versatile Disc) disk (DVD-Video, DVD-RAM (DVD-Random Access Memory), DVD-R (DVD-Recordable), DVD-RW (DVD-Rewritable), DVD+R (DVD+Recordable), DVD+RW (DVD+Rewritable), or the like), a Blu-ray (registered trademark) disk, or the like.

At the recording of the video and the sound, the selector 946 selects an encoded bitstream input from the tuner 941 or the encoder 943 and outputs the selected encoded bitstream to the HDD unit 944 or the disk drive 945. In addition, at the reproduction of the video and the sound, the selector 946 outputs the encoded bitstream input from the HDD unit 944 or the disk drive 945 to the decoder 947.

The decoder 947 decodes the encoded bitstream to generate video data and audio data. The decoder 947 then outputs the generated video data to the OSD unit 948. An addition, the decoder 947 outputs the generated audio data to an external speaker.

The OSD unit 948 reproduces the video data input from the decoder 947 and displays the video. The OSD unit 948 may also superimpose, for example, an image of GUI, such as a menu, a button, and a cursor, on the displayed video.

The control unit 949 includes a processor, such as a CPU, and a memory, such as a RAM and a ROM. The memory stores a program executed by the CPU, program data, and the like. The CPU reads and executes the program stored in the memory at, for example, the start of the recording/reproducing apparatus 940. The CPU executes the program to control the operation of the recording/reproducing apparatus 940 according to, for example, an operation signal input from the user interface unit 950.

The user interface unit 950 is connected to the control unit 949. The user interface unit 950 includes, for example, a button and a switch for the user to operate the recording/reproducing apparatus 940, a reception unit of a remote control signal, and the like. The user interface unit 950 detects an operation by the user through these constituent elements to generate an operation signal and outputs the generated operation signal to the control unit 949.

In the recording/reproducing apparatus 940 configured in this way, the encoder 943 may have, for example, the function of the image encoding apparatus 200 described above. That is, the encoder 943 may use the methods described in the embodiments to encode the image data. As a result, the recording/reproducing apparatus 940 can obtain advantageous effects similar to the advantageous effects of the embodiments described with reference to FIGS. 1 to 52.

Furthermore, in the recording/reproducing apparatus 940 configured in this way, the decoder 947 may have, for example, the function of the image decoding apparatus 100 described above. That is, the decoder 947 may use the methods described in the embodiments to decode the encoded data. As a result, the recording/reproducing apparatus 940 can obtain advantageous effects similar to the advantageous effects of the embodiments described with reference to FIGS. 1 to 52.

Fourth Application Example

Imaging Apparatus

Figure 57:
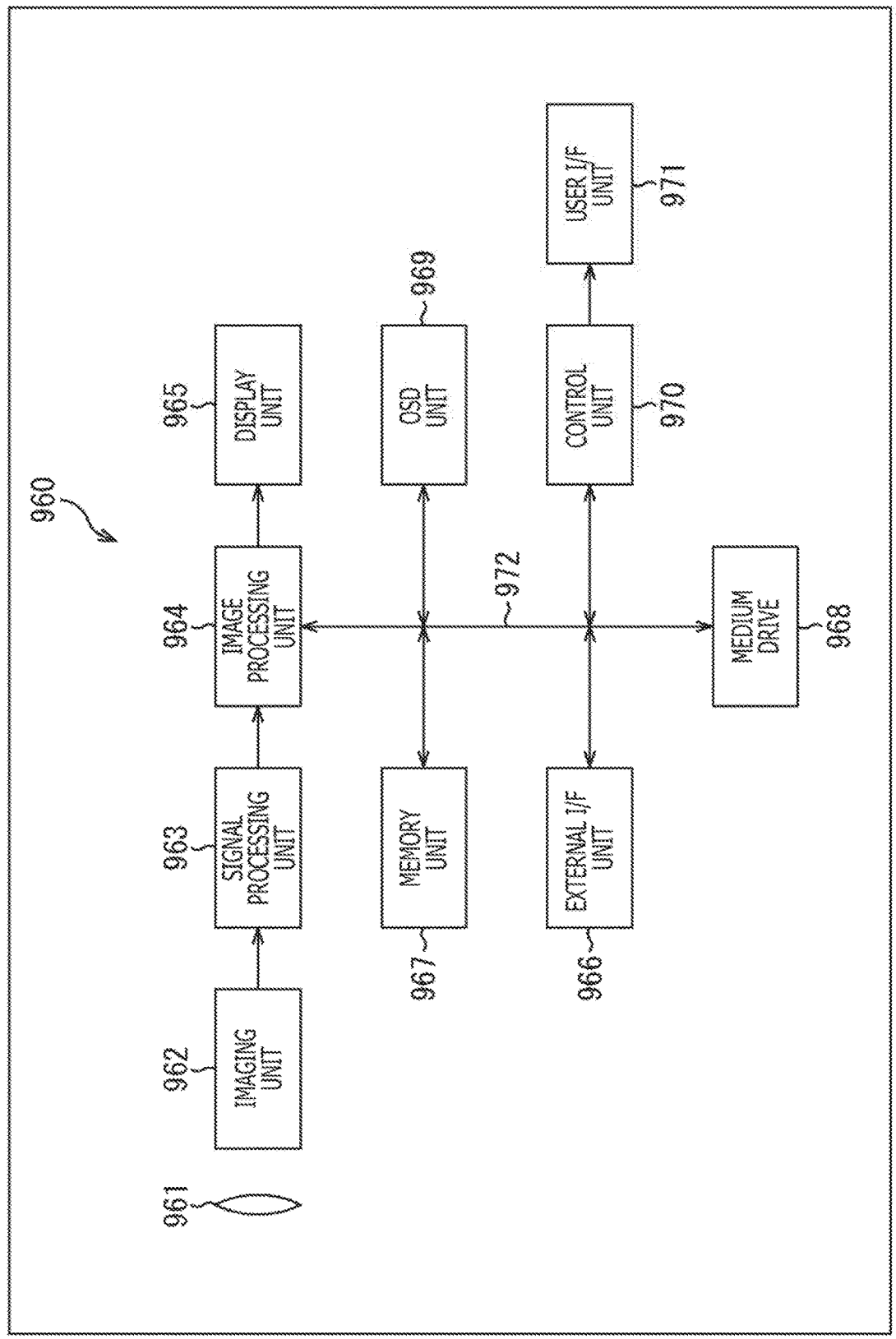
FIG. 57 is a block diagram illustrating an example of a schematic configuration of an imaging apparatus.

FIG. 57 illustrates an example of a schematic configuration of an imaging apparatus according to the embodiments described above. An imaging apparatus 960 images a subject, generates an image, encodes image data, and records the image data in a recording medium.

The imaging apparatus 960 includes an optical block 961, an imaging unit 962, a signal processing unit 963, an image processing unit 964, a display unit 965, an external interface (I/F) unit 966, a memory unit 967, a medium drive 968, an OSD unit 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 mutually connects the image processing unit 964, the external interface unit 966, the memory unit 967, the medium drive 968, the OSD unit 969, and the control unit 970.

The optical block 961 includes a focus lens, a diaphragm mechanism, and the like. The optical block 961 forms an optical image of the subject on an imaging surface of the imaging unit 962. The imaging unit 962 includes an image sensor, such as a CCD (Charge Coupled Device) and a CMOS (Complementary Metal Oxide Semiconductor), and performs photoelectric conversion of the optical image formed on the imaging surface to convert the optical image into an image signal as an electrical signal. The imaging unit 962 then outputs the image signal to the signal processing unit 963.

The signal processing unit 963 applies various types of camera signal processing, such as knee correction, gamma correction, and color correction, to the image signal input from the imaging unit 962. The signal processing unit 963 outputs the image data after the camera signal processing to the image processing unit 964.

The image processing unit 964 encodes the image data input from the signal processing unit 963 to generate encoded data. The image processing unit 964 then outputs the generated encoded data to the external interface unit 966 or the medium drive 968. The image processing unit 964 also decodes encoded data input from the external interface unit 966 or the medium drive 968 to generate image data. The image processing unit 964 then outputs the generated image data to the display unit 965. The image processing unit 964 may also output the image data input from the signal processing unit 963 to the display unit 965 to display the image. The image processing unit 964 may also superimpose display data acquired from the OSD unit 969 on the image to be output to the display unit 965.

The OSD unit 969 generates, for example, an image of GUI, such as a menu, a button, and a cursor, and outputs the generated image to the image processing unit 964.

The external interface unit 966 is provided as, for example, a USB input/output terminal. The external interface unit 966 connects the imaging apparatus 960 and a printer at, for example, the printing of an image. A drive is also connected to the external interface unit 966 as necessary. The drive is provided with, for example, a removable medium, such as a magnetic disk and an optical disk, and a program read from the removable medium can be installed on the imaging apparatus 960. Furthermore, the external interface unit 966 may be provided as a network interface connected to a network, such as a LAN and the Internet. That is, the external interface unit 966 plays a role of a transmission unit in the imaging apparatus 960.

A recording medium mounted on the medium drive 968 may be, for example, an arbitrary read/write removable medium, such as a magnetic disk, a magneto-optical disk, an optical disk, and a semiconductor memory. In addition, the recording medium may be fixed and mounted on the medium drive 968 to provide, for example, a non-portable storage unit, such as a built-in hard disk drive and an SSD (Solid State Drive).

The control unit 970 includes a processor, such as a CPU, and a memory, such as a RAM and a ROM. The memory stores a program executed by the CPU, program data, and the like. The CPU reads and executes the program stored in the memory at, for example, the start of the imaging apparatus 960. The CPU executes the program to control the operation of the imaging apparatus 960 according to, for example, an operation signal input from the user interface unit 971.

The user interface unit 971 is connected to the control unit 970. The user interface unit 971 includes, for example, a button, a switch, and the like for the user to operate the imaging apparatus 960. The user interface unit 971 detects an operation by the user through these constituent elements to generate an operation signal and outputs the generated operation signal to the control unit 970.

In the imaging apparatus 960 configured in this way, the image processing unit 964 may have, for example, the function of the image encoding apparatus 200 described above. That is, the image processing unit 964 may use the methods described in the embodiments to encode the image data. As a result, the imaging apparatus 960 can obtain advantageous effects similar to the advantageous effects of the embodiments described with reference to FIGS. 1 to 52.

Furthermore, in the imaging apparatus 960 configured in this way, the image processing unit 964 may have, for example, the function of the image decoding apparatus 100 described above. That is, the image processing unit 964 may use the methods described in the embodiments to decode the encoded data. As a result, the imaging apparatus 960 can obtain advantageous effects similar to the advantageous effects of the embodiments described with reference to FIGS. 1 to 52.

Fifth Application Example

Video Set

Figure 58:
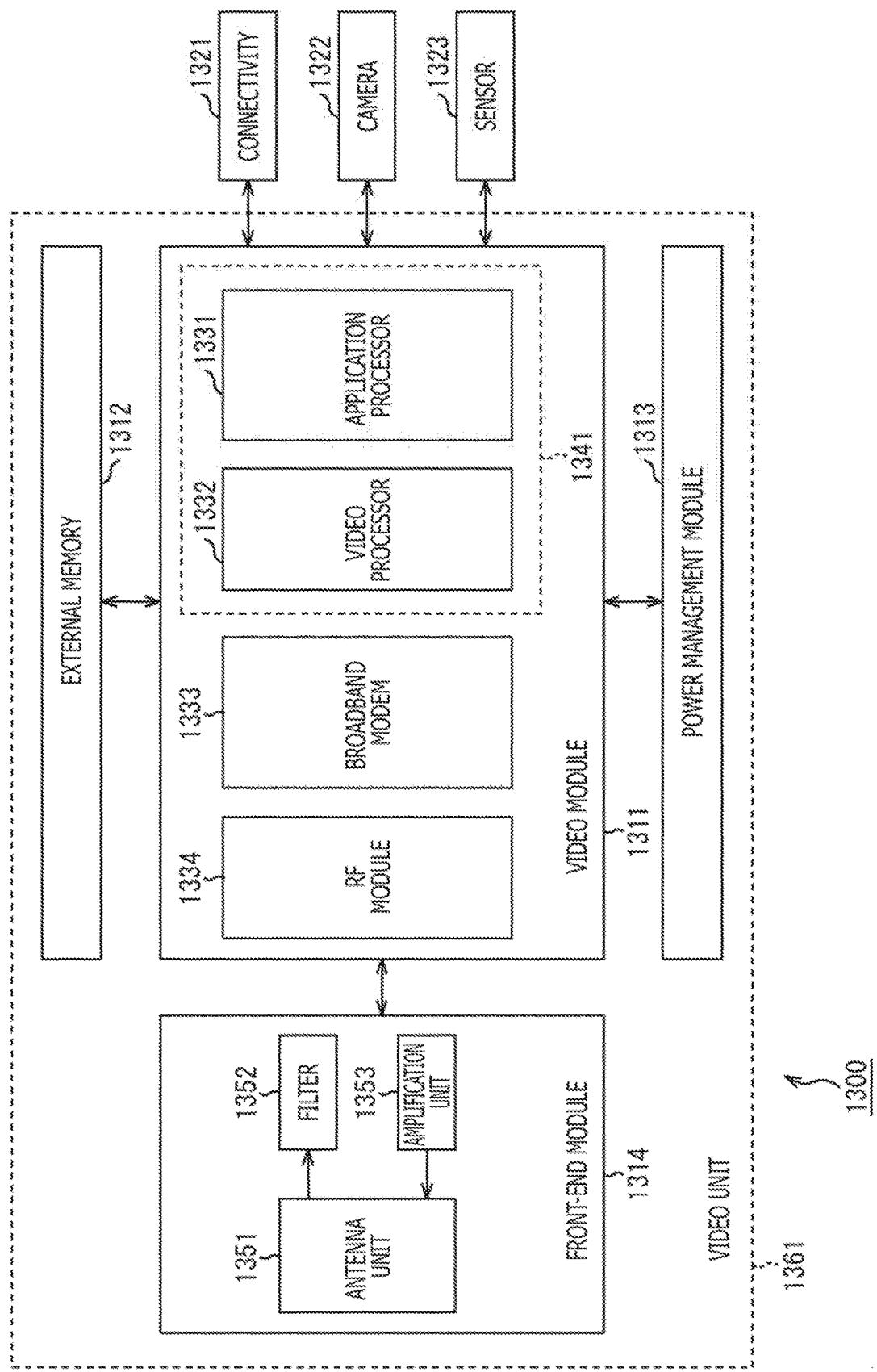
FIG. 58 is a block diagram illustrating an example of a schematic configuration of a video set.

The present technique can also be implemented in any configuration mounted on an apparatus included in an arbitrary apparatus or system, such as, for example, a processor as system LSI (Large Scale Integration) or the like, a module using a plurality of processors or the like, a unit using a plurality of modules or the like, and a set provided with other functions in addition to the unit (that is, configuration of part of an apparatus). FIG. 58 illustrates an example of a schematic configuration of a video set according to the present technique.

In recent years, electronic devices are provided with more functions, and in the development or manufacturing of the electronic devices, there is a case where the configuration of part of the electronic devices is implemented by selling or providing the configuration. Instead of implementing the configuration as a configuration having one function, a plurality of configurations having related functions are often combined to implement the configurations as one set provided with a plurality of functions.

A video set 1300 illustrated in FIG. 58 has such a configuration with multiple functions, and a device having functions regarding encoding or decoding (one or both of encoding and decoding) of images is combined with a device having other functions related to the functions.

As illustrated in FIG. 58, the video set 1300 includes a module group, such as a video module 1311, an external memory 1312, a power management module 1313, and a front-end module 1314, and a device having related functions, such as a connectivity 1321, a camera 1322, and a sensor 1323.

The modules are components with integrated functions, in which some functions of components related to each other are integrated. The specific physical configuration is arbitrary, and for example, a plurality of processors with respective functions, electronic circuit elements, such as resistors and capacitors, and other devices can be arranged and integrated on a wiring board or the like. In addition, other modules, processors, and the like can be combined with the modules to provide new modules.

In the case of the example of FIG. 58, components with functions regarding image processing are combined in the video module 1311, and the video module 1311 includes an application processor, a video processor, a broadband modem 1333, and an RF module 1334.

The processor includes components with predetermined functions integrated on a semiconductor chip based on SoC (System On a Chip), and there is also a processor called, for example, system LSI (Large Scale integration) or the like. The components with predetermined functions may be a logic circuit (hardware configuration), may be a CPU, a ROM, a RAM, and a program executed by using them (software configuration), or may be a combination of the hardware configuration and the software configuration. For example, the processor may include the logic circuit, the CPU, the ROM, the RAM, and the like, and part of the functions may be realized by the logic circuit (hardware configuration). The other functions may be realized by the program executed by the CPU (software configuration).

An application processor 1331 of FIG. 58 is a processor that executes an application regarding image processing. The application executed by the application processor 1331 can not only execute a computing process, but can also control, for example, components inside and outside of the video module 1311, such as a video processor 1332, as necessary in order to realize a predetermined function.

The video processor 1332 is a processor with a function regarding encoding or decoding (one or both of encoding and decoding) of an image.

The broadband modem 1333 performs digital modulation or the like of data (digital signal) to be transmitted in wired or wireless (or both of wired and wireless) broadband communication performed through a broadband circuit, such as the Internet and a public phone network, to convert the data into an analog signal and demodulates an analog signal received in the broadband communication to convert the analog signal into data (digital signal). The broadband modem 1333 processes, for example, arbitrary information, such as image data to be processed by the video processor 1332, a stream including encoded image data, an application program, and configuration data.

The RF module 1334 is a module that applies frequency conversion, modulation and demodulation, amplification, a filtering process, and the like to an RF (Radio Frequency) signal transmitted and received through an antenna. For example, the RF module 1334 applies frequency conversion or the like to a baseband signal generated by the broadband modem 1333 to generate an RF signal. In addition, the RF module 1334 applies, for example, frequency conversion or the like to an RF signal received through the front-end module 1314 to generate a baseband signal.

Note that as indicated by a dotted line 1341 in FIG. 58, the application processor 1331 and the video processor 1332 may be integrated to provide one processor.

The external memory 1312 is a module provided outside of the video module 1311 and including a storage device used by the video module 1311. The storage device of the external memory 1312 may be realized by any physical configuration. However, the storage device is generally used to store high-capacity data, such as frame-based image data, in many cases. Therefore, it is desirable to realize the storage device by, for example, a relatively inexpensive high-capacity semiconductor memory, such as a DRAM (Dynamic Random Access Memory).

The power management module 1313 manages and controls the power supplied to the video module 1311 (each component in the video module 1311).

The front-end module 1314 is a module that provides a front-end function (circuit at transmitting and receiving end of antenna side) to the RF module 1334. As illustrated in FIG. 58, the front-end module 1314 includes, for example, an antenna unit 1351, a filter 1352, and an amplification unit 1353.

The antenna unit 1351 includes an antenna that transmits and receives wireless signals and also includes components around the antenna. The antenna unit 1351 transmits a wireless signal of a signal supplied from the amplification unit 1353 and supplies the received wireless signal as an electrical signal (RF signal) to the filter 1352. The filter 1352 applies a filtering process or the like to the RF signal received through the antenna unit 1351 and supplies the RF signal after the process to the RF module 1334. The amplification unit 1353 amplifies the RF signal supplied from the RF module 1334 and supplies the RF signal to the antenna unit 1351.

The connectivity 1321 is a module with a function regarding connection to the outside. The physical configuration of the connectivity 1321 is arbitrary. For example, the connectivity 1321 includes a component with a communication function of a standard other than the communication standard corresponding to the broadband modem 1333 and also includes an external input-output terminal and the like.

For example, the connectivity 1321 may include: a module with a communication function in compliance with a wireless communication standard, such as Bluetooth (registered trademark), IEEE 802.11 (for example, Wi-Fi (Wireless Fidelity, registered trademark)), NFC (Near Field Communication), and IrDA (InfraRed Data Association); an antenna that transmits and receives a signal in compliance with the standard; and the like. The connectivity 1321 may also include, for example, a module with a communication function in compliance with a wired communication standard, such as USB (Universal Serial Bus) and HDMI (registered trademark) (High-Definition Multimedia Interface), and a terminal in compliance with the standard. The connectivity 1321 may further include, for example, other data (signal) transmission functions and the like, such as an analog input-output terminal.

Note that the connectivity 1321 may include a device of a transmission destination of data (signal). For example, the connectivity 1321 may include a drive (including not only a drive of a removable medium, but also a hard disk, an SSD (Solid State Drive), a NAS (Network Attached Storage), and the like) that reads and writes data to a recording medium, such as a magnetic disk, an optical disk, a magneto-optical disk, and a semiconductor memory. The connectivity 1321 may also include an output device (such as a monitor and a speaker) of images and sound.

The camera 1322 is a module with a function of imaging a subject to obtain image data of the subject. The image data obtained by the imaging of the camera 1322 is supplied to and encoded by, for example, the video processor 1332.

The sensor 1323 is, for example, a module with arbitrary functions of sensors, such as an audio sensor, an ultrasonic sensor, an optical sensor, an illumination sensor, an infrared sensor, an image sensor, a rotation sensor, an angle sensor, an angular velocity sensor, a speed sensor, an acceleration sensor, a tilt sensor, a magnetic identification sensor, an impact sensor, and a temperature sensor. Data detected by the sensor 1323 is supplied to, for example, the application processor 1331 and used by an application or the like.

The configurations of the modules described above may be realized as processors, and conversely, the configurations of the processors described above may be realized as modules.

In the video set 1300 configured in this way, the present technique can be applied to the video processor 1332 as described later. Therefore, the video set 1300 can be implemented as a set according to the present technique.

<Configuration Example of Video Processor>

Figure 59:
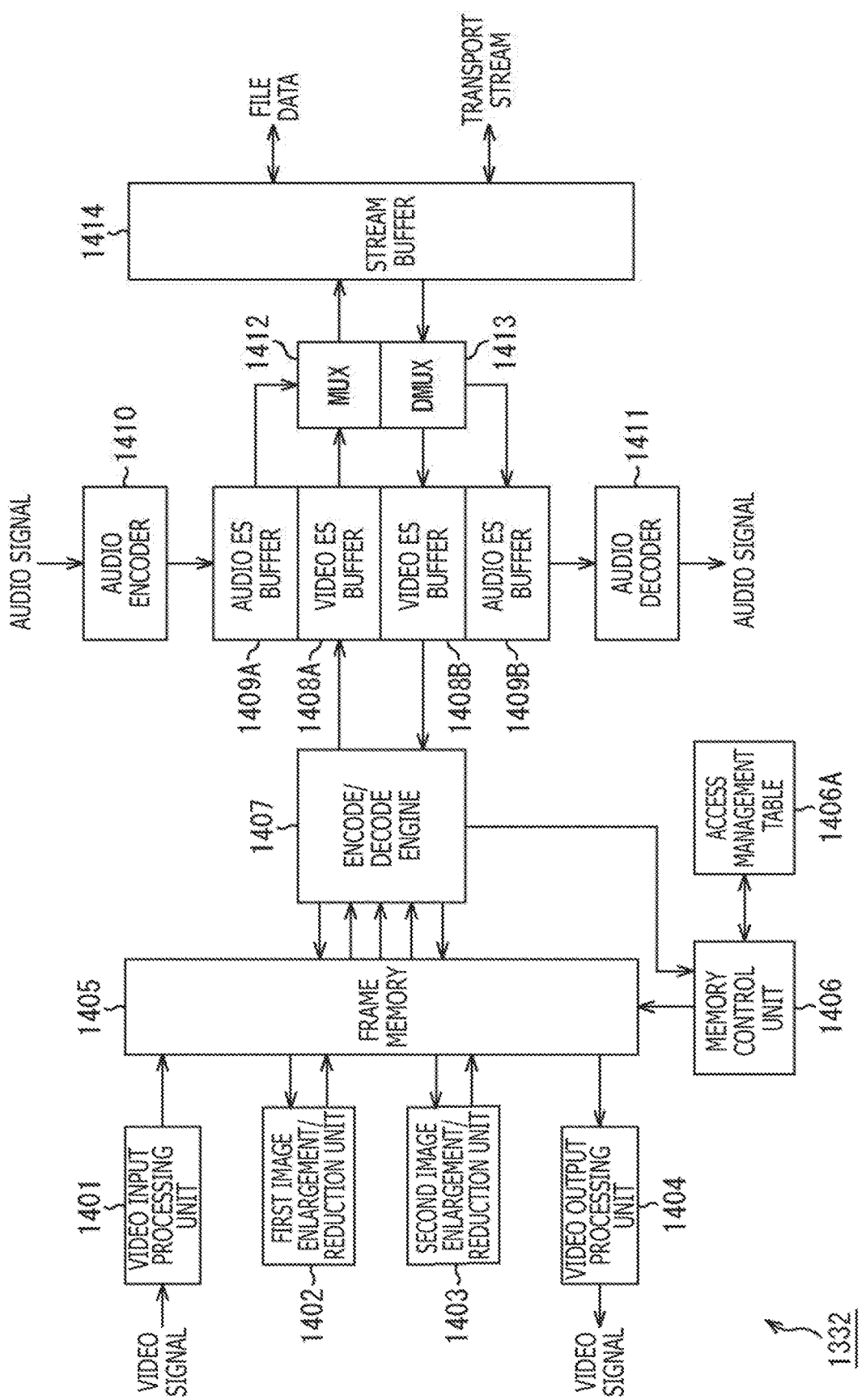
FIG. 59 is a block diagram illustrating an example of a schematic configuration of a video processor.

FIG. 59 illustrates an example of a schematic configuration of the video processor 1332 (FIG. 58) according to the present technique.

In the case of the example of FIG. 59, the video processor 1332 has a function of receiving an input of a video signal and an audio signal and using a predetermined system to encode the signals and has a function of decoding encoded video data and audio data and reproducing and outputting a video signal and an audio signal.

As illustrated in FIG. 59, the video processor 1332 includes a video input processing unit 1401, a first image enlargement/reduction unit 1402, a second image enlargement/reduction unit 1403, a video output processing unit 1404, a frame memory 1405, and a memory control unit 1406. The video processor 1332 also includes an encode/decode engine 1407, video ES (Elementary Stream) buffers 1408A and 1408B, and audio ES buffers 1409A and 1409B. The video processor 1332 further includes an audio encoder 1410, an audio decoder 1411, a multiplexing unit (MUX (Multiplexer)) 1412, a demultiplexing unit (DMUX (Demultiplexer)) 1413, and a stream buffer 1414.

The video input processing unit 1401 acquires, for example, a video signal input from the connectivity 1321

(FIG. 58) or the like and converts the video signal into digital image data. The first image enlargement/reduction unit 1402 applies format conversion, enlargement/reduction processing of image, or the like to the image data. The second image enlargement/reduction unit 1403 applies enlargement/reduction processing of image to the image data according to the format at the destination of the output through the video output processing unit 1404 and applies format conversion, enlargement/reduction processing of image, or the like to the image data as in the first image enlargement/reduction unit 1402. The video output processing unit 1404 performs operations, such as converting the format of the image data and converting the image data into an analog signal, and outputs a reproduced video signal to, for example, the connectivity 1321 or the like.

The frame memory 1405 is a memory for image data shared by the video input processing unit 1401, the first image enlargement/reduction unit 1402, the second image enlargement/reduction unit 1403, the video output processing unit 1404, and the encode/decode engine 1407. The frame memory 1405 is realized as, for example, a semiconductor memory, such as a DRAM.

The memory control unit 1406 receives a synchronization signal from the encode/decode engine 1407 to control the access for writing and reading to and from the frame memory 1405 according to a schedule for accessing the frame memory 1405 written in an access management table 1406A. The access management table 1406A is updated by the memory control unit 1406 according to the process executed by the encode/decode engine 1407, the first image enlargement/reduction unit 1402, the second image enlargement/reduction unit 1403, or the like.

The encode/decode engine 1407 executes an encoding process of image data and a decoding process of a video stream in which image data is encoded data. For example, the encode/decode engine 1407 encodes image data read from the frame memory 1405 and sequentially writes video streams to the video ES buffer 1408A. In addition, for example, the encode/decode engine 1407 sequentially reads video streams from the video ES buffer 1408B to decode the video streams and sequentially writes image data to the frame memory 1405. The encode/decode engine 1907 uses the frame memory 1405 as a work area in the encoding and the decoding. The encode/decode engine 1407 also outputs a synchronization signal to the memory control unit 1406 at timing of, for example, the start of the process for each macroblock.

The video ES buffer 1408A buffers a video stream generated by the encode/decode engine 1407 and supplies the video stream to the multiplexing unit (MUX) 1412. The video ES buffer 1408B buffers a video stream supplied from the demultiplexing unit (DMUX) 1413 and supplies the video stream to the encode/decode engine 1407.

The audio ES buffer 1409A buffers an audio stream generated by the audio encoder 1410 and supplies the audio stream to the multiplexing unit (MUX) 1412. The audio ES buffer 1409B buffers an audio stream supplied from the demultiplexing unit (DMUX) 1413 and supplies the audio stream to the audio decoder 1411.

The audio encoder 1410 performs, for example, digital conversion of an audio signal input from, for example, the connectivity 1321 or the like and uses, for example, a predetermined system, such as an MPEG audio system and an AC3 (AudioCode number 3) system, to encode the audio signal. The audio encoder 1410 sequentially writes, to the audio ES buffer 1409A, audio streams that are data in which the audio signal is encoded. The audio decoder 1411 decodes the audio stream supplied from the audio ES buffer 1409B, performs an operation, such as, for example, converting the audio stream into an analog signal, and supplies a reproduced audio signal to, for example, the connectivity 1321 or the like.

The multiplexing unit (MUX) 1412 multiplexes a video stream and an audio stream. The method of multiplexing (that is, the format of the bitstream generated by multiplexing) is arbitrary. In the multiplexing, the multiplexing unit (MUX) 1412 can also add predetermined header information or the like to the bitstream. That is, the multiplexing unit (MUX) 1412 can convert the format of the stream by multiplexing. For example, the multiplexing unit (MUX) 1412 multiplexes the video stream and the audio stream to convert the streams into a transport stream that is a bitstream in a format for transfer. In addition, for example, the multiplexing unit (MUX) 1412 multiplexes the video stream and the audio stream to convert the streams into data (file data) in a file format for recording.

The demultiplexing unit (DMUX) 1413 uses a method corresponding to the multiplexing by the multiplexing unit (MUX) 1412 to demultiplex a bitstream in which a video stream and an audio stream are multiplexed. That is, the demultiplexing unit (DMUX) 1413 extracts the video stream and the audio stream (separates the video stream and the audio stream) from the bitstream read from the stream buffer 1414. That is, the demultiplexing unit (DMUX) 1413 can demultiplex the stream to convert the format of the stream (inverse transform of the conversion by the multiplexing unit (MUX) 1412). For example, the demultiplexing unit (DMUX) 1413 can acquire a transport stream supplied from, for example, the connectivity 1321, the broadband modem 1333, or the like through the stream buffer 1414 and demultiplex the transport stream to convert the transport stream into a video stream and an audio stream. In addition, for example, the demultiplexing unit (DMUX) 1413 can acquire file data read by, for example, the connectivity 1321 from various recording media through the stream buffer 1414 and demultiplex the file data to convert the file data into a video stream and an audio stream.

The stream buffer 1414 buffers a bitstream. For example, the stream buffer 1414 buffers a transport stream supplied from the multiplexing unit (MUX) 1412 and supplies the transport stream to, for example, the connectivity 1321, the broadband modem 1333, or the like at predetermined timing or based on a request or the like from the outside.

In addition, for example, the stream buffer 1414 buffers file data supplied from the multiplexing unit (MUX) 1412 and supplies the file data to, for example, the connectivity 1321 or the like at predetermined timing or based on a request or the like from the outside to record the file data in various recording media.

The stream buffer 1414 further buffers a transport stream acquired through, for example, the connectivity 1321, the broadband modem 1333, or the like and supplies the transport stream to the demultiplexing unit (DMUX) 1413 at predetermined timing or based on a request or the like from the outside.

The stream buffer 1414 also buffers file data read from various recording media by, for example, the connectivity 1321 or the like and supplies the file data to the demultiplexing unit (DMUX) 1413 at predetermined timing or based on a request or the like from the outside.

Next, an example of an operation of the video processor 1332 configured in this way will be described. For example, the video input processing unit 1401 converts the video signal input from the connectivity 1321 or the like to the video processor 1332 into digital image data of a predetermined system, such as a 4:2:2 Y/Cb/Cr system, and sequentially writes the digital image data to the frame memory 1405. The first image enlargement/reduction unit 1402 or the second image enlargement/reduction unit 1403 reads the digital image data to convert the format into a predetermined system, such as a 4:2:0 Y/Cb/Cr system, and execute enlargement/reduction processing. The digital image data is written again to the frame memory 1405. The encode/decode engine 1407 encodes the image data, and the video stream is written to the video ES buffer 1408A.

In addition, the audio encoder 1410 encodes the audio signal input from the connectivity 1321 or the like to the video processor 1332, and the audio stream is written to the audio ES buffer 1409A.

The video stream of the video ES buffer 1408A and the audio stream of the audio ES buffer 1409A are read and multiplexed by the multiplexing unit (MUX) 1412 and converted into a transport stream, file data, or the like. The transport stream generated by the multiplexing unit (MUX) 1412 is buffered by the stream buffer 1414 and then output to an external network through, for example, the connectivity 1321, the broadband modem 1333, or the like. In addition, the stream buffer 1414 buffers the file data generated by the multiplexing unit (MUX) 1412, and the file data is then output to, for example, the connectivity 1321 or the like and recorded in various recording media.

In addition, for example, the transport stream input from the external network to the video processor 1332 through the connectivity 1321, the broadband modem 1333, or the like is buffered by the stream buffer 1414 and then demultiplexed by the demultiplexing unit (DMUX) 1413. In addition, for example, the file data read from various recording media by the connectivity 1321 or the like and input to the video processor 1332 is buffered by the stream buffer 1414 and then demultiplexed by the demultiplexing unit (DMUX) 1413. That is, the transport stream or the file data input to the video processor 1332 is separated into the video stream and the audio stream by the demultiplexing unit (DMUX) 1413.

The audio stream is supplied to the audio decoder 1411 through the audio ES buffer 1409B and decoded to reproduce the audio signal. In addition, the video stream is written to the video ES buffer 1408B, and then the video stream is sequentially read and decoded by the encode/decode engine 1407 and written to the frame memory 1405. The decoded image data is enlarged or reduced by the second image enlargement/reduction unit 1403 and written to the frame memory 1405. The decoded image data is then read by the video output processing unit 1404, and the format is converted into a predetermined system, such as a 4:2:2 Y/Cb/Cr system. The decoded image data is further converted into an analog signal, and the video signal is reproduced and output.

In the case of applying the present technique to the video processor 1332 configured in this way, the present technique according to each of the embodiments described above can be applied to the encode/decode engine 1407. That is, for example, the encode/decode engine 1407 may have one or both of the function of the image encoding apparatus 200 described above and the function of the image decoding apparatus 100. As a result, the video processor 1332 can obtain advantageous effects similar to the advantageous effects of each of the embodiments described with reference to FIGS. 1 to 52.

Note that in the encode/decode engine 1407, the present technique (that is, one or both of the function of the image encoding apparatus 200 and the function of the image decoding apparatus 100) may be realised by hardware, such as a logic circuit, may be realized by software, such as an embedded program, or may be realized by both of the hardware and the software.

<Another Configuration Example of Video Processor>

Figure 60:
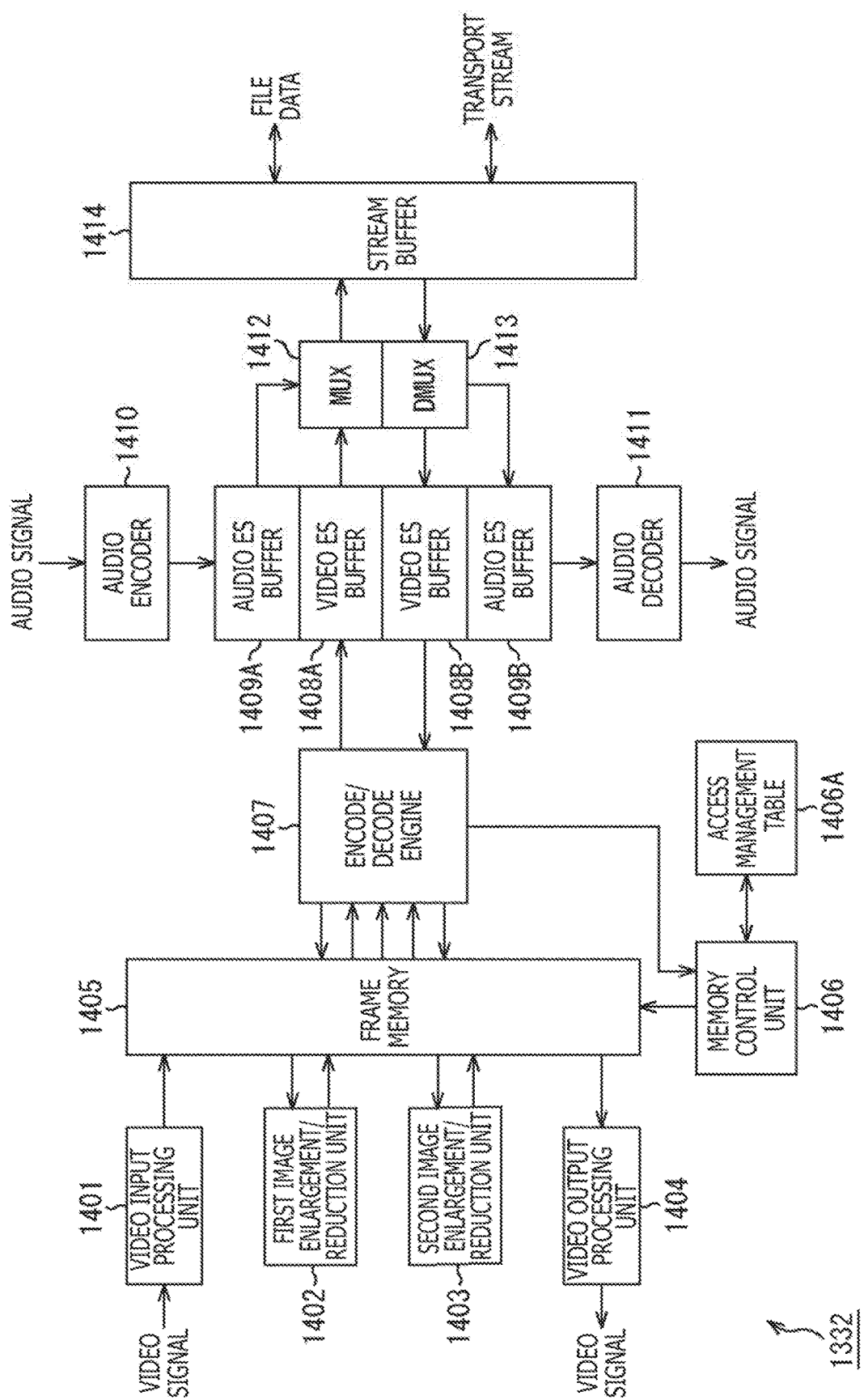
FIG. 60 is a block diagram illustrating another example of the schematic configuration of the video processor.

FIG. 60 illustrates another example of the schematic configuration of the video processor 1332 according to the present technique. In the case of the example of FIG. 60, the video processor 1332 has a function of using a predetermined system to encode and decode the video data.

More specifically, as illustrated in FIG. 60, the video processor 1332 includes a control unit 1511, a display interface 1512, a display engine 1513, an image processing engine 1514, and an internal memory 1515. The video processor 1332 also includes a codec engine 1516, a memory interface 1517, a multiplexing/demultiplexing unit (MUX DMUX) 1518, a network interface 1519, and a video interface 1520.

The control unit 1511 controls the operation of each processing section in the video processor 1332, such as the display interface 1512, the display engine 1513, the image processing engine 1514, and the codec engine 1516.

As illustrated in FIG. 60, the control unit 1511 includes, for example, a main CPU 1531, a sub CPU 1532, and a system controller 1533. The main CPU 1531 executes a program or the like for controlling the operation of each processing section in the video processor 1332. The main CPU 1531 generates a control signal according to the program or the like and supplies the control signal to each processing section (that is, controls the operation of each processing section). The sub CPU 1532 plays an auxiliary role of the main CPU 1531. For example, the sub CPU 1532 executes a child process, a subroutine, or the like of the program or the like executed by the main CPU 1531. The system controller 1533 controls the operations of the main CPU 1531 and the sub CPU 1532, such as designating the program executed by the main CPU 1531 and the sub CPU 1532.

The display interface 1512 outputs image data to, for example, the connectivity 1321 or the like under the control of the control unit 1511. For example, the display interface 1512 converts image data of digital data into an analog signal and outputs a reproduced video signal, or outputs the image data of the digital data, to a monitor apparatus or the like of the connectivity 1321.

Under the control of the control unit 1511, the display engine 1513 applies various conversion processes, such as format conversion, size conversion, and color gamut conversion, to the image data according to hardware specifications of a monitor apparatus or the like that displays the image.

The image processing engine 1514 applies predetermined image processing, such as, for example, a filtering process for improving the image quality, to the image data under the control of the control unit 1511.

The internal memory 1515 is a memory shared by the display engine 1513, the image processing engine 1514, and the codec engine 1516 and provided inside of the video processor 1332. The internal memory 1515 is used to transfer data between, for example, the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as necessary (for example, according to a request). Although the internal memory 1515 may be realized by any storage device, the internal memory

1515 is generally used to store low-capacity data, such as block-based image data and parameters, in many cases, and it is desirable to realize the internal memory 1515 by a relatively (for example, compared to the external memory 1312) low-capacity semiconductor memory with high response speed, such as an SRAM (Static Random Access Memory).

The codec engine 1516 executes a process regarding encoding and decoding of image data. The system of encoding and decoding corresponding to the codec engine 1516 is arbitrary, and there may be one system or a plurality of systems. For example, the codec engine 1516 may have codec functions of a plurality of encoding and decoding systems and may use selected one of the codec functions to encode image data or decode encoded data.

In the example illustrated in FIG. 60, the codec engine 1516 includes, for example, an MPEG-2 Video 1541, an AVC/H.264 1542, an HEVC/H.265 1543, an HEVC/H.265 (Scalable) 1544, an HEVC/H.265 (Multi-view) 1545, and an MPEG-DASH 1551 that are functional blocks of processes regarding the codec.

The MPEG-2 Video 1541 is a functional block that uses the MPEG-2 system to encode and decode image data. The AVC/H.264 1542 is a functional block that uses the AVC system to encode and decode image data. The HEVC/H.265 1543 is a functional block that uses the HEVC system to encode and decode image data. The HEVC/H.265 (Scalable) 1544 is a functional block that uses the HEVC system to apply scalable encoding and scalable decoding to image data. The HEVC/H.265 (Multi-view) 1545 is a functional block that uses the HEVC system to apply multi-view encoding and multi-view decoding to the image data.

The MPEG-DASH 1551 is a functional block that uses the MPEG-DASH (MPEG-Dynamic Adaptive Streaming over HTTP) system to transmit and receive image data. The MPEG-DASH is a technique of using the HTTP (HyperText Transfer Protocol) to stream a video, and one of the features is that appropriate encoded data is transmitted by selecting the encoded data on a segment-by-segment basis from a plurality of pieces of encoded data with different resolutions or the like prepared in advance. The MPEG-DASH 1551 performs operations, such as generating a stream in compliance with the standard and controlling the transmission of the stream, and uses the components from the MPEG-2 Video 1541 to the HEVC/H.265 (Multi-view) 1545 described above to encode and decode image data.

The memory interface 1517 is an interface for the external memory 1312. The data supplied from the image processing engine 1514 or the codec engine 1516 is supplied to the external memory 1312 through the memory interface 1517. In addition, the data read from the external memory 1312 is supplied to the video processor 1332 (image processing engine 1514 or codec engine 1516) through the memory interface 1517.

The multiplexing/demultiplexing unit (MUX DMUX) 1518 multiplexes and demultiplexer various types of data regarding the image, such as a bitstream of encoded data, image data, and a video signal. The method of multiplexing and demultiplexing is arbitrary. For example, the multiplexing/demultiplexing unit (MUX DMUX) 1518 can not only group together a plurality of pieces of data in multiplexing, but can also add predetermined header information or the like to the data. In addition, the multiplexing/demultiplexing unit (MUX DMUX) 1518 can not only partition one piece of data into a plurality of pieces of data in demultiplexing, but can also add predetermined header information or the like to each of the partitioned pieces of data. That is, the multiplexing/demultiplexing unit (MUX DMUX) 1518 can multiplex and demultiplex data to convert the format of the data. For example, the multiplexing/demultiplexing unit (MUX DMUX) 1518 can multiplex a bitstream to convert the bitstream into a transport stream that is a bitstream in the format of transfer or into data (file data) in the file format for recording. Obviously, the inverse transformation of the data can also be performed by demultiplexing.

The network interface 1519 is, for example, as interface for the broadband modem 1333, the connectivity 1321, and the like. The video interface 1520 is, for example, an interface for the connectivity 1321, the camera 1322, and the like.

Next, an example of the operation of the video processor 1332 will be described. For example, when a transport stream is received from an external network through the connectivity 1321, the broadband modem 1333, or the like, the transport stream is supplied to the multiplexing/demultiplexing unit (MUX DMUX) 1518 through the network interface 1519 and demultiplexed, and the codec engine 1516 decodes the transport stream. The image processing engine 1514 applies, for example, predetermined image processing to the image data obtained by the decoding of the codec engine 1516, and the display engine 1513 performs predetermined conversion. The image data is supplied to, for example, the connectivity 1321 or the like through the display interface 1512, and the image is displayed on the monitor. In addition, for example, the codec engine 1516 encodes again the image data obtained by the decoding of the codec engine 1516, and the multiplexing/demultiplexing unit (MUX DMUX) 1518 multiplexes the image data and converts the image data into file data. The file data is output to, for example, the connectivity 1321 or the like through the video interface 1520 and recorded in various recording media.

Furthermore, for example, the file data of the encoded data including the encoded image data read by the connectivity 1321 or the like from a recording medium not illustrated is supplied to the multiplexing/demultiplexing unit (MUX DMUX) 1518 through the video interface 1520 and demultiplexed, and the file data is decoded by the codec engine 1516. The image processing engine 1514 applies predetermined image processing to the image data obtained by the decoding of the codec engine 1516, and the display engine 1513 performs predetermined conversion of the image data. The image data is supplied to, for example, the connectivity 1321 or the like through the display interface 1512, and the image is displayed on the monitor. In addition, for example, the codec engine 1516 encodes again the image data obtained by the decoding of the codec engine 1516, and the multiplexing/demultiplexing unit (MUX DMUX) 1518 multiplexes the image data and converts the image data into a transport stream. The transport stream is supplied to, for example, the connectivity 1321, the broadband modem 1333, or the like through the network interface 1519 and transmitted to another apparatus not illustrated.

Note that the transfer of the image data and other data between processing units in the video processor 1332 is performed by using, for example, the internal memory 1515 or the external memory 1312. In addition, the power management module 1313 controls the power supplied to, for example, the control unit 1511.

In the case where the present technique is applied to the video processor 1332 configured in this way, the present technique according to each of the embodiments described above can be applied to the codec engine 1516. That is, for example, the codec engine 1516 can have one or both of the function of the image encoding apparatus 200 and the function of the image decoding apparatus 100 described above. As a result, the video processor 1332 can obtain advantageous effects similar to the advantageous effects of each of the embodiments described with reference to FIGS. 1 to 52.

Note that in the codec engine 1516, the present technique (that is, the function of the image encoding apparatus 200) may be realized by hardware, such as a logic circuit, may be realized by software, such as an embedded program, or may be realized by both of the hardware and the software.

Although two configurations of the video processor 1332 have been illustrated, the configuration of the video processor 1332 is arbitrary, and the configuration may be other than the configurations of the two examples described above. In addition, the video processor 1332 may be provided as one semiconductor chip or may be provided as a plurality of semiconductor chips. For example, the video processor 1332 may be a three-dimensional stacked LSI including a plurality of stacked semiconductors. The video processor 1332 may also be realized by a plurality of LSIs.

<Examples of Application to Apparatus>

The video set 1300 can be incorporated into various apparatuses that process image data. For example, the video set 1300 can be incorporated into the television apparatus 900 (FIG. 54), the mobile phone 920 (FIG. 55), the recording/reproducing apparatus 940 (FIG. 56), the imaging apparatus 960 (FIG. 57), and the like. The incorporation of the video set 1300 allows the apparatus to obtain advantageous effects similar to the advantageous effects of the embodiments described with reference to FIGS. 1 to 52.

Note that part of each configuration of the video set 1300 described above can be implemented as a configuration according to the present technique as long as the part includes the video processor 1332. For example, the video processor 1332 alone can be implemented as a video processor according to the present technique. In addition, for example, the processor indicated by the dotted line 1341, the video module 1311, or the like can be implemented as a processor, a module, or the like according to the present technique as described above. Furthermore, for example, the video module 1311, the external memory 1312, the power management module 1313, and the front-end module 1314 can be combined to implement a video unit 1361 according to the present technique. In any of the configurations, advantageous effects similar to the advantageous effects of the embodiments described with reference to FIGS. 1 to 52 can be obtained.

That is, any configuration including the video processor 1332 can be incorporated into various apparatuses that process image data as in the case of the video set 1300. For example, the video processor 1332, the processor indicated by the dotted line 1341, the video module 1311, or the video unit 1361 can be incorporated into the television apparatus 900 (FIG. 54), the mobile phone 920 (FIG. 55), the recording/reproducing apparatus 940 (FIG. 56), the imaging apparatus 960 (FIG. 57), or the like. In addition, the incorporation of one of the configurations according to the present technique allows the apparatus to obtain advantageous effects similar to the advantageous effects of each of the embodiments described with reference to FIGS. 1 to 52 as in the case of the video set 1300.

Sixth Application Example

Network System

Figure 61:
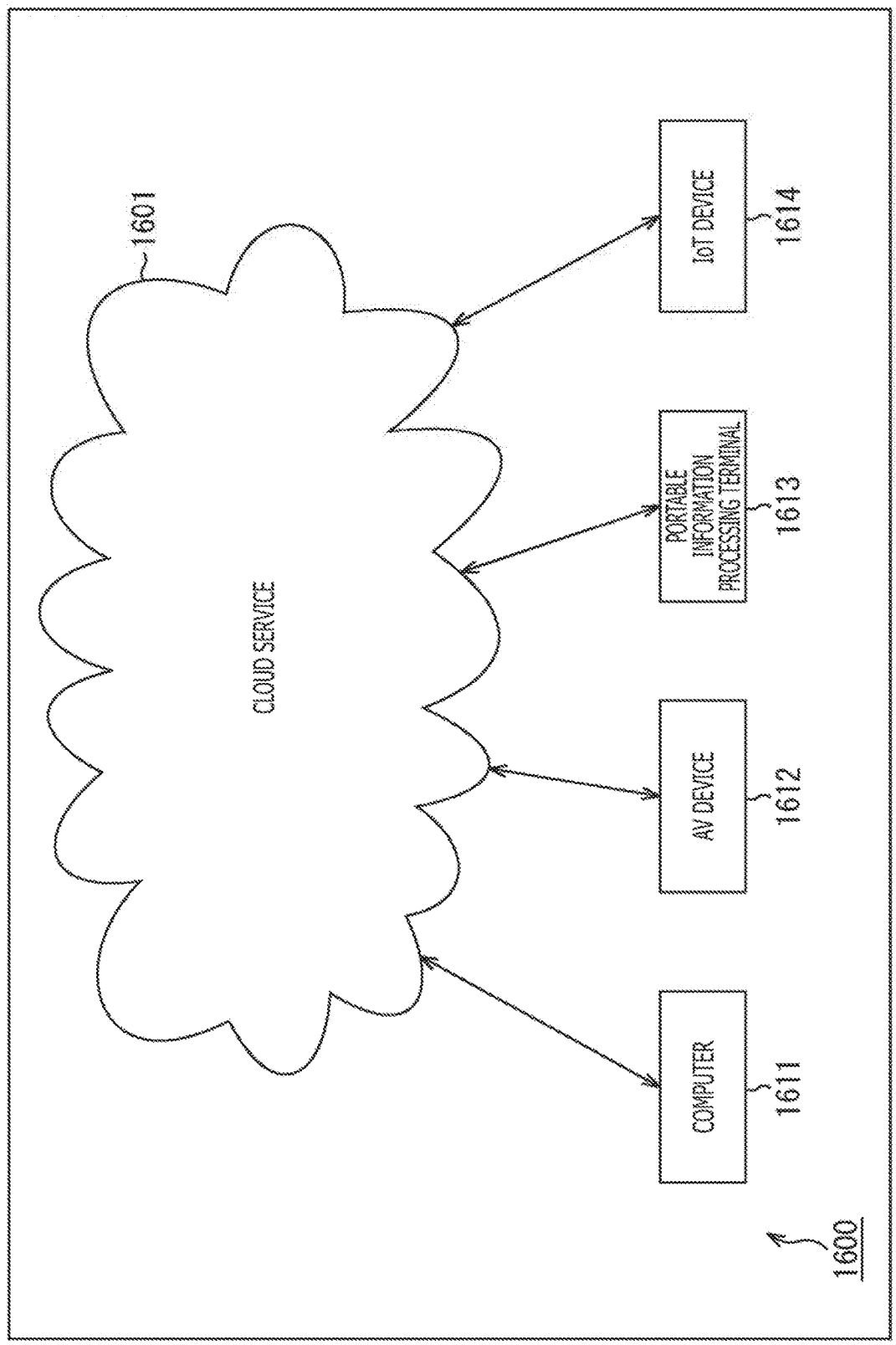
FIG. 61 is a block diagram illustrating an example of a schematic configuration of a network system.

In addition, the present technique can also be applied to a network system including a plurality of apparatuses. FIG. 61 illustrates as example of a schematic configuration of the network system according to the present technique.

A network system 1600 illustrated in FIG. 61 is a system in which devices transfer information regarding images (moving images) through a network. A cloud service 1601 of the network system 1600 is a system that provides services regarding images (moving images) to terminals, such as a computer 1611, an AV (Audio Visual) device 1612, a portable information processing terminal 1613, and an IoT (Internet of Things) device 1614, connected to and capable of communicating with the cloud service 1601. For example, the cloud service 1601 provides the terminals with supply services of content of images (moving images) such as so-called video distribution (on-demand or live broadcasting). In addition, the cloud service 1601 provides, for example, a backup service for receiving and storing content of images (moving images) from the terminals. In addition, the cloud service 1601 provides, for example, a service for mediating transfer of content of images (moving images) between the terminals.

The physical configuration of the cloud service 1601 is arbitrary. For example, the cloud service 1601 may include various servers, such as a server that saves and manages moving images, a server that distributes moving images to the terminals, a server that acquires moving images from the terminals, and a server that manages users (terminals) and charges, and an arbitrary network, such as the Internet and a LAN.

The computer 1611 includes, for example, an information processing apparatus, such as a personal computer, a server, and a workstation. The AV device 1612 includes, for example, an image processing apparatus, such as a television receiver, a hard disk recorder, a gaming device, and a camera. The portable information processing terminal 1613 includes, for example, a portable information processing apparatus, such as a notebook personal computer, a tablet terminal, a mobile phone, and a smartphone. The IoT device 1614 includes an arbitrary object that executes a process regarding images, such as a machine, a home appliance, furniture, other objects, an IC tag, and a card-type device. The terminals have communication functions, and the terminals can connect to (establish sessions with) the cloud service 1601 to transfer information (that is, communicate) with the cloud service 1601. In addition, each terminal can also communicate with other terminals. The terminals may communicate through the cloud service 1601 or may communicate without the cloud service 1601.

The present technique may be applied to the network system 1600, and in the transfer of data of images (moving images) between the terminals or between a terminal and the cloud service 1601, the image data may be encoded and decoded as described in each embodiment. That is, each of the terminals (from the computer 1611 to the IoT device 1614) and the cloud service 1601 may have the function of the image encoding apparatus 200 and the function of the image decoding apparatus 100 described above. In this way, the terminals (from the computer 1611 to the IoT device 1614) and the cloud service 1601 that transfer the image data can obtain advantageous effects similar to the advantageous effects of each of the embodiments described with reference to FIGS. 1 to 52.

<Notes>

Note that the "flag" in the present specification denotes information for identifying a plurality of states and includes not only information used to identify two states of true (1) and false (0), but also includes information that can identify three or more states. Therefore, the possible values of the "flag" may be, for example, two values of 1/0 or may be three or more values. That is, the number of bits of the "flag" is arbitrary, and the number of bits may be one bit or a plurality of bits. In addition, as for the identification information (including the flag), the identification information may be included is the bitstream, or difference information of the identification information with respect to information as a reference may be included in the bitstream. Therefore, the "flag" and the "identification information" is the present specification include not only the information of the "flag" and the "identification information," but also the difference information as a reference.

In addition, various types of information (such as metadata) regarding the encoded data (bitstream) may be transmitted or recorded in any form as long as the information is associated with the encoded data. Here, the term "associated" means, for example, that one piece of data can be used (can be linked) during processing of another piece of data. That is, the data associated with each other may be integrated as one piece of data or may be provided as separate pieces of data. For example, the information associated with the encoded data (image) may be transmitted on a transmission path different from the encoded data (image). In addition, for example, the information associated with the encoded data (image) may be recorded in a recording medium separate from the encoded data (image) (or in a separate recording area of the same recording medium). Note that part of the data may be "associated," instead of the entire data. For example, the image and the information corresponding to the image may be associated with each other in an arbitrary unit, such as a plurality of frames, one frame, and part of the frame.

In addition, the terms, such as "combine," "multiplex," "add," "integrate," "include," "store," "put in," "place into," and "insert," in the present specification denote grouping of a plurality of things, such as grouping of encoded data and metadata, and each term denotes one method of "associating" described above.

In addition, the embodiments of the present technique are not limited to the embodiments described above, and various changes can be made without departing from the scope of the present technique.

In addition, for example, the present technique can also be implemented in any configuration included in an apparatus or a system, such as, for example, a processor as system LSI (Large Scale Integration) or the like, a module using a plurality of processors or the like, a unit using a plurality of modules or the like, and a set provided with other functions in addition to the unit (that is, configuration of part of an apparatus).

Note that in the present specification, the system denotes a set of a plurality of constituent elements (apparatuses, modules (components), and the like), and whether all of the constituent elements are in the same housing does not matter. Therefore, a plurality of apparatuses stored in separate housings and connected through a network and one apparatus storing a plurality of modules in one housing are both systems.

Furthermore, for example, the configuration of one apparatus (or processing section) described above may be divided to provide a plurality of apparatuses (or processing sections). Conversely, the configurations of a plurality of apparatuses (or processing sections) described above may be put together to provide one apparatus (or processing section). In addition, configurations other than the configurations described above may be obviously added to the configuration of each apparatus (or each processing section). Furthermore, part of the configuration of an apparatus (or processing section) may be included in the configuration of another apparatus (or another processing section) as long as the configuration and the operation of the entire system are substantially the same.

In addition, the present technique can be provided as, for example, cloud computing in which a plurality of apparatuses share one function and cooperate to execute a process through a network.

In addition, the program described above can be executed by, for example, an arbitrary apparatus. In that case, the apparatus can have necessary functions (such as functional blocks) and obtain necessary information.

In addition, for example, one apparatus can execute each step described in the flow charts above, or a plurality of apparatuses can take charge and execute each step. Furthermore, in the case where one step includes a plurality of processes, one apparatus can execute the plurality of processes included in one step, or a plurality of apparatuses can take charge and execute the processes. In other words, a plurality of processes included in one step can also be executed as processes of a plurality of steps. Conversely, the processes described as a plurality of steps can also be integrated and executed as one step.

Note that the program executed by the computer may be a program in which the processes of the steps describing the program are executed in chronological order described in the present specification, or the program may be a program for executing the processes in parallel or for executing the processes separately at necessary timing such as when the processes are invoked. That is, the processes of the steps may also be executed in a different order from the order described above as long as there is no contradiction. Furthermore, the processes of the steps describing the program may be executed in parallel with processes of other programs or may be executed in combination with processes of other programs.

Note that the plurality of present techniques described is the present specification can be independently and separately implemented as long as there is no contradiction. Obviously, a plurality of arbitrary present techniques can be combined and implemented. For example, part or all of the present technique described in one of the embodiments can also be implemented in combination with part or all of the present technique described in another embodiment. In addition, part or all of an arbitrary present technique described above can also be implemented in combination with another technique not described above.

Note that the present technique can also be configured as follows.

(1)

An image processing apparatus including:

a hiding unit that executes a process related to hiding of predetermined data with respect to data regarding an image and that skips the hiding in a case where data in a spatial domain of the image is to be encoded; and an encoding unit that encodes the data regarding the image for which the hiding is performed by the hiding unit or the data regarding the image for which the hiding is skipped by the hiding unit.

(2)

The image processing apparatus according to (1), in which the hiding unit skips the hiding in a case where a transformation process and quantization with respect to the data regarding the image are to be skipped.

(3)

The image processing apparatus according to (1) or (2), in which the hiding unit skips the hiding in a case where a transformation process with respect to the data regarding the image is to be skipped.

(4)

The image processing apparatus according to any one of (1) to (3), in which the hiding unit skips the hiding in a case where RDPCM (Residual Differential Code Modulation) is to be applied.

(5)

The image processing apparatus according to any one of (1) to (4), in which the encoding unit encodes the predetermined data in a case where the hiding unit skips the hiding.

(6)

The image processing apparatus according to any one of (1) to (5), further including:

a processing section that executes a predetermined process controlled by the predetermined data, in which the processing section is configured to execute the predetermined process according to the predetermined data in an initial state in a case where the hiding unit skips the hiding.

(7)

The image processing apparatus according to any one of (1) to (6), in which the predetermined data includes information regarding control of an adaptive reference sample smoothing process.

(8)

The image processing apparatus according to any one of (1) to (7), in which the predetermined data includes information regarding a transformation process or quantization with respect to the data regarding the image.

(9)

The image processing apparatus according to any one of (1) to (8), in which the predetermined data includes information regarding prediction of the image.

(10)

An image processing method including:

executing a process related to hiding of predetermined data with respect to data regarding an image and skipping the hiding in a case where data in a spatial domain of the image is to be encoded; and encoding the data regarding the image for which the hiding is performed or the data regarding the image for which the hiding is skipped.

(11)

An image processing apparatus including:

a decoding unit that decodes encoded data in which data regarding an image is encoded, executes a process related to decoding of predetermined data hidden in the data regarding the image, and skips the decoding of the predetermined data hidden in the data regarding the image in a case where the encoded data is data obtained by encoding data in a spatial domain of the image.

(12)

The image processing apparatus according to (11), in which the decoding unit skips the decoding of the predetermined data hidden in the data regarding the image in a case where a transformation process and quantization with respect to the data regarding the image are skipped in the encoded data.

(13)

The image processing apparatus according to (11) or (12), in which the decoding unit skips the decoding of the predetermined data hidden in the data regarding the image in a case where a transformation process with respect to the data regarding the image is skipped in the encoded data.

(14)

The image processing apparatus according to any one of (11) to (13), in which the decoding unit skips the decoding of the predetermined data hidden in the data regarding the image in a case where RDPCM (Residual Differential Code Modulation) is applied in the encoded data.

(15)

The image processing apparatus according to any one of (11) to (14), in which the decoding unit decodes the predetermined data that is included in the encoded data and that is not hidden in the data regarding the image in a case where the decoding unit skips the decoding of the predetermined data hidden in the data regarding the image.

(16)

The image processing apparatus according to any one of (11) to (14), in which the decoding unit sets the predetermined data to an initial value in a case where the decoding unit skips the decoding of the predetermined data hidden in the data regarding the image.

(17)

The image processing apparatus according to any one of (11) to (16), in which the predetermined data includes information regarding control of an adaptive reference sample smoothing process.

(18)

The image processing apparatus according to any one of (11) to (17), in which the predetermined data includes information related to a transformation process or quantization with respect to the data regarding the image.

(19)

The image processing apparatus according to any one of (11) to (18), in which the predetermined data includes information regarding prediction of the image.

(20)

An image processing method including decoding encoded data in which data regarding an image is encoded, executing a process regarding decoding of predetermined data hidden in the data regarding the image, and skipping the decoding of the predetermined data hidden in the data regarding the image in a case where the encoded data is data obtained by encoding data in a spatial domain of the image.

An image decoding apparatus that executes an opposite process of data hiding to decode control information regarding an encoding mode of a block to be processed from encoded data of a transform block corresponding to the block to be processed when the control information regarding the encoding mode of the block to be processed satisfies none of [1] to [3],

[1] transform quantization bypass is applied,

[2] transform skip is applied, and

[3] residual DPCM is applied, and that does not execute the opposite process of the data biding to decode the control information from the encoded data of the transform block when the control information satisfies any one of [1] to [3].

When any one of [1] to [3] is satisfied, the data hiding is disabled in relation to the control information of the encoding mode of the block to be processed. Therefore, when any one of [1] to [3] is satisfied, the reduction of the subjective image quality caused by the data hiding and the reduction in the prediction efficiency of RDPCM can be prevented. In addition, the lossless coding can be performed.

An image encoding apparatus that encodes control information regarding an encoding mode of a block to be processed by biding the control information in data of a transform block corresponding to the block to be processed when the control information regarding the encoding mode of the block to be processed satisfies none of [1] to [3],
[1] transform quantization bypass is applied,
[2] transform skip is applied, and
[3] residual DPCM is applied,
and that does not encode the control information by hiding the control information in the data of the transform block when the control information satisfies any one of [1] to [3].

When any one of [1] to [3] is satisfied, the data hiding is disabled in relation to the control information of the encoding mode of the block to be processed. Therefore, when any one of [1] to [3] is satisfied, the reduction of the subjective image quality caused by the data hiding and the reduction in the prediction efficiency of RDPCM can be prevented. In addition, the lossless coding can be performed.

An image decoding apparatus or an image encoding apparatus that
sets a value indicating "to perform data hiding" for a control flag DataHidingFlag indicating whether to hide control information regarding an encoding mode of a block to be processed in data of a transform block corresponding to the block to be processed
when the control information regarding the encoding mode of the block to be processed satisfies none of [1] to [3]
and that sets a value indicating "not to perform data hiding" for the control flag when the control information satisfies any one of [1] to [3].

An image decoding apparatus or as image encoding apparatus
that sets a value indicating "to perform data hiding" for a control flag ArssDataHidingFlag indicating whether to hide control information ArssFlag regarding an adaptive reference sample smoothing process (ARSS: Adaptive Reference Sample Smoothing, ARSF: Adaptive Reference Sample Filtering) of a block to be processed in data of a transform block corresponding to the block to be processed
when the control information regarding an encoding mode of the block to be processed satisfies none of [1] to [3]
and that sets a value indicating "not to perform data hiding" for the control flag ArssDataHidingFlag when the control information satisfies any one of [1] to [3].

An image decoding apparatus or as image encoding apparatus
that sets a value indicating that "data is hidden" for a control flag DataHiddenFlag indicating whether control information regarding an encoding mode of a block to be processed is hidden in data of a transform block corresponding to the block to be processed
when the control information regarding the encoding mode of the block to be processed satisfies none of [1] to [3]
and that sets a value indicating that "data is not hidden" for the control flag when the control information satisfies any one of [1] to [3].

An image decoding apparatus or an image encoding apparatus
that sets a value indicating that "data is hidden" for a control flag ArssDataHiddenFlag indicating whether control information ArssFlag regarding an adaptive reference sample smoothing process (ARSS: Adaptive Reference Sample Smoothing, ARSF: Adaptive Reference Sample Filtering) of a block to be processed is hidden in data of a transform block corresponding to the block to be processed
when the control information regarding the encoding mote of the block to be processed satisfies none of [1] to [3]
and that sets a value indicating that "data is not hidden" for the control flag ArssDataHiddenFlag when the control information satisfies any one of [1] to [3].

[1] The application of the transform quantization bypass denotes that a transform quantization bypass flag transquant_bypass_flag is 1 (true).
[2] The application of the transform skip denotes that a transform skip flag ts_flag as 1 (true).
[3] The application of the residual DPCM denotes that an inter RDPCM mode flag InterRDPCMModeFlag is 1 (true) or an intra RDPCM mode flag IntraRDPCMModeFlag is 1 (true).

An image decoding apparatus
that executes an opposite process of data hiding to decode control information regarding an encoding mode of a block to be processed from encoded data of a transform block corresponding to the block to be processed
when the control information regarding the encoding mode of the block to be processed satisfies none of [1] to [3],
[1] transform quantization bypass is applied,
[2] transform skip is applied, and
[3] residual DPCM is applied,
and that decodes (explicitly) the control information from the encoded data (through variable-length coding) when the control information satisfies any one of [1] to [3].

An image encoding apparatus
that encodes control information regarding an encoding mode of a block to be processed by hiding the control information in data of a transform block corresponding to the block to be processed
when the control information regarding the encoding mode of the block to be processed satisfies none of [1] to [3],
[1] transform quantization bypass is applied,
[2] transform skip is applied, and
[3] residual DPCM is applied,
and that encodes (explicitly) the control information when the control information satisfies any one of [1] to [3].

An image decoding apparatus
that sets a value indicating "to perform data hiding" for a control flag DataHidingFlag indicating whether to hide control information regarding an encoding mode of a block to be processed in data of a transform block corresponding to the block to be processed
when the control information regarding the encoding mode of the block to be processed satisfies none of [1] to [3],
sets a value indicating "not to perform data hiding" for the control flag when the control information satisfies any one of [1] to [3],
and decodes (explicitly) the control information from the encoded data in a case where the control flag indicates "not to perform data hiding."

An image encoding apparatus
that sets a value indicating "to perform data hiding" for a control flag DataHidingFlag indicating whether to hide control information regarding an encoding mode of a block to be processed in data of a transform block corresponding to the block to be processed when the control information regarding the encoding mode of the block to be processed satisfies none of [1] to [3], sets a value indicating "not to perform data hiding" for the control flag when the control information satisfies any one of [1] to [3], and encodes (explicitly) the control information in a case where the control flag indicates "not to perform data hiding."

An image decoding apparatus that sets a value indicating to "perform data hiding" for a control flag ArssDataHidingFlag indicating whether to hide control information ArssFlag regarding an adaptive reference sample smoothing process (ARSS: Adaptive Reference Sample Smoothing, ARSF: Adaptive Reference Sample Filtering) of a block to be processed in data of a transform block corresponding to the block to be processed when the control information regarding the encoding mode of the block to be processed satisfies none of [1] to [3], sets a value indicating "not to perform data hiding" for the control flag ArssDataHidingFlag when the control information satisfies any one of [1] to [3], and decodes the control information from the encoded data in a case where the control flag ArssDataHidingFlag indicates "not to perform data hiding."

An image encoding apparatus that sets a value indicating "to perform data hiding" for a control flag ArssDataHidingFlag indicating whether to hide control information ArssFlag regarding an adaptive reference sample smoothing process (ARSS: Adaptive Reference Sample Smoothing, ARSF: Adaptive Reference Sample Filtering) of a block to be processed in data of a transform block corresponding to the block to be processed when the control information regarding the encoding mode of the block to be processed satisfies none of [1] to [3], sets a value indicating "not to perform data hiding" for the control flag ArssDataHidingFlag when the control information satisfies any one of [1] to [3], and encodes the control information in a case where the control flag ArssDataHidingFlag indicates "not to perform data hiding."

A value indicating "to perform data hiding" is set for a control flag DataHidingFlag indicating whether to hide control information regarding an encoding mode of the block to processed in data of a transform block corresponding to the block to be processed, and a value indicating "not to perform data hiding" is set for the control flag when the control information satisfies any one of [1] to [3].

A value indicating that control information regarding an encoding mode of the block to be processed is "hidden" is set for a control flag DataHiddenFlag indicating whether the control information is hidden in data of a transform block corresponding to the block to be processed, and a value indicating that the control information is "not hidden" is set for the control flag when the control information satisfies any one of [1] to [3].

REFERENCE SIGNS LIST

100 Image decoding apparatus, 111 Decoding unit, 112 Inverse quantization unit, 113 Inverse transform unit, 114 Prediction unit, 115 Computation unit, 116 Frame memory, 117 Loop filter unit, 131 Prediction method selection unit, 132 Intra prediction unit, 133 Inter prediction unit, 151 Reference pixel filtering unit, 152 Intra predicted image generation unit, 161 DC prediction unit, 162 Planar prediction unit, 163 Angular prediction unit, 164 LM prediction unit, 191 Transform skip flag decoding unit, 192 Inter RDPCM syntax decoding unit, 193 Non-zero coefficient syntax decoding unit, 194 ARSS data hiding flag derivation unit, 195 ARSS flag decoding unit, 200 Image encoding apparatus, 201 Control unit, 211 Prediction unit, 212 Computation unit, 213 Transform unit, 214 Quantization unit, 215 Inverse quantization unit, 216 Inverse transform unit, 217 Computation unit, 218 Frame memory, 219 Loop filter unit, 220 Encoding unit, 231 intra prediction unit, 232 Inter prediction unit, 233 Predicted image selection unit, 251 Reference pixel filtering unit, 252 Intra predicted image generation unit, 261 DC prediction unit, 262 Planar prediction unit, 263 Angular prediction unit, 264 LM prediction unit, 291 Transform skip flag encoding unit, 292 Inter RDPCM syntax encoding unit, 293 ARSS data hiding flag derivation unit, 294 ARSS data hiding unit, 295 Non-zero coefficient syntax encoding unit, 334 Target data hiding flag derivation unit, 335 Target data decoding unit, 353 Target data hiding flag derivation unit, 354 Target data hiding unit.

The invention claimed is:

1. An image processing apparatus comprising:
   a hiding unit configured to
      hide a control flag by performing hiding of predetermined data in a frequency domain by modifying a coefficient value of a frequency component with respect to data regarding an image, and
      skip the hiding of the predetermined data in a case where data in a spatial domain of the image is to be encoded; and
   an encoding unit configured to encode the predetermined data for which the hiding is performed by the hiding unit and the data in the spatial domain for which the hiding is skipped by the hiding unit,
   wherein the predetermined data includes identification information identifying an intra prediction mode, and
   wherein the hiding unit and the encoding unit are each implemented via at least one processor.

2. The image processing apparatus according to claim 1, wherein
   the hiding unit skips the hiding in a case where a transformation process and quantization with respect to the data regarding the image are to be skipped.

3. The image processing apparatus according to claim 1, wherein
   the hiding unit skips the hiding in a case where a transformation process with respect to the data regarding the image is to be skipped.

4. The image processing apparatus according to claim 1, wherein
   the hiding unit skips the hiding in a case where RDPCM (Residual Differential Code Modulation) is to be applied.

5. The image processing apparatus according to claim 1, wherein
   the encoding unit encodes the predetermined data in a case where the hiding unit skips the hiding.

6. The image processing apparatus according to claim 1, further comprising:
   a processing section configured to execute a predetermined process controlled by the predetermined data,
   wherein the predetermined process includes an adaptive reference sample smoothing process,
   wherein the processing section executes the predetermined process according to the predetermined data in an initial state in a case where the hiding unit skips the hiding, and
   wherein the processing section is implemented via at least one processor.

7. The image processing apparatus according to claim 1, wherein
the predetermined data further includes information regarding control of an adaptive reference sample smoothing process.

8. The image processing apparatus according to claim 1, wherein
the predetermined data further includes information regarding a transformation process or quantization with respect to the data regarding the image.

9. The image processing apparatus according to claim 1, wherein
the predetermined data further includes information regarding prediction of the image.

10. An image processing method comprising:
executing a process by performing hiding of predetermined data in a frequency domain by modifying a coefficient value of a frequency component with respect to data regarding an image and skipping the hiding of the predetermined data in a case where data in a spatial domain of the image is to be encoded; and
encoding the predetermined data for which the hiding is performed and the data in the spatial domain for which the hiding is skipped,
wherein the predetermined data includes identification information identifying an intra prediction mode.

11. An image processing apparatus comprising:
a reception unit configured to receive encoded data in which data regarding an image is encoded; and
a decoding unit configured to
decode the encoded data in which the data regarding the image is encoded,
execute a process related to decoding of predetermined data in a frequency domain hidden in the data regarding the image, wherein the predetermined data is hidden by modifying a coefficient value of a frequency component with respect to the data regarding the image, and
skip the decoding of the predetermined data hidden in the data regarding the image in a case where the encoded data is data obtained by encoding data in a spatial domain of the image,
wherein the predetermined data includes identification information identifying an intra prediction mode, and
wherein the reception unit and the decoding unit are each implemented via at least one processor.

12. The image processing apparatus according to claim 11, wherein
the decoding unit skips the decoding of the predetermined data hidden in the data regarding the image in a case where a transformation process and quantization with respect to the data regarding the image are skipped in the encoded data.

13. The image processing apparatus according to claim 11, wherein
the decoding unit skips the decoding of the predetermined data hidden in the data regarding the image in a case where a transformation process with respect to the data regarding the image is skipped in the encoded data.

14. The image processing apparatus according to claim 11, wherein
the decoding unit skips the decoding of the predetermined data hidden in the data regarding the image in a case where RDPCM (Residual Differential Code Modulation) is applied in the encoded data.

15. The image processing apparatus according to claim 11, wherein
the decoding unit decodes the predetermined data that is included in the encoded data and that is not hidden in the data regarding the image in a case where the decoding unit skips the decoding of the predetermined data hidden in the data regarding the image.

16. The image processing apparatus according to claim 11, wherein
the decoding unit sets the predetermined data to an initial value in a case where the decoding unit skips the decoding of the predetermined data hidden in the data regarding the image.

17. The image processing apparatus according to claim 11, wherein
the predetermined data further includes information regarding control of an adaptive reference sample smoothing process.

18. The image processing apparatus according to claim 11, wherein
the predetermined data further includes information related to a transformation process or quantization with respect to the data regarding the image.

19. The image processing apparatus according to claim 11, wherein
the predetermined data further includes information regarding prediction of the image.

20. An image processing method comprising:
receiving encoded data in which data regarding an image is encoded;
decoding the encoded data in which the data regarding the image is encoded;
executing a process regarding decoding of predetermined data in a frequency domain hidden in the data regarding the image, the predetermined data is hidden by modifying a coefficient value of a frequency component with respect to the data regarding the image; and
skipping the decoding of the predetermined data hidden in the data regarding the image in a case where the encoded data is data obtained by encoding data in a spatial domain of the image,
wherein the predetermined data includes identification information identifying an intra prediction mode.

21. The image processing apparatus according to claim 1, wherein the hiding of the predetermined data is performed by modifying the coefficient value corresponding to a high frequency component relative to other frequency components corresponding to the data regarding the image.

* * * * *